US006532586B1

(12) United States Patent
Negoro

(10) Patent No.: US 6,532,586 B1
(45) Date of Patent: Mar. 11, 2003

(54) SOFTWARE PRODUCING METHOD, PROCESSOR, PROCESSING METHOD AND RECORDING MEDIUM

(75) Inventor: Fumio Negoro, Kamakura (JP)

(73) Assignees: Information System Development Institute, Tokyo (JP); The Institute of Computer Based Software Methodology and Technology, Tokyo (JP)

( * ) Notice: Subject to any disclaimer, the term of this patent is extended or adjusted under 35 U.S.C. 154(b) by 0 days.

(21) Appl. No.: 09/297,068

(22) PCT Filed: Apr. 30, 1997

(86) PCT No.: PCT/JP97/01492

§ 371 (c)(1),
(2), (4) Date: Jun. 9, 1999

(87) PCT Pub. No.: WO98/19232

PCT Pub. Date: May 7, 1998

(30) Foreign Application Priority Data

Oct. 30, 1996 (WO) .................. PCT/JP96/03183

(51) Int. Cl.$^7$ ................................ G06F 9/44

(52) U.S. Cl. ...................... 717/105; 706/919

(58) Field of Search ............. 717/1, 2, 3, 100, 717/104, 105, 106, 109, 120, 121, 122, 123; 707/200; 705/1, 7; 706/45, 46, 47, 919, 922; 345/763

(56) References Cited

U.S. PATENT DOCUMENTS 4,965,741 A * 10/1990 Winchell et al. ............. 706/11
5,038,296 A * 8/1991 Sano ............................ 706/45

(List continued on next page.)

FOREIGN PATENT DOCUMENTS

JP  4-137038  *  5/1992

(List continued on next page.)

OTHER PUBLICATIONS

Sutcliffe et al., "Domain modeling for reuse", IEEE, 1994, pp 169–177.*

(List continued on next page.)

*Primary Examiner*—Kakali Chaki
(74) *Attorney, Agent, or Firm*—Oblon, Spivak, McClelland, Maier & Neustadt, P.C.

(57) ABSTRACT

Firstly, definitive identifiers are determined, which are the screen needed for the software to be produced. Next, words existing in the definitive identifier are sorted out, as well as the homogeneity map is created where all pallets needed for the software are placed according to the process flow based on the definitive identifier. Next, the necessary file is determined based on the sorted-out words and the created homogeneity map. Next, the following tense control vectors are created: the first tense control vector that implements screen editing or file editing for all the sorted-out words; the second tense control vector that determines the homogeneity route for all the sorted-out words; and the third tense control vector that implements file updating. Next, the three kinds of pallets are created, which are made by binding the first, the second and the third tense control vectors per screen unit, respectively, as well as the pallet function is created, which executes each of the tense control vectors inside each pallet with autonomous significance. And, the three kinds of the pallet functions are assembled into the pallet chain function with the structure of transmitting a screen based on the pallet function concerned with the first tense control vector, receiving the screen to execute the pallet function concerned with the second tense control vector, and determining, in accordance with this execution result, one homogeneity route from the plural homogeneity routes taking at least one homogeneity route for executing the pallet function concerned with the third tense control vector. Hereupon, with this software, it is not necessary to create tense control vectors for all words, and if tense control vectors are created for a certain number of words, it operates within such scope.

6 Claims, 48 Drawing Sheets

U.S. PATENT DOCUMENTS

| | | | | |
|---|---|---|---|---|
| 5,119,475 A | * | 6/1992 | Smith et al. | 345/353 |
| 5,200,888 A | * | 4/1993 | Hashimoto | 364/400 |
| 5,216,592 A | * | 6/1993 | Mann et al. | 705/8 |
| 5,233,513 A | * | 8/1993 | Doyle | 705/7 |
| 5,430,873 A | * | 7/1995 | Abe et al. | 395/702 |
| 5,450,545 A | * | 9/1995 | Martin et al. | 395/701 |
| 5,485,601 A | * | 1/1996 | Ching | 395/500 |
| 5,490,232 A | * | 2/1996 | Asano et al. | 706/45 |
| 5,530,869 A | * | 6/1996 | Salle | 395/701 |
| 5,640,499 A | * | 6/1997 | Nagai | 345/437 |
| 5,706,405 A | * | 1/1998 | Short et al. | 706/45 |
| 5,794,040 A | * | 8/1998 | Ono et al. | 395/701 |

FOREIGN PATENT DOCUMENTS

| | | | |
|---|---|---|---|
| JP | 4-181454 | * | 6/1992 |
| JP | 4-238534 | * | 8/1992 |
| JP | 5-73290 | * | 3/1993 |
| JP | 5-108319 | * | 4/1993 |
| JP | 5-257670 | * | 10/1993 |
| JP | 6-332678 | * | 2/1994 |
| JP | 6-348498 | * | 12/1994 |

OTHER PUBLICATIONS

Jones et al., "Interactive prototyping methodology for a domain–dependent user interface", NAECON 1991, IEEE, 1991, pp 813–816.*

Rowley et al., "The cognitive jogthrough: A fast–paced user interface evaluation procedure", ACM, 1992, pp 389–395.*

Wharton et al., "Applying cognitive walkthroughs to more complex user interfaces: experiences, issues and recommendations", ACM, 1992, pp 381–392.*

Fischer et al., "Cognitive tools for locating and comprehending software objects for reuse", IEEE, 1991, pp 318–328.*

* cited by examiner

1   KH211E              Sales Entry (direct sales)      DD DD DD  TT TT TT   1
 2            BBBBBBB   OOOOOOOOOOOOOOOOOOOOOO                      OOOOOOOO  2
 3  *         BB        OOOOOOOOOOOOOOOOOOOOOO                        999999  3
 4  *         BBBBBBBB  OOOOOOOOOOOOOOOOOOOOOOOOOOOOOOOO              999999  4
 5  *         BBBBBBBB  OOOOOOOOOOOOOOOOOOOOOOOOOOOOOOOO            B OOOOOOOO 5
 6  *         BBBBBBB   OOOOOOOOOOOOOOOOOOOO  Slip Order No. BBBBBBBBBBBBBBBBBBBB 6
 7            BBBBBBBBBBBBBBBBBBBBBBBB BBBBBBBBBBBBBBBBBBBBBBBB TEL BBBBBBBBBBB 7
 8            BBBBBBBBBBBBBBBBBBBBB                                            8
 9  Line*                                                                      9
10                                                                            10
11   66  BBBBBBBBBBBB    9999.99    999.999.999-   99.999.999   666.666.666-  11
12       BBBBBBBBBBBBBBBBBBBBBBBBBBB                 OOOOOOOOOOOOOOOOOOOOOO   12
13   66  BBBBBBBBBBBB    9999.99    999.999.999-   99.999.999   666.666.666-  13
14       BBBBBBBBBBBBBBBBBBBBBBBBBBB                 OOOOOOOOOOOOOOOOOOOOOO   14
15   66  BBBBBBBBBBB     9999.99    999.999.999-   99.999.999   666.666.666-  15
16       BBBBBBBBBBBBBBBBBBBBBBBBBBB                 OOOOOOOOOOOOOOOOOOOOOO   16
17   66  BBBBBBBBBBB     9999.99    999.999.999-   99.999.999   666.666.666-  17
18       BBBBBBBBBBBBBBBBBBBBBBBBBBB                 OOOOOOOOOOOOOOOOOOOOOO   18
19   66  BBBBBBBBBBB     9999.99    999.999.999-   99.999.999   666.666.666-  19
20       BBBBBBBBBBBBBBBBBBBBBBBBBBB                 OOOOOOOOOOOOOOOOOOOOOO   20
21                      6.666.666.666-              6.666.666.666-         0  21
22                      6.666.666.666-              6.666.666.666-            22
23           Continue   Registry     End     Reference                        23
24   OOOOOOOOOOOOOOOOOOOOOOOOOOOOOOOOOOOOOOOOOOOOOOOOOOOOOOOOOOOOOOOOOOOOOOO  24

1    KH600Q              Customer Code Inquiry         DD DD DD  TT TT TT      1
 2                                                                              2
 3                                                                              3
 4    66 000000000 0000000000000000000 0000000000000000000 0000000000 00000000   4
 5    66 000000000 0000000000000000000 0000000000000000000 0000000000 00000000   5
 6    66 000000000 0000000000000000000 0000000000000000000 0000000000 00000000   6
 7    66 000000000 0000000000000000000 0000000000000000000 0000000000 00000000   7
 8    66 000000000 0000000000000000000 0000000000000000000 0000000000 00000000   8
 9    66 000000000 0000000000000000000 0000000000000000000 0000000000 00000000   9
10    66 000000000 0000000000000000000 0000000000000000000 0000000000 00000000  10
11    66 000000000 0000000000000000000 0000000000000000000 0000000000 00000000  11
12    66 000000000 0000000000000000000 0000000000000000000 0000000000 00000000  12
13    66 000000000 0000000000000000000 0000000000000000000 0000000000 00000000  13
14    66 000000000 0000000000000000000 0000000000000000000 0000000000 00000000  14
15    66 000000000 0000000000000000000 0000000000000000000 0000000000 00000000  15
16    66 000000000 0000000000000000000 0000000000000000000 0000000000 00000000  16
17    66 000000000 0000000000000000000 0000000000000000000 0000000000 00000000  17
18    66 000000000 0000000000000000000 0000000000000000000 0000000000 00000000  18
19    66 000000000 0000000000000000000 0000000000000000000 0000000000 00000000  19
20                                                                           0  20
21       99              BBBBBBBBBBBBBBBB          BBBBBBB                      21
22                                                                              22
23    Continue   Return                                                    F8   23
24    000000000000000000000000000000000000000000000000000000000000000000000000   24

```
            1         2         3         4         5         6         7         8
   12345678901234567890123456789012345678901234567890123456789012345678901234567890
 1    KH410E              Arrival Confirmation Entry          DD DD DD TT TT TT      1
 2                                                                                    2
 3            BBBBBBB    OOOOOOOOOOOOOOOOOOOO                                        3
 4                                                                                    4
 5                                                                                    5
 6                       BB      OOOOOOOOOOOOOOOOOO                                   6
 7                                                                                    7
 8                                                                                    8
 9                       B       (1: Hardware, 2: Software)                           9
10                                                                                   10
11                                                                                   11
12                       B       (1: Agency Goods. 2: Normal)                        12
13                                                                                   13
14                                                                                   14
15                                                                                   15
16                                                                                   16
17                                                                                   17
18                                                                                   18
19                                                                                   19
20                                                                                   20
21                                                                                   21
22                                                                                   22
23      Continue    Registry    End    Reference                                     23
24      OOOOOOOOOOOOOOOOOOOOOOOOOOOOOOOOOOOOOOOOOOOOOOOOOOOOOOOOOOOOOOOOOOOOOOOOO    24
   12345678901234567890123456789012345678901234567890123456789012345678901234567890
            1         2         3         4         5         6         7         8
```

FIG. 5

|   | 1 | 2 | 3 | 4 | 5 | 6 | 7 | 8 |   |
|---|---|---|---|---|---|---|---|---|---|
|   |12345678901234567890123456789012345678901234567890123456789012345678901234567890| | | | | | | | |
| 1 | KH616Q | | Warehouse Code Inquiry | | | DD DD DD | TT TT TT | | 1 |
| 2 | | | | | | | | | 2 |
| 3 | | | | | | | | | 3 |
| 4 | 66 | 00 | 00000000000000000000000000000000000000000000 | | | | | | 4 |
| 5 | 66 | 00 | 00000000000000000000000000000000000000000000 | | | | | | 5 |
| 6 | 66 | 00 | 00000000000000000000000000000000000000000000 | | | | | | 6 |
| 7 | 66 | 00 | 00000000000000000000000000000000000000000000 | | | | | | 7 |
| 8 | 66 | 00 | 00000000000000000000000000000000000000000000 | | | | | | 8 |
| 9 | 66 | 00 | 00000000000000000000000000000000000000000000 | | | | | | 9 |
| 10 | 66 | 00 | 00000000000000000000000000000000000000000000 | | | | | | 10 |
| 11 | 66 | 00 | 00000000000000000000000000000000000000000000 | | | | | | 11 |
| 12 | 66 | 00 | 00000000000000000000000000000000000000000000 | | | | | | 12 |
| 13 | 66 | 00 | 00000000000000000000000000000000000000000000 | | | | | | 13 |
| 14 | 66 | 00 | 00000000000000000000000000000000000000000000 | | | | | | 14 |
| 15 | 66 | 00 | 00000000000000000000000000000000000000000000 | | | | | | 15 |
| 16 | 66 | 00 | 00000000000000000000000000000000000000000000 | | | | | | 16 |
| 17 | 66 | 00 | 00000000000000000000000000000000000000000000 | | | | | | 17 |
| 18 | 66 | 00 | 00000000000000000000000000000000000000000000 | | | | | | 18 |
| 19 | 66 | 00 | 00000000000000000000000000000000000000000000 | | | | | | 19 |
| 20 | | | | | | | | 0 | 20 |
| 21 | | 99 | | | | | | | 21 |
| 22 | | | | | | | | | 22 |
| 23 | Continue | | Return | | | | | | 23 |
| 24 |00000000000000000000000000000000000000000000000000000000000000000000000000000000| | | | | | | | 24 |
|   |12345678901234567890123456789012345678901234567890123456789012345678901234567890| | | | | | | | |
|   | 1 | 2 | 3 | 4 | 5 | 6 | 7 | 8 |   |

| | |
|---|---|
| 1  KH510E            Shipment Request List            DD DD DD  TT TT TT | 1 |
| 2 | 2 |
| 3 | 3 |
| 4 | 4 |
| 5 | 5 |
| 6     Shipment Request Date     From 999999 to 999999 (Shipment to be output). | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | 22 |
| 23 Execute –Continue  F2- Registry   F3- End | 23 |
| 24  OOOOOOOOOOOOOOOOOOOOOOOOOOOOOOOOOOOOOOOOOOOOOOOOOOOOOOOOOOOOOOOOOOOOOOOOO | 24 |

| 桁 | | 1-10 | | | | | | | | | | 11-20 | | | | | | | | | | 21-30 | | | | | | | | | | 31-40 | | | | | | | | | | 41- | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 行 | | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 |
| 1 | 1 | | | | | | | | | | | | | | | | | | | | | | | | | | | | | | | | | | | | | | | | | | | | | | |
| | 2 | K | H | 5 | 0 | 1 | 0 | | | | | | | | | | | | | | | | | | | | | | | | | | | | | | | | | | | | | | | | |
| | 3 | | | | | | | | | | | | | | | | | | | | | | | | | | | | | | | | | | | | | | | | | | | | | | |
| | 4 | Department | | | | | | | | | | X:X:X:X:X | | | | | | | | | | N | | | | | | | | | | N | | | | | | | | | | N | | | | | |
| | 5 | | | | | | | | | | | | | | | | | | | | | | | | | | | | | | | | | | | | | | | | | | | | | | |
| | 6 | ☆ Delivery Destination | | | | | | | | | | Billing Destination | | | | | | | | | | X:X:X:X:X:X | | | | | | | | | | N | | | | | | | | | | N | | | | | |
| | 7 | | | | | | | | | | | | | | | | | | | | | | | | | | | | | | | | | | | | | | | | | | | | | | |
| 2 | 8 | For shipping order | | | | | | | | | | Shipping No. | | | | | | | | | | Line | | | | Product Code | | | | | | | | | | Product Name | | | | | | | | | | |
| | 9 | | | | | | | | | | | | | | | | | | | | | 9:9 | | | X:X:X | X:X:X:X | X:X:X | X:X:X | | | N | N | X:X:X | X:X:X | X:X:X | X:X:X | N | N | X:X:X | X:X:X | X:X:X | | | | | |
| | 10 | Y:Y | | | M:M | | | D:D | | | | X:X:X:X | X:X:X:X | | | | | | | | | 9:9 | | | X:X:X | X:X:X:X | X:X:X | X:X:X | | | N | N | X:X:X | X:X:X | X:X:X | X:X:X | N | N | X:X:X | X:X:X | X:X:X | | | | | |
| | 11 | Y:Y | | | M:M | | | D:D | | | | X:X:X:X | X:X:X:X | | | | | | | | | 9:9 | | | X:X:X | X:X:X:X | X:X:X | X:X:X | | | N | N | X:X:X | X:X:X | X:X:X | X:X:X | N | N | X:X:X | X:X:X | X:X:X | | | | | |
| | 12 | Y:Y | | | M:M | | | D:D | | | | | | | | | | | | | | | | | | | | | | | | | | | | | | | | | | | | | | | |
| | 13 | | | | | | | | | | | | | | | | | | | | | | | | | | | | | | | | | | | | | | | | | | | | | | |
| 3 | 14 | ☆ Delivery Destination | | | | | | | | | | Billing Destination | | | | | | | | | | X:X:X:X:X | | | | | | | | | | N | | | | | | | | | | N | | | | | |
| | 15 | | | | | | | | | | | | | | | | | | | | | | | | | | | | | | | | | | | | | | | | | | | | | | |
| | 16 | | | | | | | | | | | | | | | | | | | | | | | | | | | | | | | | | | | | | | | | | | | | | | |
| | 17 | For shipping order | | | | | | | | | | Shipping No. | | | | | | | | | | Line | | | | Product Code | | | | | | | | | | Product | | | | | | | | | | |
| 4 | 18 | Y:Y | | | M:M | | | D:D | | | | X:X:X:X | X:X:X:X | | | | | | | | | 9:9 | | | X:X:X | X:X:X:X | X:X:X | X:X:X | | | N | N | X:X:X | X:X:X | X:X:X | X:X:X | N | N | X:X:X | X:X:X | X:X:X | | | | | |
| | 19 | Y:Y | | | M:M | | | D:D | | | | X:X:X:X | X:X:X:X | | | | | | | | | 9:9 | | | X:X:X | X:X:X:X | X:X:X | X:X:X | | | N | N | X:X:X | X:X:X | X:X:X | X:X:X | | | | | | | | | | |
| | 20 | Y:Y | | | M:M | | | D:D | | | | X:X:X:X | X:X:X:X | | | | | | | | | 9:9 | | | X:X:X | X:X:X:X | X:X:X | X:X:X | | | | | | | | | | | | | | | | | |
| | 21 | | | | | | | | | | | | | | | | | | | | | | | | | | | | | | | | | | | | | | | | | | | | | | |
| | 22 | | | | | | | | | | | | | | | | | | | | | | | | | | | | | | | | | | | | | | | | | | | | | | |
| | 23 | | | | | | | | | | | | | | | | | | | | | | | | | | | | | | | | | | | | | | | | | | | | | | |
| | 24 | | | | | | | | | | | | | | | | | | | | | | | | | | | | | | | | | | | | | | | | | | | | | | |
| 5 | 25 | | | | | | | | | | | | | | | | | | | | | | | | | | | | | | | | | | | | | | | | | | | | | | |
| | 26 | | | | | | | | | | | | | | | | | | | | | | | | | | | | | | | | | | | | | | | | | | | | | | |
| | 27 | | | | | | | | | | | | | | | | | | | | | | | | | | | | | | | | | | | | | | | | | | | | | | |
| | 28 | | | | | | | | | | | | | | | | | | | | | | | | | | | | | | | | | | | | | | | | | | | | | | |

FIG. 8

| 桁\行 | 130–140<br>3 4 5 6 7 8 9 0 | 141–150<br>1 2 3 4 5 6 7 8 9 0 | 151–160<br>1 2 3 4 5 6 7 8 9 0 | 161–170<br>1 2 3 4 5 6 7 8 9 0 | 161–170<br>1 2 3 4 5 6 7 8 9 0 | 180–190<br>1 2 3 4 5 6 7 |
|---|---|---|---|---|---|---|
| 1 | Date | YY MM DD | PAGE ZZZ9 | | | |
| 2 | | | | | | |
| 3 | | | | | | |
| 4 | | | | | | |
| 5 | | | | | | |
| 6 | | | | | | |
| 7 | | | | | | |
| 8 | Your Order No. | | Inst. City | Shipment | Sales | |
| 9 | | | | | | |
| 10 | XXXXXXXX | XXXXXXXXXXXX | X N N | N N | X | |
| 11 | XXXXXXXX | XXXXXXXXXXXX | X N N | N N | X X | |
| 12 | XXXXXXXX | XXXXXXXXXXXX | X N N | N N | X X | |
| 13 | | | | | | |
| 14 | | | | | | |
| 15 | | | | | | |
| 16 | | | | | | |
| 17 | Your Order No. | | Inst. City | | | |
| 18 | XXXXXXXX | XXXXXXXXXXXX | X N N | N N | | |
| 19 | XXXXXXXX | XXXXXXXXXXXX | X N N | N N | | |
| 20 | XXXXXXXX | XXXXXXXXXXXX | X N N | N N | | |

FIG. 37

| VOUCHER NAME: | IDENTIFIER: | | OUTPUT CONTROL METHOD [NEW LINE, NEW PAGE ETC.] | | | | | | | |
|---|---|---|---|---|---|---|---|---|---|---|

WORD PLACEMENT DIAGRAM (LAYOUT)

01 0102030440506 ·········· 6162636465666 7
02
03
04 ··················································
57
58
59
60

| VOUCHER OUTPUT CONDITIONS | OUTPUT POINT | OUTPUT LOCATION | | | | REMARKS |
|---|---|---|---|---|---|---|
| | | OUTPUT DEVICE | | | | |
| | | KINDS OF FORM | | | | |
| | OUTPUT TIME | | | | | |

FIG. 38

| FILE NAME | | IDENTIFIER | | FILE CLASSIFICATION | α/β/γ | BELONGING AREA | W02/W03 |
|---|---|---|---|---|---|---|---|
| No | ITEM NAME | ITEM id | ATTRIBUTE | CONTENTS/MEANING/OTHERS (TRANSACTION CONDITIONS PART) | | | REMARKS |
| | | | | | | | |

FIG. 42

| DEFINITIVE NAME | MULTIPLE TRANSACTION FILE | DEFINITIVE id | KD52BP | PALLET CHAIN FUNCTION CL. | φ0 | AREA CL. W03 | PALLET id W03KH210E | TENSE CONTROL VECTOR CL. | ;LOGIC |
|---|---|---|---|---|---|---|---|---|---|
| No. | ITEM NAME | ITEM id | | OPERATIONAL SIGNIFICANCE CONDITIONS | | OPERATIONAL EXPRESSION | | REMARKS | |
| 76 | DISCOUNT TOTAL AMOUNT | KD1099 | | TRANSACTION CL. IS ORDER RECEIVE AND TRANSACTION CL. IS EXCEPT 1 (NO DISCOUNT) AND PRODUCT QTY OF EACH TRANSACTION IS NOT 0. | | DISCOUNT TOTAL AMOUNT (KD1099) SPECIFICATION'S LINE NUMBER = Σ {TRANSACTION QTY UNIT PRICE DISCOUNT AMOUNT (KEC251)} | | WHEN OPERATION IS ACCEPTED, THE OPERATION ACCEPTANCE FLG IS SET. WHEN THE TRANSACTION QTY UNIT PRICE DISCOUNT AMOUNT IS NOT CALCULATED, THE PALLET RESTART PROCESS IS EXECUTED. | |
| 77 | QTY UNIT PRICE TOTAL AMOUNT | KD1857 | | BUSINESS CL. IS ORDER RECEIVE AND PRODUCT QTY OF EACH TRANSACTION IS NOT 0. | | QTY UNIT PRICE TOTAL AMOUNT (KD1857) SPECIFICATION'S LINE NUMBER = Σ {TRANSACTION QTY UNIT PRICE DISCOUNT AMOUNT (KEC201)} | | WHEN OPERATION IS ACCEPTED, THE OPERATION ACCEPTANCE FLG IS SET. | |
| 78 | TRANSACTION TOTAL AMOUNT | KD1854 | | TRANSACTION CL. IS ORDER RECEIVE ONLY. | | TRANSACTION TOTAL AMOUNT (KD1854) =QTY UNIT PRICE TOTAL AMOUNT (KD1851) −DISCOUNT TOTAL AMOUNT (KD1099) | | WHEN THE QTY UNIT PRICE TOTAL AMOUNT AND THE DISCOUNT TOTAL AMOUNT IS NOT CALCULATED, THE PALLET RESTART PROCESS IS EXECUTED. | |
| 79 | QTY PRICE TOTAL AMOUNT | KD1856 | | TRANSACTION CL. IS ORDER RECEIVE AND THE TRANSACTION PRODUCT IS NOT ORDER UNACCEPTABLE THE TRANSACTION PRODUCT QTY IS NOT 0. | | QTY PRICE TOTAL AMOUNT (KD1856) =PRICE (KE1124) +DISCOUNT PRODUCT QTY (KE5001) | | WHEN OPERATION IS ACCEPTED, THE OPERATION ACCEPTANCE FLG IS SET. WHEN THE TRANSACTION PRODUCT IS NOT TRADABLE, MESSAGE cd=4101 IS RESPONDED, AND THE CORRESPONDING PRODUCT CODE FIELD IS DISPLAYED REVERSELY. | |

FIG. 43

| DEFINITIVE NAME | RECEIVED ORDER INPUT (DISTRIBUTION) | DEFINITIVE id | | PALLET CHAIN FUNCTION CL | φ0 | AREA CL. W04 | PALLET id | LA1A1C40 | | |
|---|---|---|---|---|---|---|---|---|---|---|
| | | | K201E | | | | | | TENSE CONTROL VECTOR CL | LOGIC |
| No. | ITEM NAME | ITEM id | OPERATIONAL SIGNIFICANCE CONDITION | | | OPERATIONAL EXPRESSION | | | REMARKS | |
| 56 | TOTAL AMOUNT | A04360 | PRODUCT QTY OF EACH TRANSACTION AND THE UNIT PRICE IS NOT 0. | | | DISCOUNT TOTAL AMOUNT (AD4360)<br>SPECIFICATION'S LINE NUMBER<br>=Σ {TRANSACTION QTY UNIT PRICE AMOUNT (A16721)} | | | WHEN OPERATION IS ACCEPTED, THE OPERATION ACCEPTANCE FLG IS SET.<br><br>WHEN THE TRANSACTION QTY UNIT PRICE AMOUNT IS NOT CALCULATED, THE PALLET RESTART PROCESS IS EXECUTED. | |
| 57 | OPCD | A01540 | UNCONDITIONAL | | | THE CORRESPONDING OPCD MUST EXIST IN THE PERSON IN CHARGE MASTER. | | | WHEN NOT EXISTING IN THE PERSON IN CHARGE MASTER, THE MESSAGE cd=2001 IS RESPONDED, AND THE CORRESPONDING OPCD FIELD IS DISPLAYED REVERSELY. | |
| 58 | OPERATION PERSON IN CHARGE NAME | A01560 | IN THE CASE THIS OPCD EXISTS IN THE PERSON IN CHARGE MASTER | | | OPERATION PERSON IN CHARGE NAME (A01560 of KE201E)<br>=OPERATION IN CHARGE NAME (SN0792 OF PERSON IN CHARGE MASTER) | | | | |

FIG. 44

```
* Not already entered?
IF KD1099 OF EF-AREA=ZERO                    ←①
* Can be induced?
   PERFORM VARYING PI FROM 1 BY 1
       UNTIL PI > 6
     IF TKBN = CNS-EF                        ←⑤
       AND KE5001 OF EF-AREA(PI) NOT = ZERO
       AND KDU360 OF EF-AREA    NOT = "1"
* Can be operated?
       IF KE0251-F OF EF-AREA(PI) = 1        ←②
* Directed process
         COMPUTE KD1099 OF EF-AREA           ←⑥
               = KD1099 OF EF-AREA
               + KEC251 OF EF-AREA(PI)
           ON SIZE NOT ERROR
* The setting of Operation Acceptance FLG    ←③
             MOVE 1 TO KD1099-F
           ON SIZE ERROR
             :
         END-COMPUTE
       ELSE
* Pallet Restart Process
         PERFORM "RESTART-PAL"                ←④
       END-IF
     END-IF
   END-PERFORM
END-IF
```

FIG. 45

| Target Points | | Traditional | LYEE | Effects |
|---|---|---|---|---|
| ① | Improvements in working method | ├─40─┤├──60──┤<br>Design \| Manufacture | ├──40──┤├─0<br>Design \| Manu-<br>　　　　 \| fac-<br>　　　　 \| ture | Short-term development realized: 1/2 - 1/10 |
| ② | Establishment of Quality Concept | ├20┤├──50──┤├─30─┤<br>　　 \| Work logic \|<br>　　 \| produced \|<br>　　 \| by SE \|<br>↗ Work logic by user　↖ Indispensable control logic | ├20┤├─0─┤├─0<br>　　 \| Substituted \|<br>　　 \| by LYEE \|<br>　　 \| theory \|<br>↗ Work logic by user | Compression of the gross development volume: 20% - 80% |
| ③ | Exclusion of Empiricism | Dependent on empiricism | LYEE theory | Enhancement of the maintainability: 40 - 100 times. |
| ④ | Specialization of the Thinking Method | ├10┤├──────90──────┤<br>　　 \| Dependent on \|<br>　　 \| personal \|<br>　　 \| abilities \|<br>↗ TOOL effects | ├10┤├──65──┤├─25─┤<br>　　 \| Substituted \|<br>　　 \| by LYEE \|<br>　　 \| theory \|<br>↗ TOOL effects　↖ Compression of dependency on personal abilities | Enhancement of the work efficiency: 40 - 100 times. |

SOFTWARE PRODUCING METHOD, PROCESSOR, PROCESSING METHOD AND RECORDING MEDIUM

TECHNICAL FIELD

This invention is related to the production method, processor, processing method and recording medium, which are applicable to all business software, games software, and software for all other fields.

BACKGROUND ART

How well the OS or package may be made, they cannot fulfill user's needs by themselves alone. This is because software always contains the part which users have to develop on their own. The important point is that the software production technology must be adopted to the part stated above. Consequently, the production technology must enable to realize such effects as short-term software development, release from maintenance problems, methods of connecting the upper-stream specifications and the program specifications functionally or theoretically, and guaranteeing the program's functional quality.

The traditional method is a functional division method, by which requirement functions are extracted to be made into software. In most cases, however, it is not understood that a supplemental logic will eventually arise from the functional division method. Besides, it cannot go too far by stating that this way of thinking has a fundamental flaw, which causes all software problems to happen. To realize the fundamental improvement of the problems, it is necessary to introduce a new concept or a theory to uni-vocalize the requirement event, thereby replacing the traditional way of thinking.

The inventor has contrived such a theory and named it Lyee (GOVERNAMENTAL METHODOLOGY for SOFTWARE PROVIDENCE). This theory provides the standard of a new handling method for semantics.

The inefficiency of software production maintenance and the instability of the development period directs software production means to a mechanical function packaging method that ignores the specific characteristics of software.

This package itself is also a non-correct solution type in that the package lacks the uni-vocalization. As a result, user's environment is gradually taking a worsening course, as an aspect of reliability, usability, and adaptability (RAS) functions. What is needed at this exact time is to prepare the base for the production.

In this field, a solution to problems of the production technology has not been tried, i.e., without having the method of managing the quality of the program-unit process function, yet it has been insisted that the good software can be decided by its upper-stream only. This is just the reason of abnormality. The software production method is not inherently of characteristic allowing the separation of the upper and lower stream concerns. We must start, however, at the point of grasping it theoretically. The Lyee theory exactly satisfies it.

That is, the purpose of the invention is as follows:
(1) To improve the production ability of software developers and maintenance personnel.
(2) To theoretically connect the upper-stream and lower-stream information.
(3) To provide a program structure applicable to the development for the broad software field including not only business software but also OS, middle software, games software, etc.
(4) To minimize the upper-stream information and to create a source program.

DISCLOSURE OF INVENTION

Title: A Real State of the Software Structure
Fumio Negoro
The Institute of Computer Based Software Methodology and Technology
Chapter 3 Development Methodology This invention is what replaces Lyee with the activity method of the software development. Therefore, this invention directly reflects Lyee. In order to simply utilize this invention's effect, the implementation of works accorded in this invention's algorithm will do. Besides, the work method is simple, so it is not necessary to understand Lyee.

This does not mean that, in order to gain the effect of this invention, the understanding of Lyee is an absolute condition, if you recall the fact that the modern scientific levels have been maintained, although most scientific principles were not fully understood until now. However, it is necessary to understand Lyee if one wishes to get full grasp of why the obtainable effect can be brought about. The essential points of Lyee will be mentioned herein as a help understanding the points above. An official treatise of Lyee would be required to be obtained separately. Lyee is the world-first one that theoretically guarantees the principle of software formation.

In this field, up until now, the software has been produced by the way similar to the way of producing a structure. The present software problem as represented by the productivity, however, and the present countermeasure as represented by the packaging which underlays the problem stated above originate from the lack of recognizing of the event for making software. It is necessary to understand that the software and the structure are different in principle in their way of existence.

An example is explained briefly hereunder.

The requirement event exists intrinsically, and the way of its existence is semantic. In case of the structure, its requirement event can be expressed as a drawing and it can be made into an object by technical means. Both existing ways of a drawing and of an object are extrinsic; the drawing exists as a semantic event and the object as an structural event. Therefore, to bring out reversibly a drawing from an object can be realized at a high performance rate, if not perfectly. This guarantees the theoretical basis of grasping an engineering subject as a relation between the drawing and the object and finding an overcoming means thereabouts;

On the other hand, in case of software, the one equivalent to a drawing is a design document, and the one equivalent to an object is a program. What is different from the structure's case is that an object will also become the same semantic event. This can be easily understood an easy understanding that technical means are difficult to be established thereabouts, if you recall that it is impossible to find a structural relationship between one meaning and the other meaning.

Also, if it is understood that making a design document from a program is difficult, it can be easily presumed that the software problem is a proposition that cannot be grasped only as a relationship between a design document and a program.

From what is set forth above, it is very clear that the software problem is not of characteristic of an engineering, proposition's being able to be overcome by the empirical rule as of the structure. In other words,n as a natural consequence, the software problem will eventually be a proposition that can only be solved by theoretical means.

Lyee considers intrinsic requirement events and extrinsic existence events as events of the same quality.

That is, in the case of taking us as a standard, existence events are meant to be what we are conscious of, which includes universal events, quantum-theory events, biological events, on-earth natural events in the real space where we exist.

In this connection, in Lyee, existence events such as meanings, sounds, fragrances, personalities are intrinsic events, and the sun, drawings, and programs are extrinsic events.

On the other hand, if we are not taken as a standard, for example, as an existence event which we will be able to be conscious of in the future is already an existence event, additional existence events should be in existence. Lyee treats all such events as an existence event.

Lyee is a theory originally established by Fumio Negoro, the inventor of this invention, and it is the theory for elucidating the only one cause of the existence event. If the existence event is rephrased as the real aspect, the only one cause is the true state of things. This work method gives a means for modifying the true state of things into specifications and for making them into software.

The requirement event in the real space will bring forth the diversity. If a space representing its true state is established however, the true state can be obtained as the only one cause.

In Lyee, the spade is called a consciousness space as compared to the real space, and a relation connecting the real space and the consciousness space is called the providence of existence. Different from the real space, there exists no dimensional concept in the consciousness space.

Details are discussed in the Lyee treatise. In brief, Lyee is a theory to grasp the relation.

The formal name of this theory was given as GOVERNMENTAL METHODOLOGY for SOFTWARE PROVIDENCE. Lyee is an abbreviation.

Lyee designates an operator coexisting in the two spaces of the real space and consciousness spade as a significance and quantizes it. Although a means for making it into a quantum significance is not referred to herein, it is called an elementary, which is explained in detail in the Lyee treatise. Theoretically, this elementary is a minute particle having the maximum space with the diameter of 10's minus 100,000 digits.

The elementary builds an additional significance by congregating each other. The congregated elementaries are called a chain. The elementary exists eternally, with no longevity, whereas the chain has its lifetime.; The lifetime is one of the chain's significances. Details are explained in the Lyee treatise.

The elementary, accompanied by its rule (called an elementary rule) and two values (called a significant element), emerges into the idea space for taking a seat. This is the beginning of the formation of the existence event. The two accompanied significant elements are called a Deuteronomous sequence and a time speed, both given by the natural number. However, these values themselves differ from the values ruled by the dimension of the real space. Details are explained in the Lyee treatise.

The elementary rule specifies a space (called a significant space) and the other significant element which rules the elementary, at the same time co-lives in the significant space together with the two accompanied significant elements and the other specified significant element. The elementary exists through such process.

The significance is the minimum element composing an existence event. The significance can be grasped as a meaning in a broad sense. The theoretical elementary (or aspect) cannot be realized as a concrete form. Therefore, in the work method advocated herein, the theoretical elementary is replaced by the words existing in the requirement event. In this connection, terminal information, control telegraphic message, operational button, etc. are also used as a word.

The existence event is what the consciousness space's chain is associated and realized into the real space in conformity of the existence providence. In this connection, we are one of the existence events. In the Lyee treatise, the existence event is defined as a group of unitized event chains. The embodying mechanism is set forth in detail in the Lyee treatise. That is, Lyee correlates the true state and the existence event as having the elementary-chain structure.

FIG. 46 shows a structure model of the idea space created by the elementary which emerges into the idea space. This structure is explained in detail together with FIG. 46 in the Lyee treatise.

In the idea space, the elementary, after being made into a congregation, becomes a chain, thereby enhancing the significance. The chain is classified into an Annunciation chain, a consciousness chain, and an event chain. The build-up mechanism of this chain is explained in detail in the Lyee treatise.

These chains establishes one stream based on the existence providence, and subsequently creates an equivalence chain, which will become an element of the existence event. And, they will develop into a group and be unitized. The unitization is meant to be to become an existence event after being realized in the real space.

FIG. 47 shows a model of the above-mentioned relation. This relation is called a rule structure. The rule structure is explained in detail together with FIG. 47 in the Lyee treatise. In this connection, the scenario function which will be discussed hereafter, represents a structure of the consciousness space grasped from the point of the real space.

Lyee expresses this rule structure by a state expression. This is called an associative equation. The associative equation is not referred to herein, but it is set forth in detail in the Lyee treatise.

The associative equation gives a scheme by which the existence event is constructed based on the existence providence. That is, it grasps a formation relationship between the true state and the existence event. Therefore, when the associative equation is reversibly solved, it is possible to obtain the only one structure which the real space's existence event takes in the consciousness space. That is, it is possible to know what kind of chain the unitized chain group, representing the existence event, will be in the consciousness space.

In Lyee, the existence event was placed on the computer software, and a reverse solution was implemented. The reverse solution is not referred to herein, but it is explained in detail in the Lyee treatise.

FIG. 48 shows a space structure used for the reverse solution. This is called a space paradigm. For the reverse solution of the associative equation, the space paradigm like this becomes indispensable. To mention repeatedly, the space paradigm shown in FIG. 48 is applies only to the case of the event of making software. When the reverse solution is implemented with regard to another event, another space paradigm will be needed.

In the case of the event of making software, the cognizance space will be expressed as three kinds of a two-dimensional surface, and the consciousness space will be expressed as a space created after the two-dimensional surface being synthesized. Then, in the consciousness space there exists an elementary having the consciousness space's significance, and in the cognitive space there exists an elementary having the cognitive space's significance. As the elementary will make chained, and chains created thereabouts will become constructed by the elementary existing in the respective spaces. And, as aforementioned, with this work method, the elementary can be replaced by words. The relation of the word, its chain, and the existence providence, which all exist on this space's paradigm, is expressed as an associative equation, and its reverse solution is to be implemented.

The resulting expression is called a scenario function, which is shown as below.

$$T0=\Phi 0(\{\Phi P\ \{Li,\ 2|\{T1,f\}\}k\}+\Phi P\ \{Li,\ 3|\{T1,\ g\}\}+\{\Phi P\{Li,\ 4\{T1,\ q\}\}k\})$$

The above expression indicates the state which is represented by the software existence event in the consciousness space.

The traditional program takes, from the beginning, an execution-format logical structure. In other words, the traditional software development ends up making a logical structure on which the computer should faithfully operate. The scenario function, however, takes a static structure. And, when this scenario function is made into a program and executed on the computer, the result to be obtained is the same as when the traditional program has been implemented. The structure of the scenario function is fundamentally different from that of traditional program.

The scenario function represents the one and only paradigm ruling the software event of the computer. In other words, any computer software can be realized by using this function. This, too, is the world-first one.

The Scenario function's expression method $\{\alpha\}$ indicates a congregation body of the grouping element $\alpha$.

Explanation of the items of the Scenario Function
01. Definition of screen main W02 pallet having identifier k: $\Phi P\{Li,2\{T1,f\}\}k$
02. Definition of main W02 pallet having a screen identifier k: $\Phi P\{Li,4\{T1,q\}\}k$
03. Definition of the main W03 pallet (only one): $\Phi P\{Li, 3\{T1,g\}\}$
04. T0 is a scenario function ruling the main pallets W02, W03, and W04
05. Scenario function ruling the subordinate pallet of the object file f, which occurs in the main W02 pallet: $T1,f,2= \Phi 1(\Phi P\{Li,2\}f+\Phi P\{Li,3\}f+\Phi P\{Li,4\}f)$
06. Scenario function ruling the subordinate pallet of the object file g, which occurs in the main W03 pallet: $T1,g,3= \Phi 1(\Phi P\{Li,2\}g+\Phi P\{Li,3\}g+\Phi P\{Li, 4\}g)$
07. Scenario function ruling the subordinate pallet of the object file q, which occurs in the main W04 pallet: $T1,q,4= \Phi 1(\Phi P\{Li,2\}q+\Phi P\{Li,3\}q+\Phi P\{Li,4\}q)$ The three kinds of the two-dimensional surface expressing the real space were discussed previously, and the pallets with the two-dimensional surface are expressed by the symbols W02, W03, and W03, respectively. On the pallet, a base logic and a scenario function of the object file are installed. The main and subordinate pallets take the same structure, but there are differences as follows. The number of words of main pallets W02, W04 having screen identifier k is the same as the number of words existing in the screen identifier k. The number of words of the main W03 pallet is the same as the number of words satisfying all the events. On the other hand, the number of the words of the subordinate pallets for W02, W03 and W04 are all the same, which equals to the number of all the words satisfying the object files. T0 is a program to process the on-line software event, and T1 is a program to rule the off-line software event. T1 can be assembled into T0 as shown by T0, whereas it can also be independent.

To mention a relative relation between Lyee and the traditional program, the pallet can be understood as resembling the program. However, the scenario function is a concept to grasp the software event, so it is a paradigm which can grasp one subsystem, one function, or one traditional program, or all existing software events, by the only one function.

08. $\Phi 0$ is a program to control the execution order of the main pallet, and it is called a pallet chain function. FIG. 19 indicates its logical structure.
09. Li, j is a program to be decided by the word identifier (i) and the pallet identifier (j), and it is called a tense control vector. Its structure is shown in FIGS. 12, 13, 14, 16, and 17.
10. $\Phi p$ is a program to group the tense control vector with j and k, and it is called a pallet function.
Its structure is shown in FIG. 18.
11. $\Phi 1$ is a program to control the execution order of the subordinate pallet, and it is called a pallet chain function. Its structure is shown in FIG. 15.

The structural specifications of the program composing the scenario function is an accumulation of solution conditions emerging during the process of inducing the scenario function. This is nothing but the grounds endorsing an advocacy that the software can be created by theory.

To proceed with practical works, a homogeneity map is produced. The homogeneity map is a diagram abbreviating a scenario function by the way stated below and the map is to grasp the relation between the pallet chain function and the definitives (screen, voucher, secondary memory file). That is, $$T0=\Phi 0\{\{i,2\}\}k+\{i,3\}\}+\{\{i,4\}\}k)$$

$\{\{i,2\}\}k$, $\{i,3\}$, $\{\{i,4\}\}k$ are tense control vectors, expressing a pallet not inclusive of T1.

That is, in Lyee, the screen, voucher and file are called definitives, and it expresses the relationship between their identifiers and the pallet chain function. The information amount exhibited by the homogeneity map is equivalent to 70% of the information amount included in the whole of what are called requirement definition, basic design, detailed design, program specifications; test specifications and operational manuals in the traditional method. If this advocated work method is utilized with this concern, the documentation work is decisively reduced, cutting down to approximately a one-twentieth.

What is called the tense control vector in this theory can be created from the homogeneity map and the function of words belonging to the definitive. As already referred to, in case of Lyee, six or five pieces of the tense control vector can be created from one word, and this corresponding relation is the one and only method of realizing a complete independence of the tense control vector. This context is explained in the Lyee treatise in detail. There will be no other means to actualize a complete software componentization. The traditional way of componentization has been simply a functional partialization, and as a consequence, a strict sequence must humanly be attached to its logical chain. The effect of the componentization cannot be obtained from such structure.

The tense controlvector is a general nomenclature of the duplicate vector and the homogeneity vector. And, the user's logic can be fulfilled only by building up this tense control vector. As already mentioned, the documented material amounting to 1,000,000 lines, 100,000 pages, which are common in the traditional method can be decisively eliminated.

The tense control vector is identified by a classification between the homogeneity vector and the duplicate vector, a word identifier, an identifier of definitive to which it belongs and a pallet identifier, and it is grouped by the pallet function based on the identifiers.

The pallet is a body of a group of the tense control vector, and at the same time, it is a body of a group of the data area whose address is the identifier.

The tense control vector creates only a self data by its logic, and it is a program to actualize the function of setting the self data into the self's data address.

In case of the homogeneity vector, by using only data in the data area of a pallet to which it belongs, it creates self's data by its logic and sets it into self's address.

In case of the duplicate vector, it phase-shifts data from the data area of the W02 pallet of the self screen shown by the homogeneity map to self's address. The address of the obtained data area is limited to the address of the same word identifier. The nearest pallet is crystalized as the one and only. If no data exists in the data area of the W02 pallet, the data in the W03 pallet data area of the self word of the self screen phase-shifted. If no data exists in either pallet, the duplicate vector is not justified.

In this connection, in case of a system with the scale of 1,000,000 lines, the approximate number of words appearing thereabouts is 2,000. In this instance, the number of the tense control vector built up by users will be 10,000 pieces. The average number of logical lines is to at least and 20 at most per tense control vector: the average number of logical lines for the case above will be 100,000 at least and 200,000 at most.

As the logic of the tense control vector is simplified, the productivity can remarkably be enhanced, resulting in 10,000 to 50,000 lines/man-month. The total of works is ten to twenty man-months.

The data set established in the tense control vector always comes to a state to be homogenized. This is a feature that is performed by the tense control vector.

The concept of data homogeneity is a concept which one should mention as a principle of simplifying software events to the greatest extent. It is what was won by Lyee. That is, when we observe what we call a function from the point of data homogeneity, the function is deducted to be a chain of non-homogeneity data. And, if one recollects that the creating a logical function from the requirement event leads to dividing the meanings and that the division of meanings is an impossible task, it can be easily imagined that the working method so far which has been realizing the functionalization by using this way of dividing meanings equals to what causes the thermal death as explained by the second law of thermodynamics.

Although figurative, it is the most suitable to entrust users with the event of making software, not with experienced SEs. This is because the sincerer SEs with abundant experience are more likely to create the thermal death. The situation that the productivity of this filed shows a year-wise drop is attributed to this reason.

The only means to avoid it is a data homogenizing concept. This concept is explained in detail in the Lyee treatise. In other words, the scenario function is to regulate the logical structure building up a group of data to be homogenized. And, repeatedly, it can be stated that when it is executed on the computer, a chain of non-homogeneity data, that is, a function, will be created.

Therefore, only the homogeneity data will do for the requirement event to establish the scenario function.

As understood well by the after-mentioned example, the reason why this working method defines the requirement event is fully satisfied only by the definitive and its words is that the scenario function takes the structure which is fulfilled only by those.

Theoretically, no logic exists between the homogenized data group each other, but only a memory activity with no logical sense will be generated. That is, no function other than a memory activity cannot exist thereabouts. This is explained in detail in the Lyee treatise.

It is from this reason that the volume of the program to be developed by this work method can be reduced to one-fifth those developed by the traditional method.

All mentioned above is an outline of the relationship between the Lyee theory and the present invention. The Lyee theory does; not cause the gap between actual development work and the theory. It has its strict influence upon even one line of the program comprising the scenario function, and accomplishes creating a logical structure unprecedentedly good not only as the source program standard but as the execution type.

-COMPLETE-

FIG. 47 Supplemental Explanation

01. The grouped consciousness elementaries make a row in the ascending order of its time speed.
02. The grouped cognition elementaries make a row in the descending order of its significant space size.
03. The chain internally contains the time providence (growth time, grouping time, chain time, transition time, life time, transposition time, recurrence time).
04. The interval value between Deuteronomous sequences whose elementarie's are neighboring each other is called a deutoronomous time of the latter elementary.
05. The chain built up as a complementary relationship expresses a transition of chain.
06. The consciousness chain is all made anew every time the distribution structure is rebuilt.
07. As for the cognition chain, only the cognition chain to be affected is dissolved when the convergence structure is rebuilt.
08. The significance which bases elementary are a Deuteronomous sequence and a time speed.
09. The chain is composed of an elementary's partial set, the elementary's permutation, and an equivalence elementary.
10. The equivalence elementary expresses a significant space of the chain.
11. A set of the consciousness chain's significance space is called a consciousness space.
12. The cognition chain is a generalized term for an Annunciation chain, an event chain and an equivalence chain.
13. A set of the definite chain's significant space is called an Annunciation space.
14. A set of the event chain's significant space is called an event space.
15. A set of the equivalence chain's significant space is called an equivalence space.
16. The elementary rule activated by the distribution rule builds up a consciousness elementary's partial set.
17. The elementary rule activated by the convergence rule builds up a cognition elementary's partial set
18. A rule created by the consciousness elementary's partial set is called a consciousness rule.
19. A rule created by the cognition elementary's partial set is called a cognition rule.

20. The consciousness rule activated by the distribution rule builds up a consciousness chain.
21. The Annunciation rule is activated with the contingency by a Annunciation rule in a broad sense and builds up an Annunciation chain.
22. The event rule is activated by the consciousness chain and builds up an event chain.
23. The event chain is a broadly-meant event rule and builds up an equivalence chain.
24. The equivalence chain is a breakup of the event chain.
25. A plurality of equivalence chains constructed by one event chain being split have been homogenized with the event chain.
26. The homogeneity of the equivalence chain constructed of two event chains are inconstant.
27. An equivalence chain activated by a broadly-meant equivalence rule makes equivalence chains grouped.
28. The rule created by the grouped equivalence chains will unitize them by the contingency.
29. The unitization means that a set of equivalence chains are materialized into phenomenon.
30. The existence providence means a stream as follows: definite chain→consciousness chain→event chain.
31. When the relationship between the recurrence=the equivalence elementary's diameter ($R_K$) of the definite chain and the equivalence elementary's diameter ($R_W$) of the consciousness chain is expressed as $$R_K \geq R_W,$$

the relationship between $R_W$ and the equivalence elementary's diameter ($R_C$) of the event chain built by the consciousness chain's associating is expressed as $$R_C \geq R_W$$

and,
if, in this instance, there exists an elementary α in the convergence structure, wherein α satisfies unequation $$R_C > R_\alpha > R_W,$$

then the elementary α can be replaced by α elementary of the distribution structure by gaining a new time speed.
32. The transposition means that a middle-point elementary is replaced by a cognition elementary due to a new consciousness elementary's appearance or recurrence.
33. The reverse transposition means a reverse action of transposition.
34. The associative equation is what expresses existence providence by logical structure.

BRIEF DESCRIPTION OF DRAWINGS

FIG. 2 indicates a screen on which to enter sales data.
FIG. 3 indicates a screen on which to refer the customer code.
FIG. 4 indicates a screen on which to enter the confirmation of arrival of goods.
FIG. 5 indicates a screen on which to refer to the warehouse code.
FIG. 6 indicates a screen on which to instruct the output of the delivery request list.
FIG. 7 indicates a voucher of the delivery request list.
FIG. 8 indicates a voucher of the delivery request list.
FIG. 37 indicates one example of the voucher defining specifications.
FIG. 38 indicates one example of the file defining specifications.
FIG. 42 indicates one example of the tense control vector specifications.
FIG. 43 indicates one example of the tense control vector specifications.

FIG. 44 indicates one example of programming of the tense control vector specification.

FIG. 45 is a drawing to explain the effects of the present invention.

THE BEST MODE FOR CARRYING OUT THE INVENTION

Figure 1:
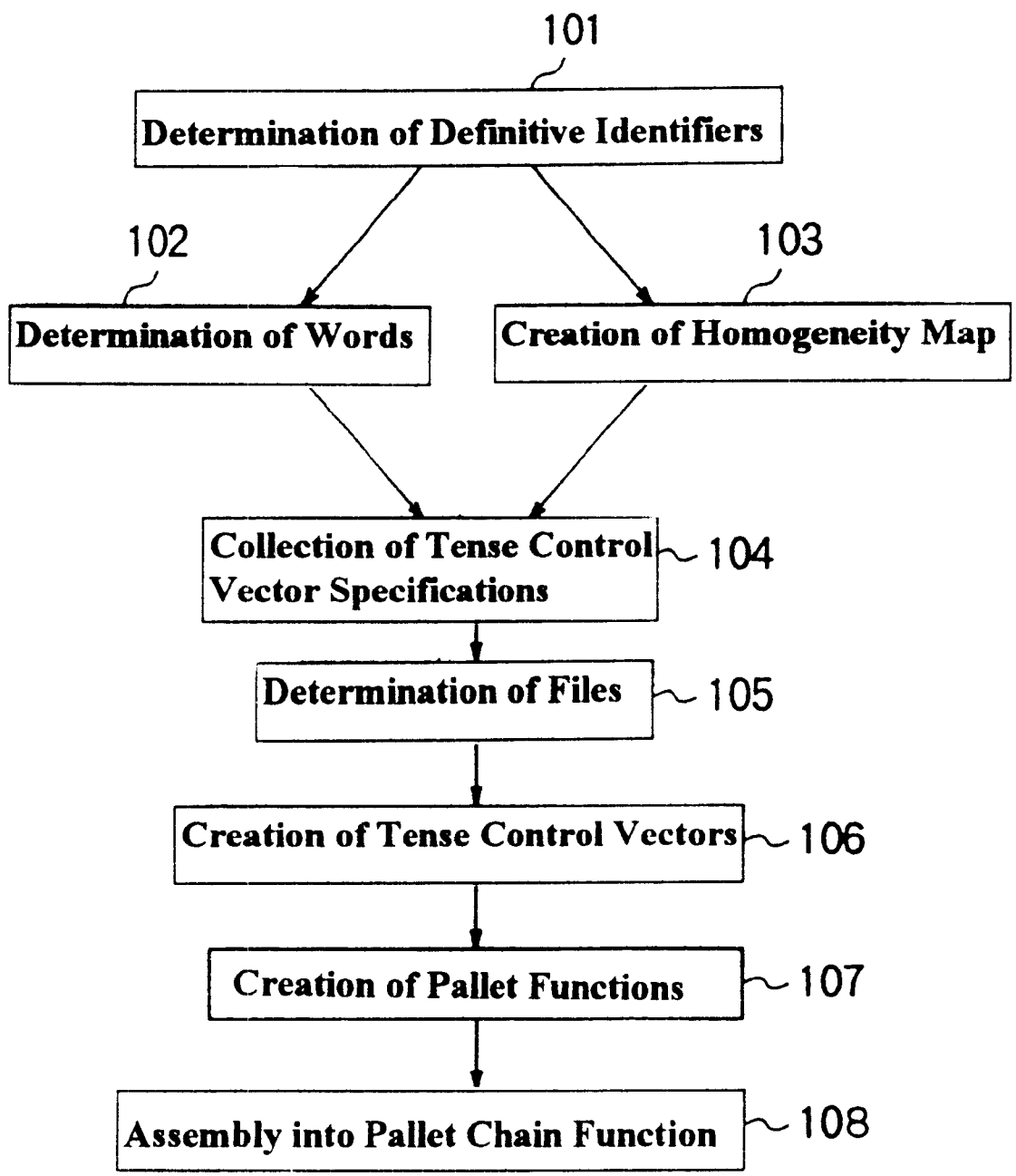
FIG. 1 indicates the work process according to the present invention.

That is, in this invention, it is the first thing to determine definitive identifiers for identifying definitive including a screen, a voucher and a file necessary for the software to be produced. The second thing is to sort out words existing in the screen as well as to make a homogeneity map, in which pallets that are all logical units necessary for the software are to be plot in accordance with a predetermined rule, based on the definitive identifier. The third thing is to determine necessary files based on the sorted-out words and the homogeneity map made. The fourth thing is to make a first tense control vector, a second tense control vector, and a third tense control vector where the first tense control vector operates either one of the followings for every screen and for every word belonging to the screen: to do nothing in case data exists in a self word's first data area, or to create data in the self word's first data area in case data does not exist in the self word's first data area while setting a first restart flag when such creation is impossible, where the second tense control vector operates either one of the followings for every screen and for every word belonging to the screen: to do nothing if there is no data for the self word in the data received from the screen, or if there is a data for the self word in the data received from the screen, to do either of the followings: in case of a non-control word, setting the data in a self word's second data area while setting a second restart flag when the data setting is not precisely accomplished, and in case of a control word, determining a homogeneity route in accordance with a nature of the self word while setting the second restart flag when the determination of the homogeneity route is not precisely established; and where the third tense control vector operates either one of the followings for all words belonging to all definitives necessary for the software: to do nothing in case data exists in a self word's third data area, or to create data in the self word's third data area in case data does not exist in the self word's third data area while setting a third restart flag when such creation is impossible. The fifth thing is to make a first, a second and a third pallet functions, where the first pallet function executes for every screen, for all words belonging to the screen, irrespective of:the sequence of the words, the first tense control vectors, each of which corresponds to every word belonging to the screen, while re-executing all the first tense control vectors for every word belonging to the screen when the first restart flag is set after such execution, where the second pallet function executes for every screen, for all words belonging to the screen, irrespective of the sequence of the words, the second tense control vectors, each of which corresponds to every word belonging to the screen, while re-executing all the second tense control vectors for every word belonging to the screen when the second restart flag is set after such execution, and where the third pallet function executes, for all words belonging to the definitives, irrespective of the sequence of the words, the third tense control vectors, each of which corresponds to every word belonging to the definitives, while re-executing all the third tense control vectors for every word belonging to the definitives when the third restart flag is set after such execution. The final thing is to assemble the first, the second and the third pallet functions into a pallet chain function, where the pallet chain function executes the first pallet function, transmits data resulted from the execution to a screen, receives the data from the screen to execute the second pallet function, and, based on this execution's result, selectively executes the third pallet function in accordance with the homogeneity route determined by the second tense control vector.

In the following, in order to explain the present invention in detail, the explanation is presented in accordance with the attached diagrams.

FIG. 1 indicates the work process implemented by the present invention.

That is, in the present invention, a desired software can be created by the following steps: to decide the definitive identifier (step 101); to decide words (step 102) as well as to create the homogeneity map (step 103); to collect the tense control vector specifications (step 104); to decide the file (step 105); to make the tense control vector (step 106); to make pallet function (step 107); and to assemble them into the pallet chain function (step 108).

Determination of the Definitive Identifier

For example, in the case of creating software called "sales entry," which is for inputting sales data in a certain corporation, the screen (FIG. 2) on which to input sales data and the screen (FIG. 3) on which to refer the customer codes are to be decided. Further, with the tense control vector, there are five (or six, in some case) tense control vectors corresponding to each of these words. Not only the customer code reference screen but also such screens can also be set if needed as a staff code reference screen, a dealing classification reference screen, billing-to codes reference screen, product codes reference screen, etc., similar to the screen stated above.

Also, in the case of creating software called "arrival confirmation" which is for inputting the confirmation of product arrivals in the other company, the screen (FIG. 4) on which to input the confirmation of the product arrivals and the screen (FIG. 5) on which to refer the warehouse codes are to be decided.

Also, in the case of creating software called a "delivery request list" which is for outputting a list of product delivery requests in the other company, the screen (FIG. 6) in which to control the output of the delivery request list and the list's vouchers (FIG. 7, FIG. 8) are to be decided.

Determination of the Word

The determination of the word means to sort out all the words from the above-decided screens and vouchers.

For example, in FIG. 2 screen which is for the "sales entry," the following words can be sorted out:

OPCD

Sales No.

Sales Classification

Sales Date

Customer

Payment Due Date

Billing Destination

Consumption Tax

Staff in Charge

Slip-base Order No.

Delivery Location
Phone Number
Remarks
Product Codes
Quantity
Unit Price
Discount
Amount
Product Name
Type of Machines/Media
Article Number
Sales Total
Consumption Tax Total
Discount Total
Sum Total
Execution
F1
F3
F4
F8, and these are the determined words.

Also, in the above customer code reference screen of FIG. 3, although not illustrated, there are such words as follows:
No.
Customer
Customer (abbreviation)
Customer Name
Address
Staff in Charge
Selection No.
Customer Name in katakana
Old Code
Execution
F12

The determined words are what were sorted out from these words.

Also, in the above "arrival confirmation entry" screen of FIG. 4, although not illustrated, there are such words as follows:
OPCD
Warehouse Codes
H/S Classification
Usher Classification
Execution
F1
F3
F4

The determined words are what were sorted out from these words.

Also, in the above "arrival confirmation entry" screen of FIG. 5, the following words can be sorted out:
No.
Warehouse Codes
Warehouse Name
Selection No.
Execution
F12 and these are the determined words.

Also, in the above "delivery request list" screen of FIG. 6, the following can be sorted out:
Delivery Request Date, Execution
F2
F3 and these are the determined words.

Also, with the vouchers of the above "delivery request list" of FIG. 7 and FIG. 8, the following can be sorted out:
Department
Delivery Destination
Billing Destination
Address 1
Address 2
Phone Number
Dept. 1
Staff in Charge
Staff in Charge of Store
Delivery Request Date
Delivery No.
Product Code
Product Name
Quantity
Update
Order Receive Date
Order Receive No.
Line
Staff in Charge of Order Receiving
Article Number
Date
Your Company's Order No.
Inst.
City
Delivery
Sales For every word of these words, there are five (six, in some case) tense control vectors corresponding to it.

Making of the Homogeneity Map

The homogeneity map is made based on the determined definitive (screens or vouchers) identifier. The homogeneity map may be made by a worker or be automated mechanically. On the homogeneity map, pallets (indicated with a box) corresponding to each screen and each voucher are connected each other with lines, and the connection accords with the regulation of the pallet chain function. The line means the pallet chain function. If screens and vouchers have already been determined, the connections between pallets are to be necessarily determined.

Figure 9:
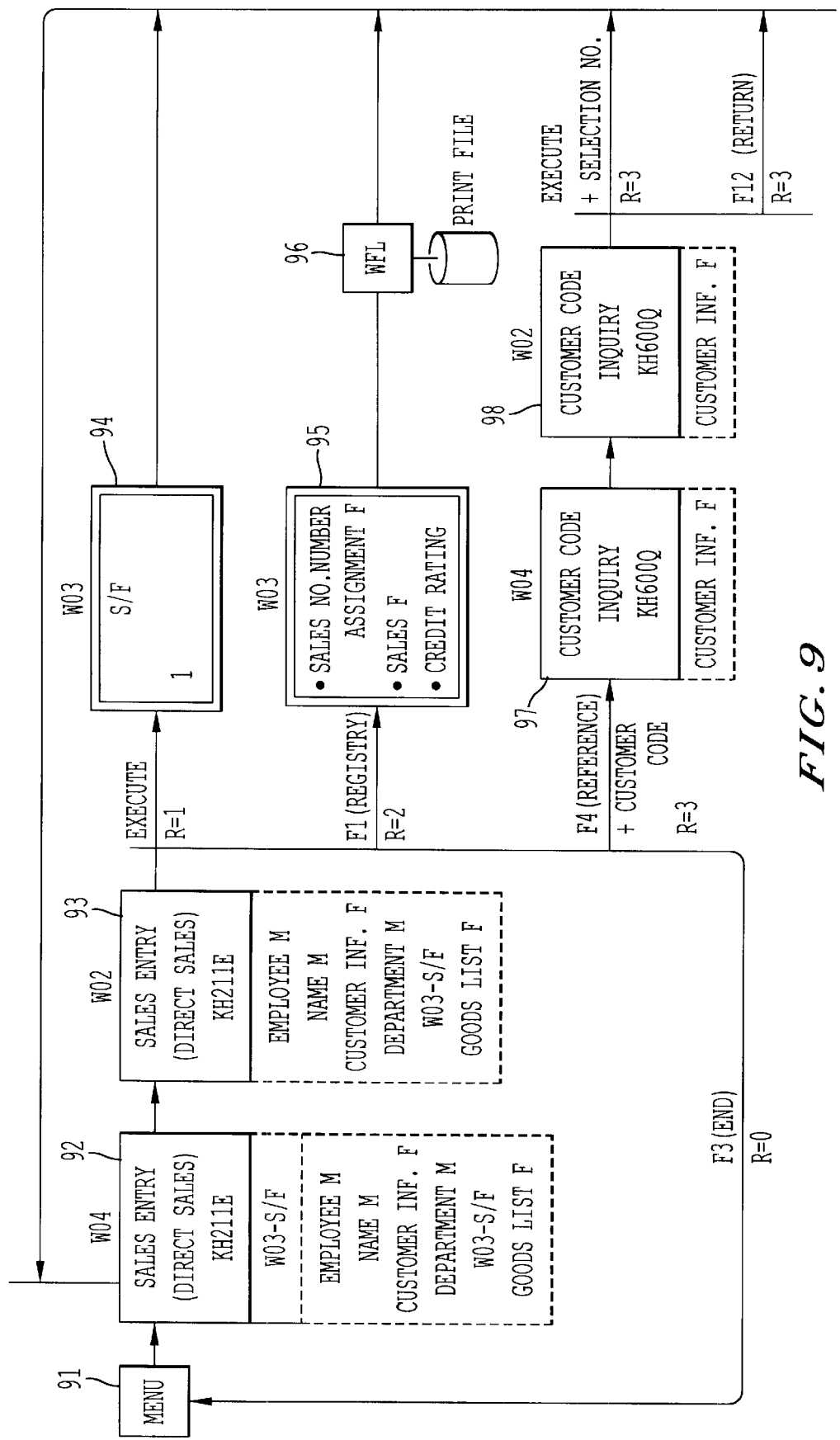
FIG. 9 indicates a homogeneity map for the "sales entry".

The FIG. 9 is a homogeneity map for the above "sales entry."

91 is a menu screen. One can select "sales entry" from the menu screen.

92 is the W04 pallet for the screen (FIG. 2) on which to enter sales data, whereas 93 is its W02 pallet.

94 is the W03 pallet at the time when "execution" has been selected in the screen on which to enter sales data.

95 is the W03 pallet at the time when "registration" has been selected in the screen on which to enter sales data. The WFL (Work File Area) 96 means to write data onto a file.

97 is the W04 pallet for the screen (FIG. 3) at the time when "reference" of "the customer code" has been selected in the screen on which to enter sales data, whereas 98 is its W02 pallet.

When "end" is selected in the screen on which to enter sales data, it returns to the menu screen.

In each pallet, the following are described: the kind of pallet (in the upper part outside the box); the name of screen (in the upper part inside the box); the screen identifier (in the lower part inside the box); and the determined file name (discussed later) (in the dot-line box in the lower part outside the box).

Above the line connecting pallets, the name of buttons (such as "execution" and "registration") are described, and below the line is described, the absolute classification of the process (R0–R5)(discussed later).

Figure 10:
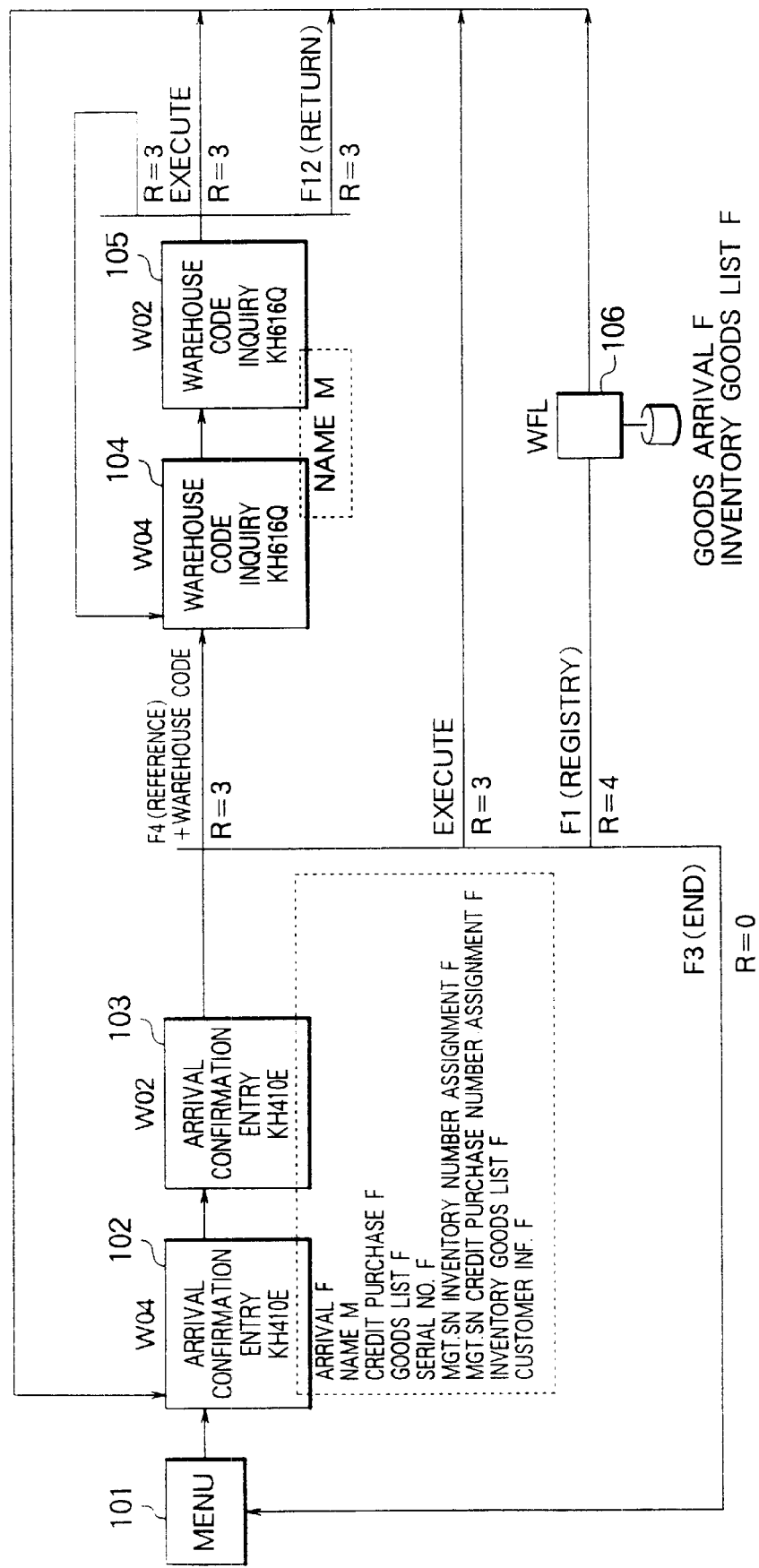
FIG. 10 indicates a homogeneity map for the "arrival confirmation entry".

FIG. 10 is a homogeneity map for the above "arrival confirmation entry."

101 means a menu screen, on which "arrival confirmation entry" can be selected.

102 is the W04 pallet for the screen (FIG. 4) on which to enter arrivals confirmation, whereas 103 is its W02 pallet.

104 is the W04 pallet for the warehouse codes reference screen (FIG. 5) at the time when "reference" of the "warehouse codes" has been selected in the screen on which to enter arrival confirmation, whereas 105 is its W02 pallet.

When "execution" is selected in the screen on which to enter arrivals confirmation, it returns to the screen on which to enter arrivals confirmation.

When "registration" is selected in the screen on which to enter arrivals confirmation, the data is written onto a file via the WFL (Work File Area.) 106.

Figure 11:
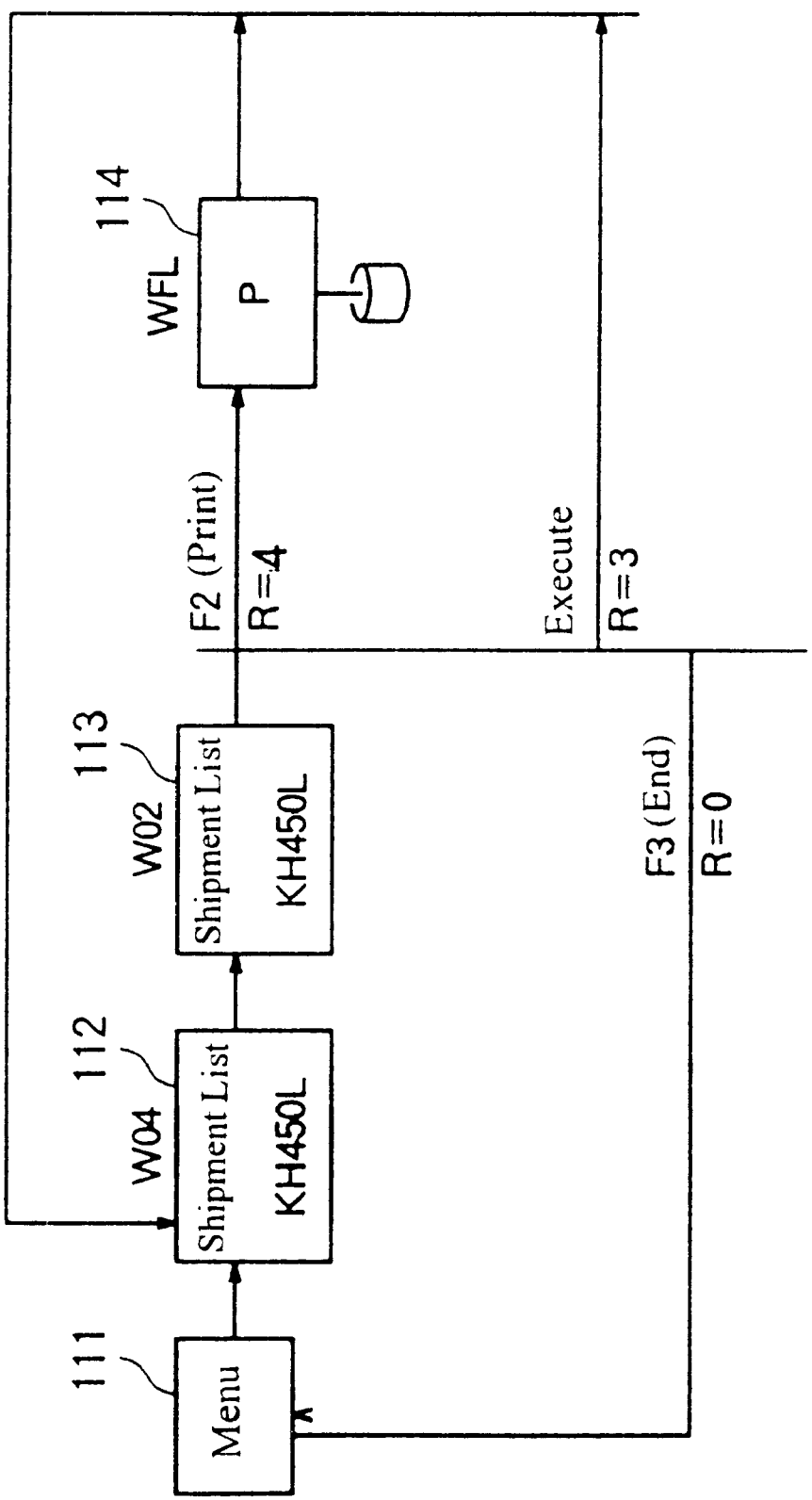
FIG. 11 indicates a homogeneity map for the "delivery list".

When the "end" is selected in the screen on which to enter arrivals confirmation, it returns to the menu screen. FIG. 11 is a homogeneity map for the above "delivery request list."

111 is a menu screen on which "delivery request list" can be selected.

112 is the W04 pallet for the screen (FIG. 6) on which to output the delivery request list, whereas 113 is its W02 pallet.

When "print" is selected in the screen on which to output the delivery request list, the vouchers are output (printed) via the WFL (Work File Area) 114.

When "execution" is selected in the screen on which to output the delivery request list, it returns to the screen on which to output the delivery request list.

When "end" is selected in the screen on which to output the delivery request list, it returns to the menu screen.

In the homogeneity map, as explained above, for example, if a certain screen has been determined, the process to be followed (such as display of screen, output of voucher, writing onto file, reading from file, operation) will be inevitably determined based on the contents of process of the screen (control words such as execution and registration), so that definitives such as screens are connected with lines in accordance with the above-mentioned contents of the process.

Determination of the File

Necessary files are determined based on the homogeneity map made and the words determined. That is, a necessary file can be inevitably determined from the homogeneity map and the word. A determined file is described in the appropriate lace such as the dot-line box in the lower part outside the box of the homogeneity map.

For example, in the W02 pallet indicated by the code 93 of FIG. 9, it is consequently known, from the homogeneity map and the words, that the following files are necessary:

Employee M (master file)

Name M

Customer Information F (file)

Department M

W03-S/F

Product List F.

Creation of the Tense Control Vector

A tense control vector (program) for each word is to be made. That is, a tense control vector for each word is to be coded.

In the tense control vector, there are the following six kinds:

W04 duplicate vector

W04 homogeneity vector

W02 duplicate vector

W02 homogeneity vector

W03 duplicate vector

W03 homogeneity vector

These six kinds of the tense control vector (program) are to be created for every word. In some case, however, the W02 duplicate vector is not necessary.

For example, a sample for making the tense control vector is explained herein, focusing on the word "sales" on the "Sales Entry (Direct Sales)" screen 92 as shown by FIG. 9.

Figure 12:
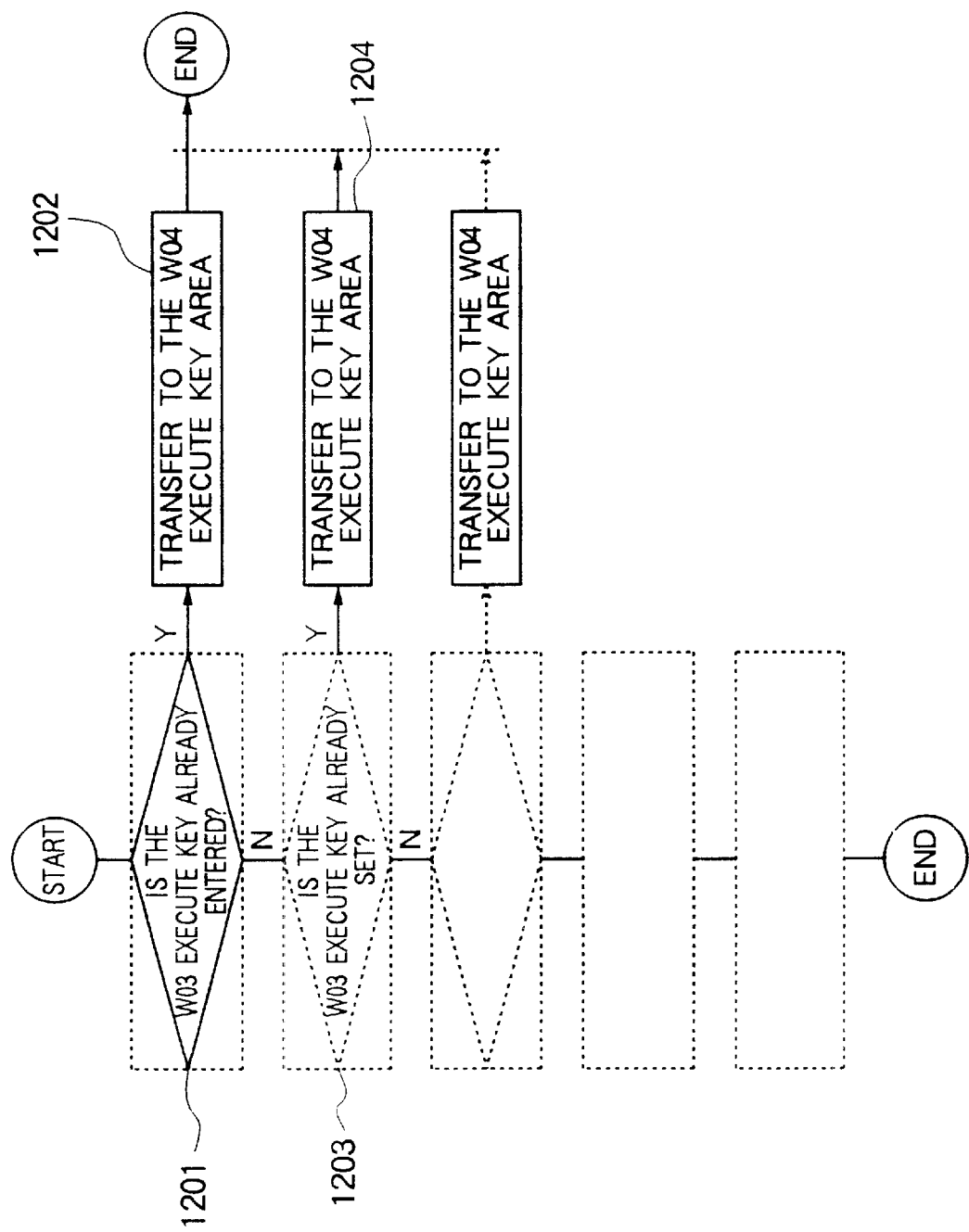
FIG. 12 indicates one example of the W04 duplicate vector.

The W04 duplicate vector is to be made as shown in FIG. 12.

First, the vector should have the logic to make judgment whether a data exists or not in the W02 data area of the word "sales data" of the screen 92 of FIG. 9 (step 1201). If it exists, the vector should have the logic to make a copy of the data into the W04 data area of the word "sales data" of the screen 92 of FIG. 9 (step 1202), thereby ending a process of the tense control vector.

If the data does not exist there, the vector should have the logic to judge whether a data exists or not in the W03 data area of the word "sales data" of the screen 92 (step 1203). If it exists, the vector should have the logic to make a copy of the data into the W04 data area of the word "sales data" of the screen 92 (step 1204), thereby ending a process of the tense control vector. If the data, does not exist at step 1203, the vector should have the logic to end the process of the tense control vector.

What is important is that for any words, programs are to be made with always the same structure as the one'stated above, which also applies to the following programs.

Figure 13:
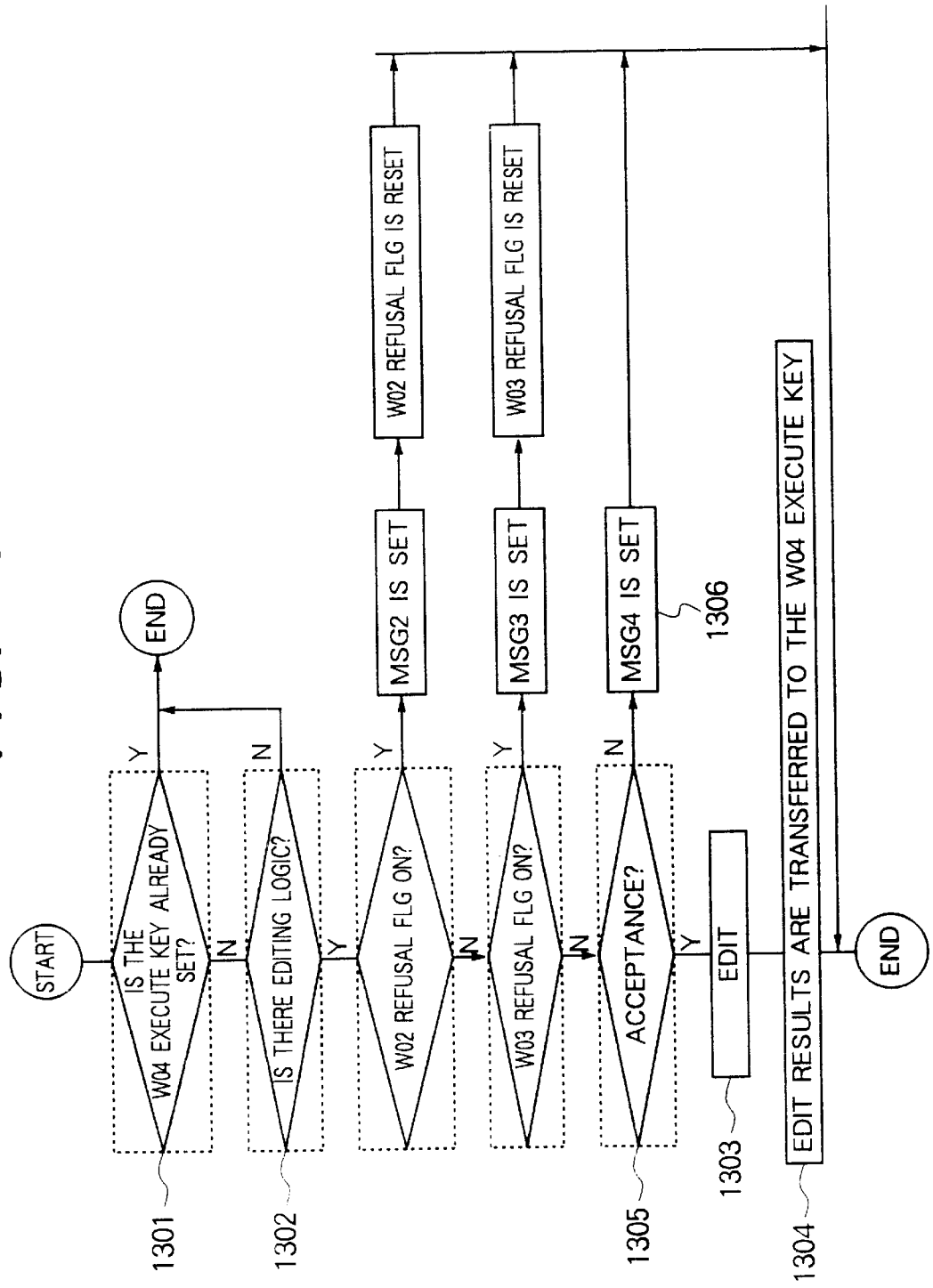
FIG. 13 indicates one example of the W04 homogeneity vector.

The W04 homogeneity vector is to be made as shown in FIG. 13.

First, the vector should have the logic to make judgment whether a data has already been set into the W04 data area of the word "sales data" on the screen 92 of FIG. 9 (step 1301). If the data has already been set, the vector should put an end to the process of the tense control vector.

If the data has not been set yet, the vector should have the logic to judge whether a data in the W04 data area of the word "sales data" on the screen 92 of the FIG. 9 can be edited or not by a data of any word including self or others in the W04 (step 1302). That is, for example, assuming that the data of the word "sales value" on the screen 92 of the FIG. 9 is calculated by the operation: "the price"×"the number of pieces", the vector should, as the data of the word "sales value" is editable if both the data of the word "price" and the data of the word "number of prices" exist, edit the data, (for example, the vector is to compute the data of the word "sales data" from the data existing in the W04 data area of the word "price" and the data existing in the W04 data area of the word "number of pieces" by using the operation above)(step 1303), and set the edited result (that is, the obtained data of the word "sales value" for the example above) into the W04 data area of the word "sales data" (step 1304), thereby patting an end to the process of the tense control vector.

When the data is judged to be not editable at step 1302, the vector should have the logic, if necessary (step 1305), to set a flag for reactivating the tense control vector, i.e. a restart FLG of W04 of the word "sales data" (step 1306). Therefore, the determination of the data of the word "sales value" is once reserved: for the above-mentioned example, the determination of the data is reserved until a data in the W04 data area of the word "price" and a data in the W04 data area of the word "number of pieces" are each set by the execution of the corresponding tense control vector, respectively. This means nothing but that the program stated in the present invention autonomously determines the significance.

Figure 14:
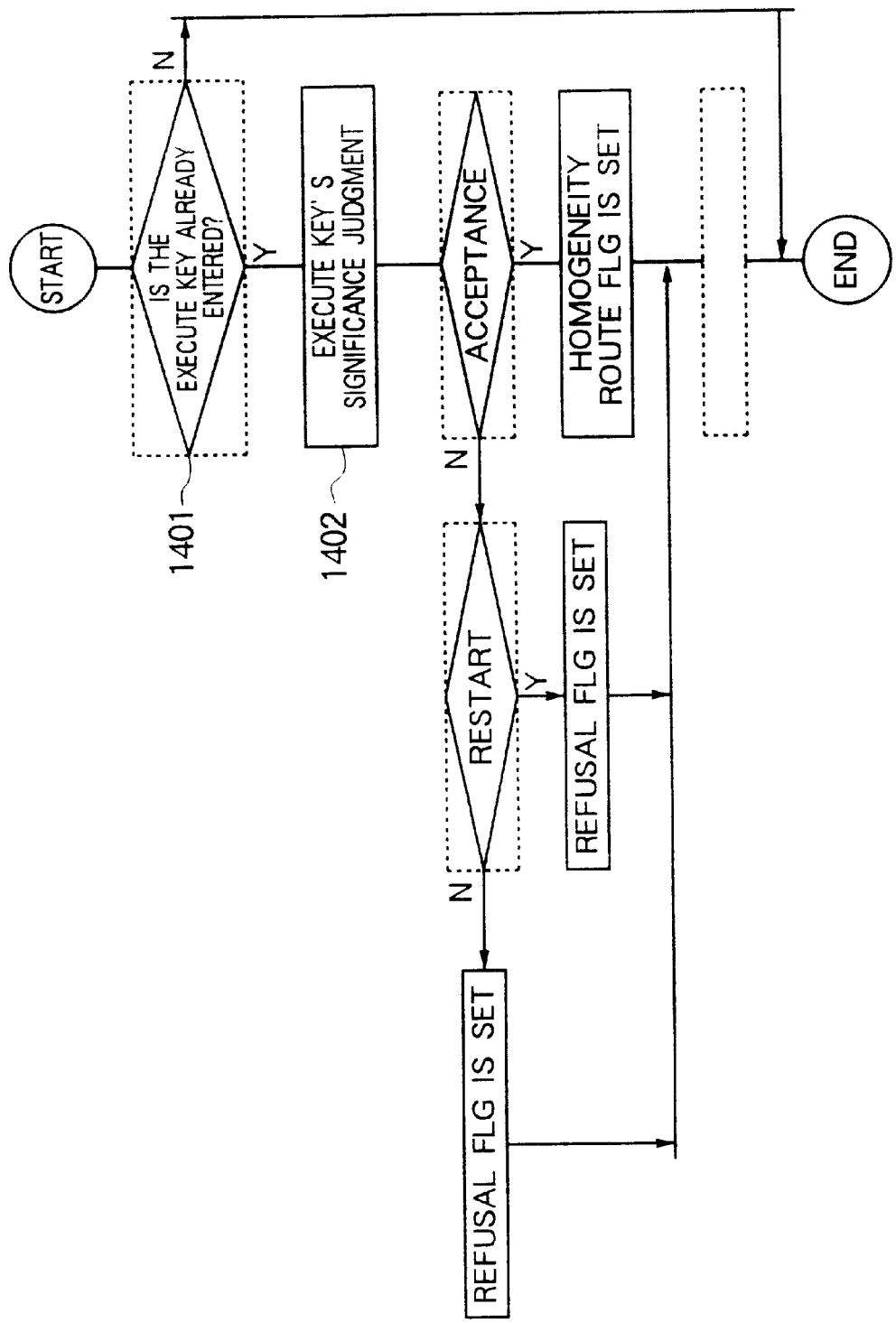
FIG. 14 indicates one example of the W02 homogeneity vector.

The W02 homogeneity vector is to be made as shown in FIG. 14.

Figure 23:
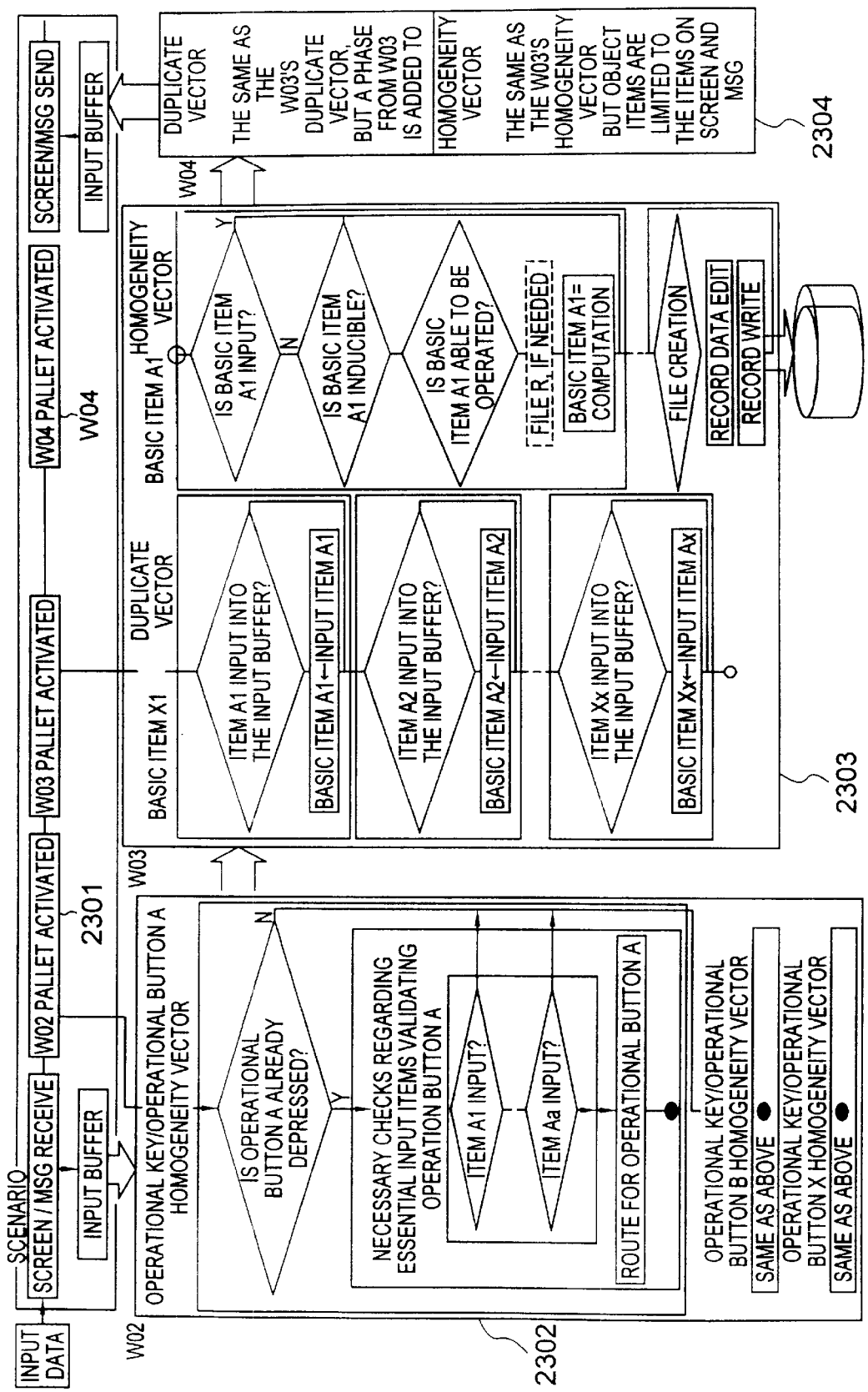
FIG. 23 indicates a logic paradigm of the tense control vector.

First, the vector should have the logic to make judgment whether a data is already set or not into the input buffer (for example, the address having the identifier of; the word "sales value", which belongs to the buffer area for outputting the data input by "Screen/MSG Receive" in the Scenario of FIG. 23 onto the "W02") (step 1401). If it is not yet set, the vector should put an end to the process of the tense control vector.

If the data is already set, the vector should have the logic to perform a directed process. Here, the "directed process" is meant to be, as stated above, a setting of the homogeneity route FLG in case of a control word, or a setting the data in the input buffer onto the W02 data area of the corresponding word in case of a non-control word: In this context the word "sales value" to be targeted is not a control word, so that the vector should make, as the directed process, a setting the data in the input buffer onto the W02 data area of the word "sales value".

Then, the vector should confirm whether the directed process is accomplished or not (step 1403). If the directed o process has not been accomplished and if it is necessary to set the W02 restart FLG of the word "sales data" (step 1404), then the vector should set the restart FLG (step 1405), thereby putting an end to the process of the tense control vector.

If it is unnecessary to set the restart FLG at step 1404, the vector should have a logic to set the W02 refusal FLG of the word "sales data" (step 1406), thereby putting an end to the process of the tense control vector.

If the directed process is accomplished at step 1403, then the vector should have a logic to put an end to the process of the tense control vector without doing anything.

Further, for example in the case of the control words such as the "execute key," the above-mentioned step 1402 will become a process for setting a homogeneity map flag. The homogeneity map flag (R=0–5 however, R=0 is exceptional) is uniquely determined in accordance with the nature of the control word and the flag is displayed on the homogeneity map. By this homogeneity map flag it becomes possible to process distributing the homogeneity routes in the pallet chain function, as will be discussed later.

Figure 16:
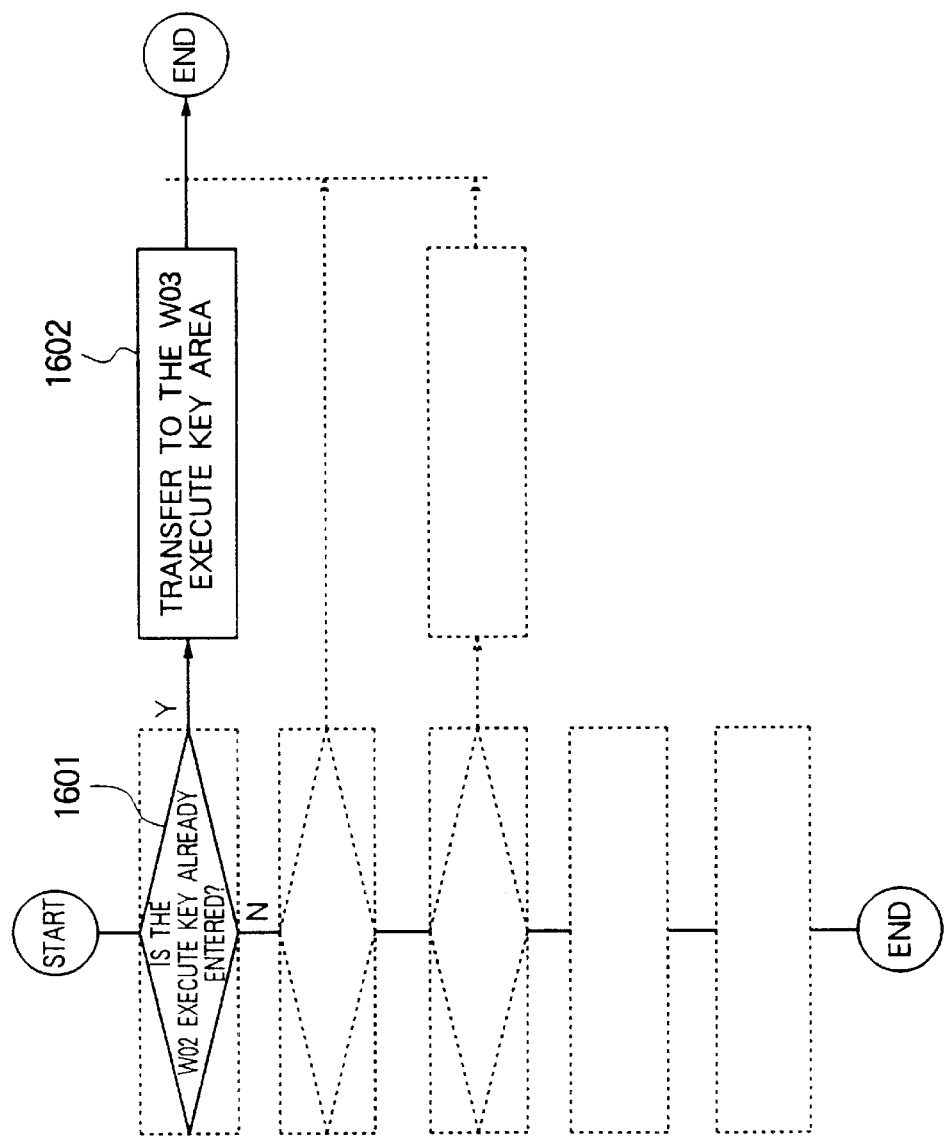

The W03 duplicate vector is to be made as shown in FIG. 16.

First, the vector should have the logic to make judgment whether a data already exists or not in the W02 data area of the word "sales data" (step 1601). If the data already exists, the vector should make a copy of the data into the W03 data area of the word "sales data" (step 1602), and to put an end to the process of the tense control vector.

If the data does not exist at step 1601, the vector should put an end to the process of the tense control vector without doing anything.

As set forth above, the data processing with regard to the word is performed without accepting the effect of the other words processing. This is to say that each tense control vector program in the present invention does determine the significance autonomously.

Figure 17:
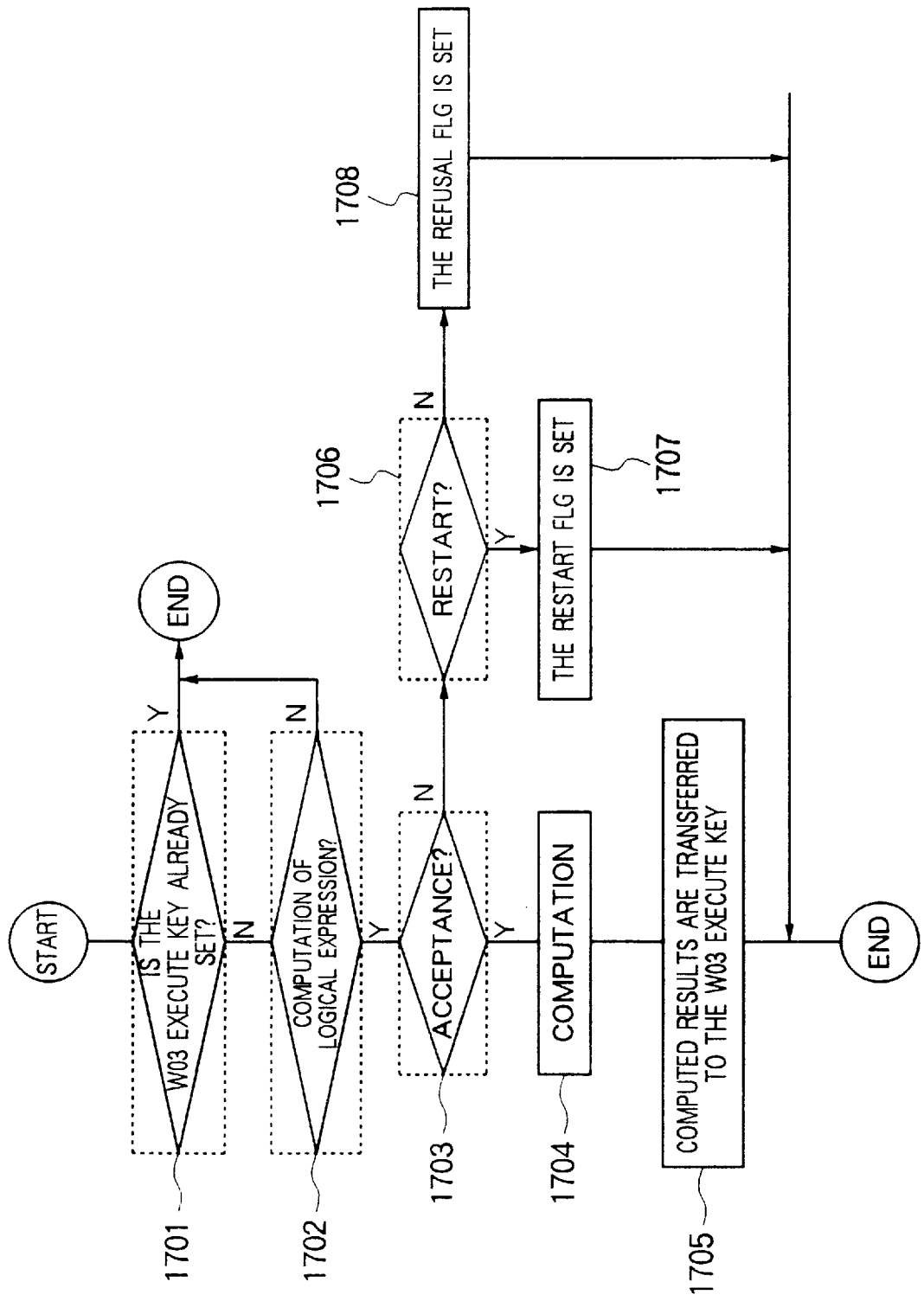
FIG. 17 indicates one example of the W03 homogeneity vector.

The W03 homogeneity vector is to be made as shown in FIG. 17.

First, the vector should have the logic to make judgment whether a data is already set or not into the W03 data of the word "sales data" (step 1701). If it is already set, the vector should put an end to the process of the tense control vector.

If the data is not set, the vector should have the logic to make judgment whether a data of the W03 of the word "sales data" can be induced or not with the data of the W03 of the self or the other word (step 1703). That is, for example, if the data of the word "sales data" is calculable from the operation: "the price"×"the number of pieces", as is the same as the situation of the step 1302, then the vector should have a logic to make a judgement where there already exists a data in the W03 data area of the word "price" and in the W03 data area of the word "the number of pieces." If there exists a data, then the vector should have a logic, deciding that the data is calculable, to calculate the data (that is, for the example above, the vector should calculate the data of the word "sales data" from the word existing in the W03 data area of the word "price" and the word existing in the W03 data area of the word "the number of pieces" by using the above-mentioned calculating expression) (step 1704), then to set the result of the calculation (i.e., the data of the word "sales data" in the example above) into the W03 data area of the word "sales data")(step 1705), thereby putting an end to the process of the tense control vector.

When the calculation is judged to be impossible at the step 1704, if necessary (step 1706), the vector should set a flag for reactivating the the tense control vector, i.e. the restart FLG of W03 of the word "sales data" (step 1707). That is, also in this case, as the same as above, the determination of the data of the word "sales value" is once reserved: for the above-mentioned example, the determination of the data will be reserved until data are set into the W03 data area of the word "price" and into the W03 data area of the word the "number of pieces" by the executions of the corresponding tense control vectors. This leads to the effect that, as the processing order of the tense control vector has nothing to do with the processing order of the other word's tense control vector, the reservation above will be ceased after all and the data will be set, so that the same result is assured even if the processing order varies.

Making of the Pallet Function

Figure 18:
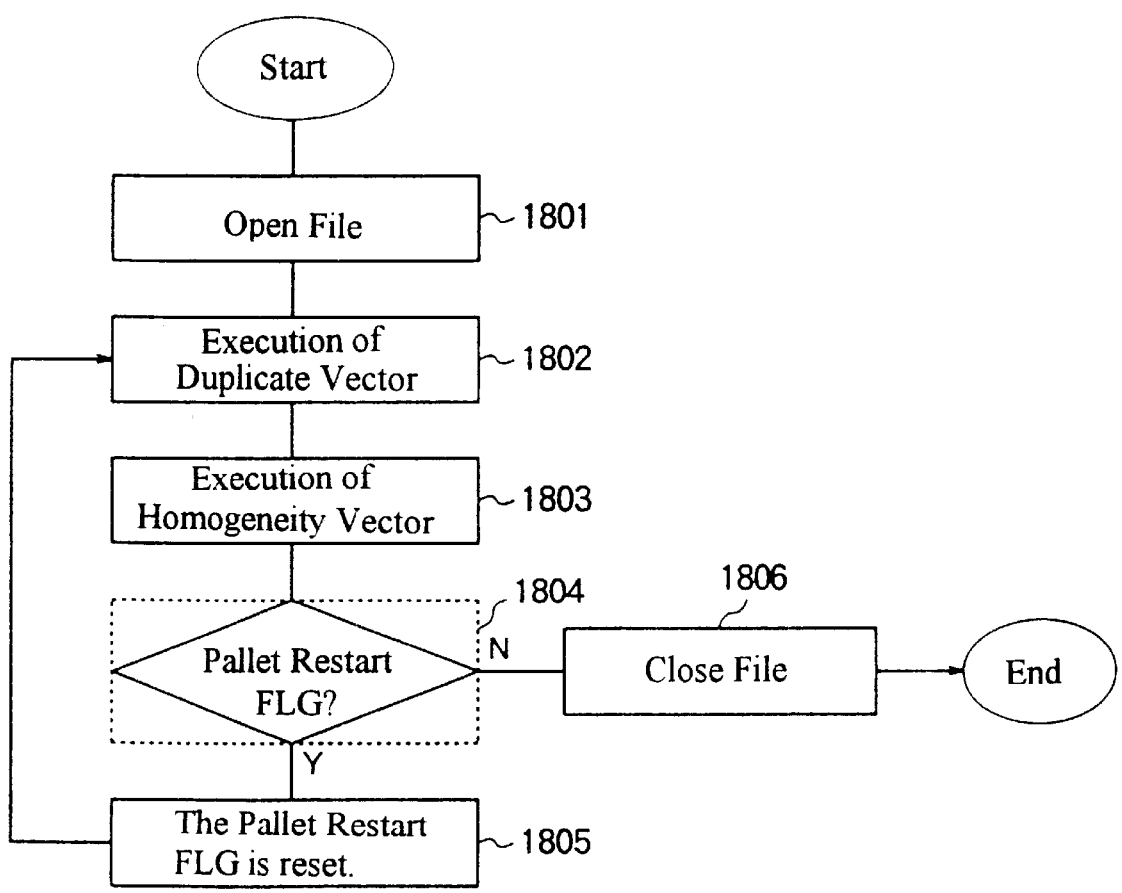
FIG. 18 indicates a structural paradigm of the pallet function.

The pallet function for W04, W02 and W03 should be made. FIG. 18 shows the structure paradigm of the pallet function. The pallet function (program) having such structure may as well be made for each of W04, W02 and W03, as will be set forth in the followings.

First, the pallet function should have a logic to open a file (step 1801). That is, for example, the pallet function concerned with the W04 should have a logic to open a file of one predetermined W04 out of a plurality of

W04 pallets, and then to execute each duplicate vector and homogeneity vector in the consecutive order (step 1802, step 1803).

Thereafter, in the case that the pallet restart flag has been set (step 1804), the function should reset the flag (step 1805), as well as execute each duplicate vector and homogeneity vector in the consecutive order (step 1802, step 1803). That is, the pallet function in co-operation with the pallet activating flag of each pallet, enables the determination of the autonomous significance of the program.

On the other hand, when the pallet restart flag has not been set, the function should close the file (step 1806) and put an end to the process.

Assembling into the Pallet Chain Function

The structure of the pallet chain function is identical in any software. Accordingly, the tense control vector and the pallet function made as explained above simply needs to be assembled into the pre-made pallet chain function.

Figure 19:
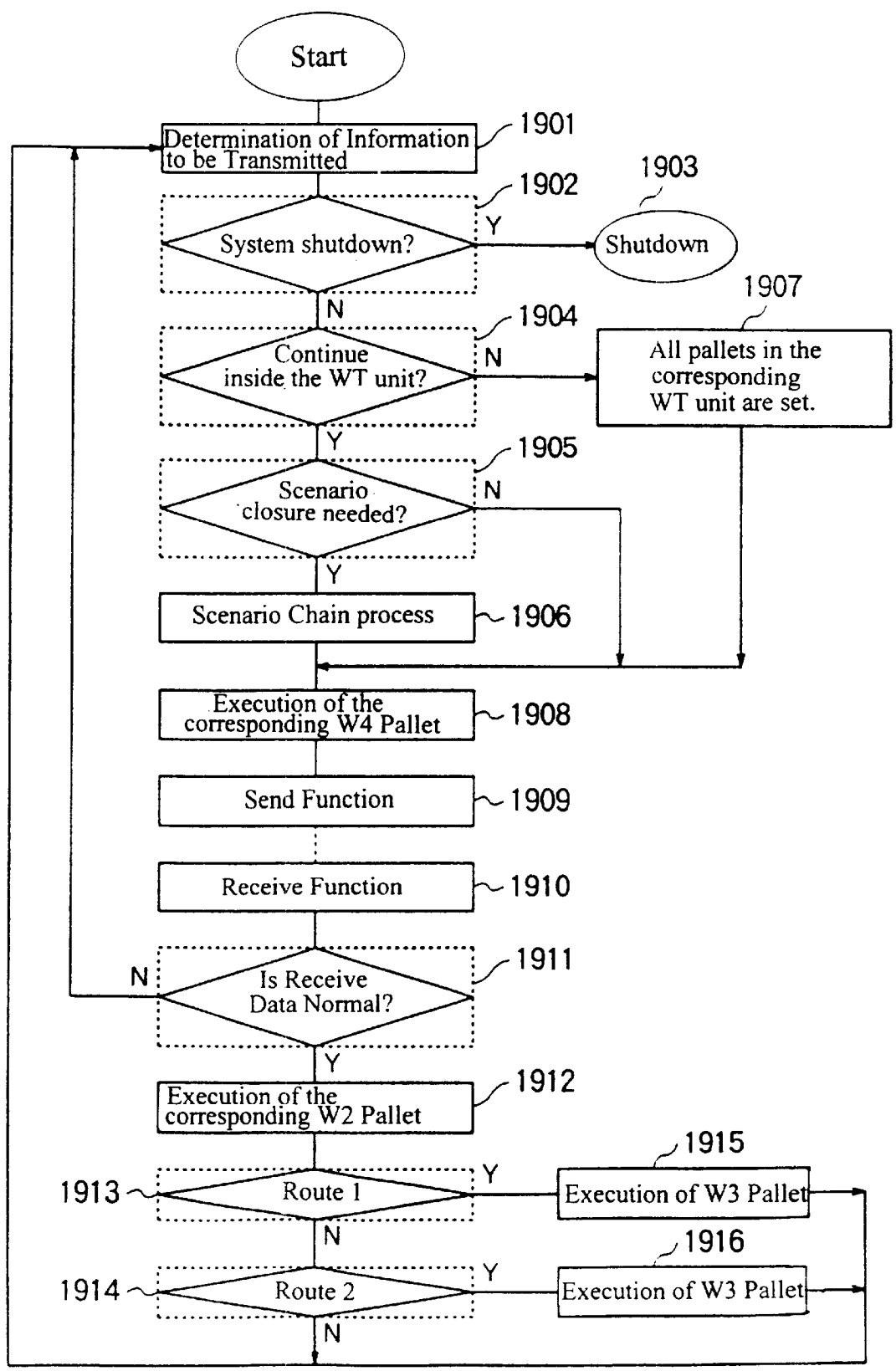
FIG. 19 indicates a structural paradigm of the pallet chain function (for on-line).

The structure paradigm of the pallet chain function is shown in FIG. 19.

That is, the pallet chain function should have a logic to determine information to be transmitted (step 1901). The information to be transmitted is meant to be a screen to display. In the case of the homogeneity map shown in FIG. 91 for example, when the "reference" of the "customer code" in the sales data entry screen (ref. FIG. 2.) is selected (which means that a homogeneity map flag of R=3 has been valid in the W02 pallet of "customer code"), the pallet chain function should determine the customer code reference screen (FIG. 3) as the information to be transmitted.

When the information to be transmitted contains the information for closing the system (step 1902), the function should have the logic to close the system (step 1903). The information for closing the system is that, explaining by referring to the homogeneity map shown in FIG. 9, for example, the "F3" has been selected in the sales data entry screen (FIG. 2) (which means that a homogeneity map flag of R=0 has been valid in the F3's W02 pallet). To close the; system is, speaking of the above example, to return to the menu screen.

Figure 20:
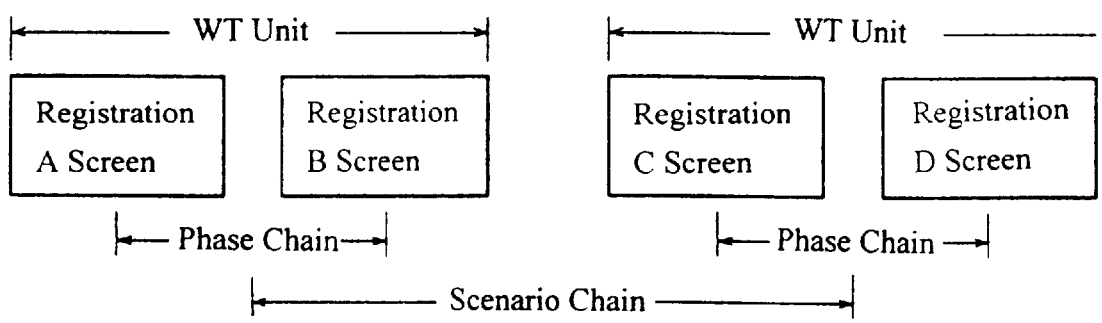
FIG. 20 is a drawing to explain the scenario chain.
Figure 21:
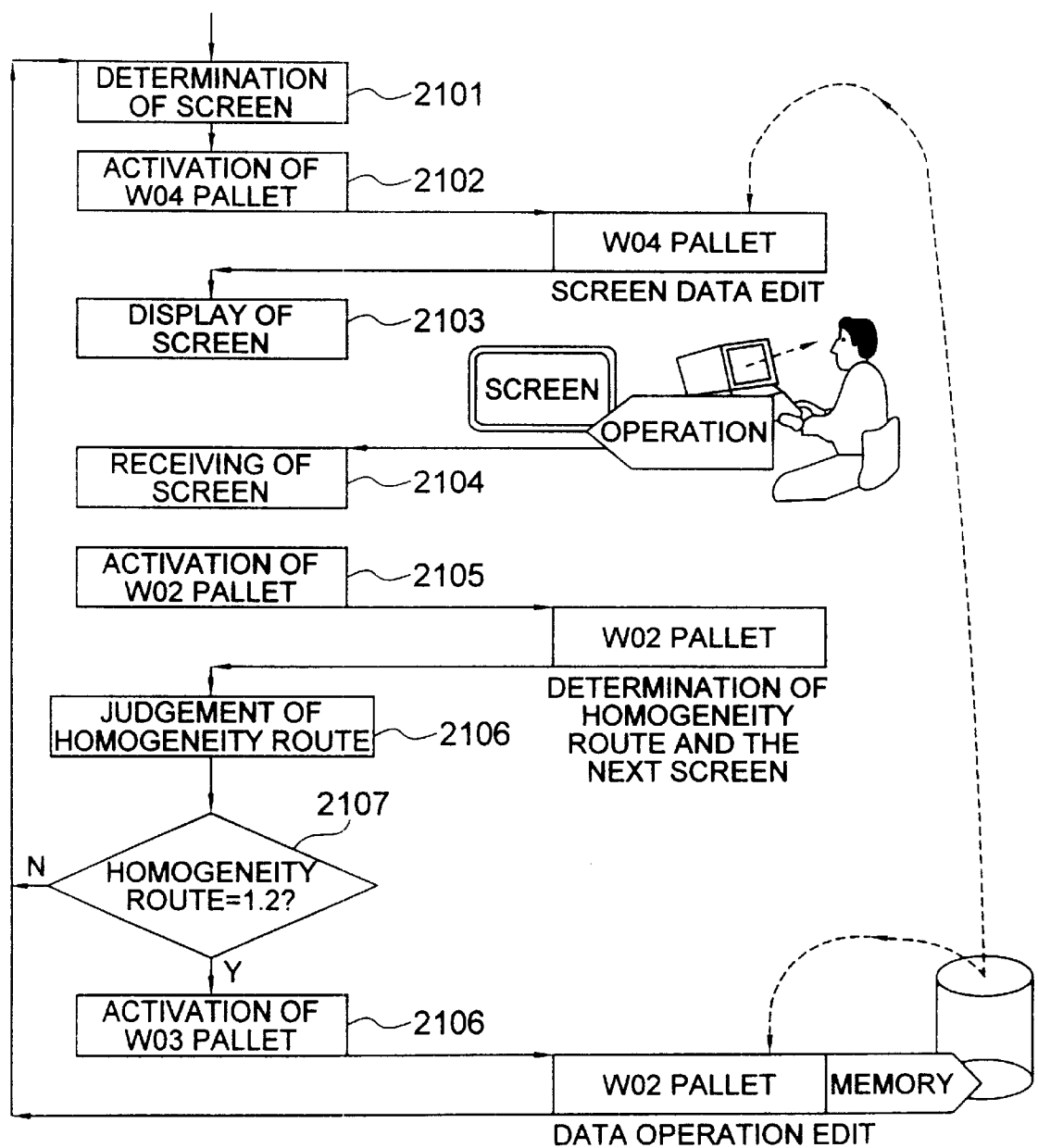
FIG. 21 indicates a whole structure of the software concerned with the present invention.

Next, the function should to make judgment whether to continue or not inside the WT (Walk-Through) unit (step 1904). This step is concerned with exceptional process. WT is a functional unit processed by an input by human. That is, the WT unit is, as shown in FIG. 20, for example, one unit composed by binding the entry screen used for data entry and the reference screen used for the reference to data upon entering the data.

For example, by explaining in reference to the homogeneity map shown in FIG. 9, the WT unit is one unit composed by binding the sales data entry screen (ref. FIG. 2) and the customer code reference screen (ref. FIG. 3). However, when screens of other homogeneity maps, for example the arrival confirmation entry screen (ref. FIG. 10 and FIG. 4.), are needed, the confirmation entry screen must be unit-teamed with these screens stated above. Thereupon, as shown in FIG. 20, if necessary, the pallet chain should perform the scenario chain, or the chain with the other WT (step 1905, 1906). This will become particularly effective, when coping with a huge program.

In the case of the continuation inside the WT unit, the pallet chain function should set all pallets of the WT unit (step 1907). For example, in the case of the homogeneity map shown in FIG. 9, the function should set all the pallets concerned with this whole homogeneity map (W02–W04) in the working memory, respectively.

Then, the function should at first execute the W04 pallet corresponding to the screen which corresponds to the menu item selected on the menu screen (step 1908). That is, the function should execute the W04 pallet in which the W04 duplicate vectors and the W04 homogeneity vectors for every word belonging to the sales entry (direct sales) screen (whose definitive identifier is KH211E) have been set by the pallet function shown in FIG. 18. By this step, data concerned with the screen to display will be determined.

Then, the pallet chain function should execute the transmission function (step 1909). That is, the function should transmit a screen in which all the data have been set to a display means, for example, a CRT.

Thereafter, the function should have the logic to execute the receiving function (step 1910). That is, the function should receive the screen, in which all the data have been input (from display means, for example, a CRT).

Then, the pallet chain function should make judgment whether the received data is normal or not (step 1911). If abnormal, the function should resume the procedure from the beginning. That is, the function should make judgment if a data violating the regulation exists or not.

Next, the function should execute the W02 pallet corresponding to the screen to which the received data belongs (step 1912). That is, the function should execute the W02 pallet in which all W02 homogeneity vectors for every word belonging to the sales entry (direct sales) screen whose definitive identifier is KH211E) have been set by the pallet function shown in FIG. 18. By this step, the input data will be determined.

Next, a homogeneity map will be determined (step 1913, step 1914). As explained above, the homogeneity map is judged by the homogeneity map flag (R=1 to 5) contained in the W02 homogeneity vector.

When the homogeneity map flag R=1, the function should execute the corresponding W03 pallet which is the only W03 pallet in the software to be produced and on which all W03 tense control vectors for all words belonging to all definitives necessary for the software have been set by the pallet function shown by FIG. 18 (step 1915). The W03 pallet in this case does not perform data registry into a file. For example, the line of the W03 pallet 94 shown in FIG. 9 is executed. Then, the function should have a logic to return to the first step (step 1901). That is, the homogeneity map in the case of R=1 only performs data processing (ref. FIG. 9).

When the homogeneity map flag R=2, too, the function should execute the W03 pallet (step 1916). The W03 pallet in this case performs data registry into a file. For example, the line of the W03 pallet 95 and the line of the WFL 96 are executed. Then the function should have a logic to return to the first process (step 1901). That is the homogeneity map in the case of R=2 executes data processing as well as a recording data onto a file (ref. FIG. 9).

When the homogeneity map flag R=3 to 5, the function should return to the first process (step 1901) as it is.

In this connection, the homogeneity map as shown by R=3 performs processing to return to the W04 pallet (both homogeneous and heterogeneous) without doing anything farther (ref. FIG. 9).

The homogeneity map as shown by R=4 performs recording data in a file as it is (ref. FIG. 10).

The homogeneity map as shown by R=5 performs taking out data from a file as it is (not shown).

Figure 15:
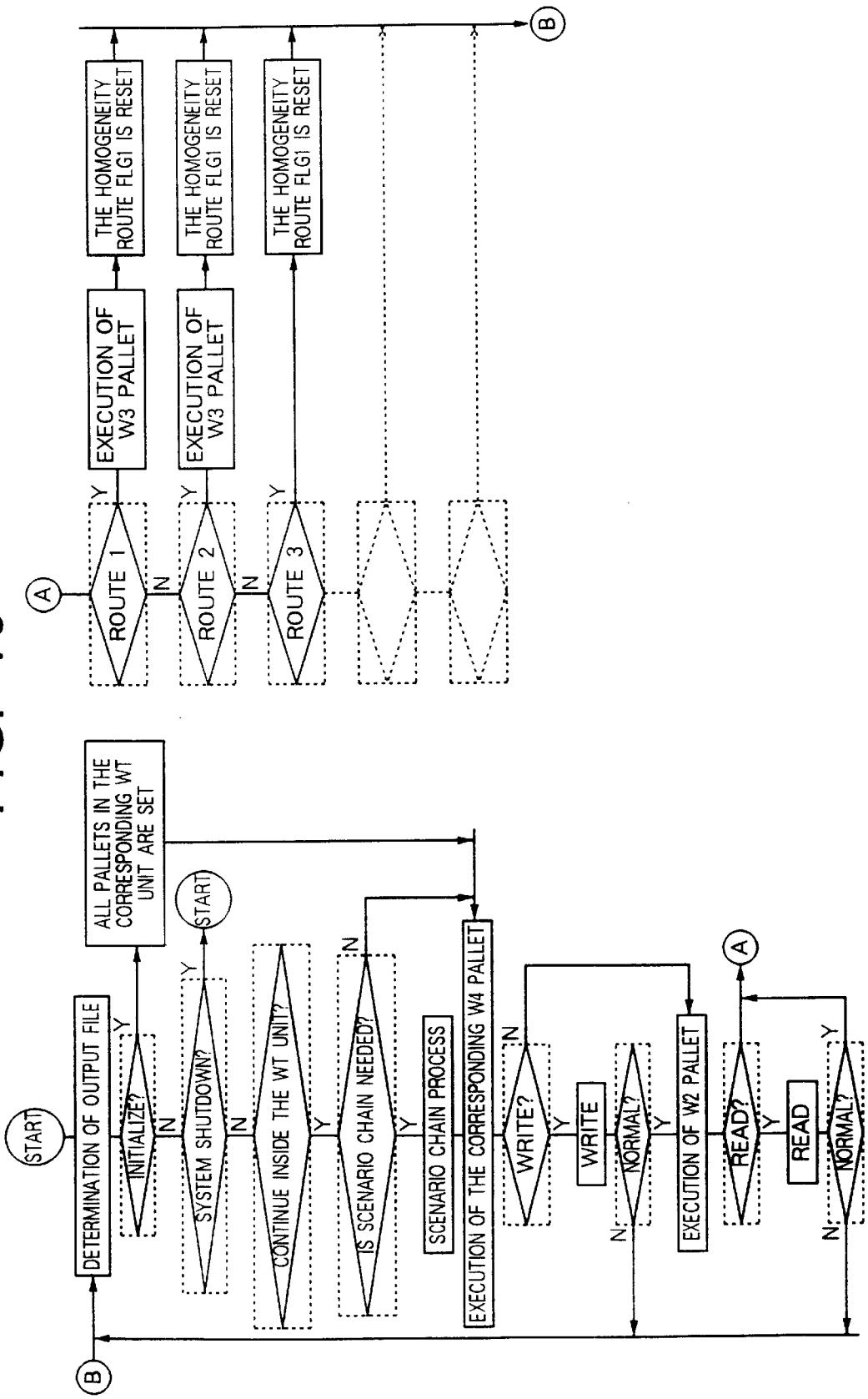
FIG. 15 indicates a structural paradigm of the pallet chain function (for off-line.)
FIG. 16 indicates one example of the W03 duplicate vector.

To be noted, the pallet chain function shown in FIG. 19 is for on-line use. The pallet chain function for off-line use is as shown in FIG. 15.

In summary,

At first, the pallet chain function should have the logic to determine a screen to display (step 2101) and to execute the W04 pallet on which the W04 duplicate vector and the W04 homogeneity vector corresponding to every word for all words belonging to the determined screen (step 2102). By this, screen data is edited and the edited screen is displayed (step 2103).

When the user's operation is done to this displayed screen, the function should have the logic to receive the screen (step 2104) and to activate the W02 pallet corresponding to the screen to which the received data belongs (step 2105). By this a homogeneity map route and the next screen to be displayed is judged.

Then, the function should have the logic to judge the homogeneity map (step 2106), and in the case of the homogeneity map 1 or 2 (step 2107), the function should activate the W03 pallet. By this, the data operation processing is done.

When the data operation processing is finished or in the case of other than the homogeneity map 1 or 2 above, the function returns to step 2101.

Figure 22:
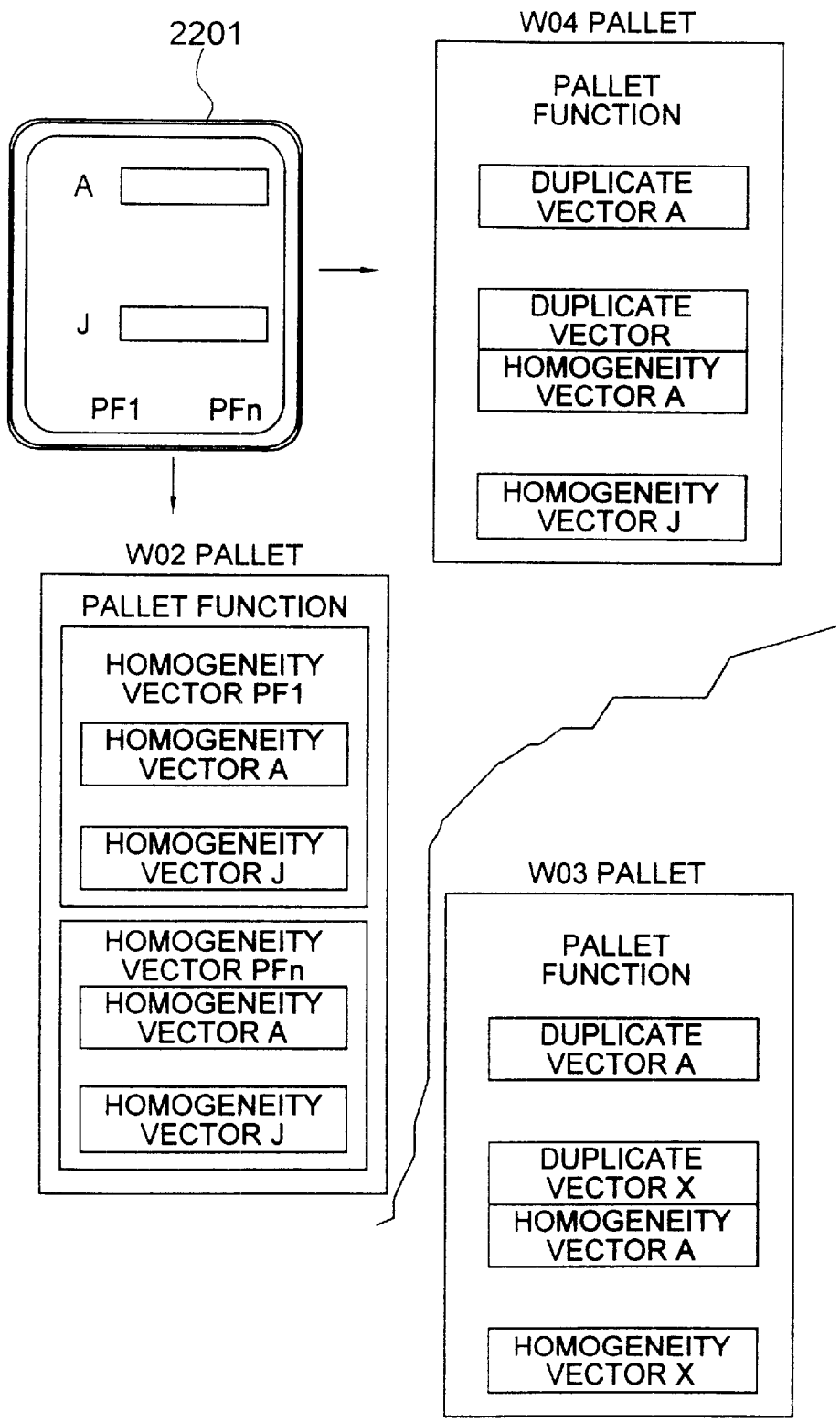
FIG. 22 indicates a structure inside the pallet.

FIG. 22 shows the structure inside the pallet.

As shown by the FIG. 22, for the terms A-PFn on the screen 2201, a pallet function, duplicate vector A-PFn and homogeneity vector A-PFn exist inside the W04 pallet, as well as a pallet function, homogeneity vector A-J and the homogeneity vector PF1-PFn exist inside the W02, pallet. Inside the W03 pallet, a pellet function, duplicate vector A-X and homogeneity vector A-X exist ("A"-"X! are meant to be all words belonging to all definitives inside the system).

A logic paradigm of the tense control vector is shown in FIG. 23. As shown in the FIG. 23, in the pallet chain function (scenario) 2301, when data is input and a screen/message is received, W02 pallet, W03 pallet and W04 pallet are activated in their order. When the W02 pallet is activated, the process shown by the code 2303 is executed. When the W03 pallet is activated, the process shown by the code 2303 is executed. When the W04 pallet is activated, the process shown by the code 2304 is executed.

Figure 24:
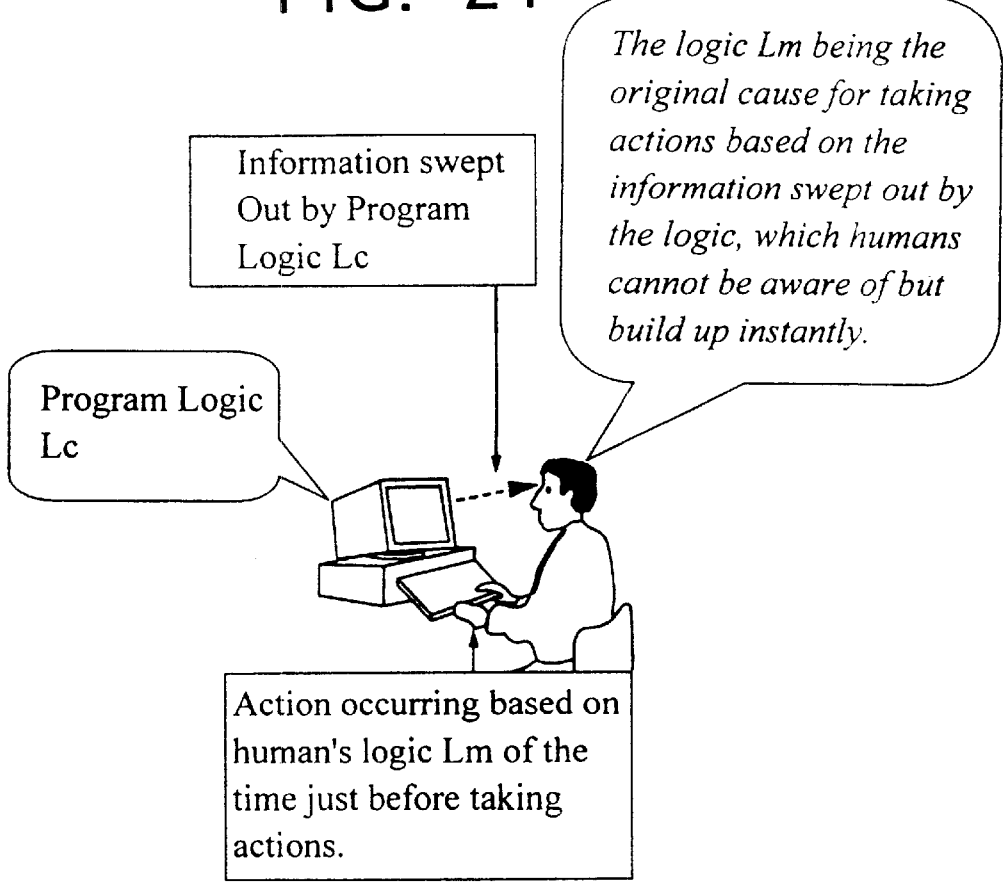
FIG. 24 indicates the characteristics of a logic by, Lyee.

FIG. 24 is a diagram showing the characteristics of the logic in Lyee.

Suppose the program logic is Lc, and the logic being a base for causing actions in accordance with the information swept out by the program, which humans cannot be aware of but can instantly conduct, is Lm. In the traditional way of making software, the logic Lm (impossible to be realized) being a base for causing human actions has been forced to be fabricated, a process (procedure) and a function both binding human actions have been fixed as specifications (fabricated by SE with his or her experience or knowledge), thereby a program based thereupon has been made. That is, $$Lc=Lm$$

was its provision.

Lyee's software, contrary to the traditional method of making software, does not contain Lm, and the program to be made works in accordance with human's capricious conducts.

Figure 25:
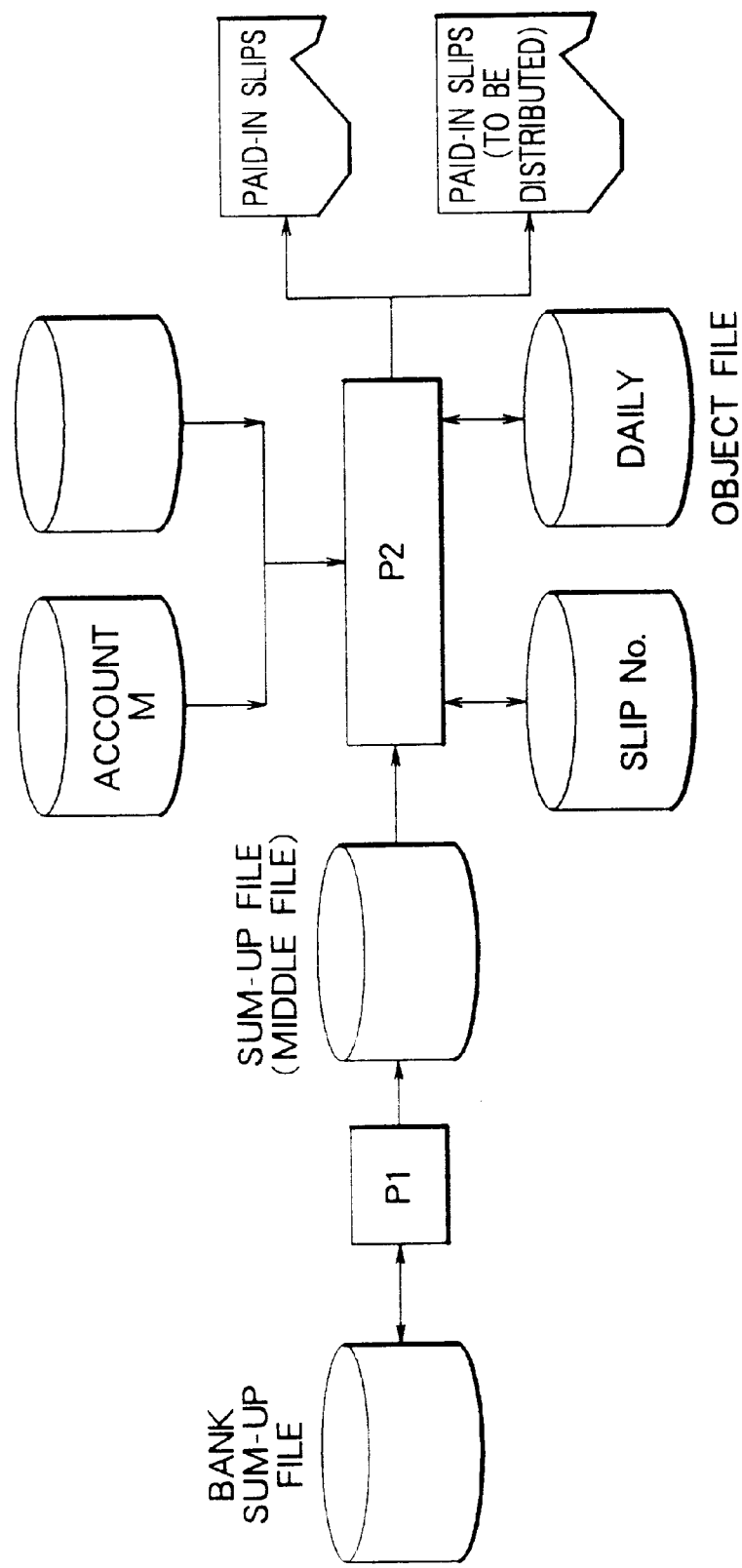
FIG. 25 indicates a structure of the traditional-type program.
Figure 26:
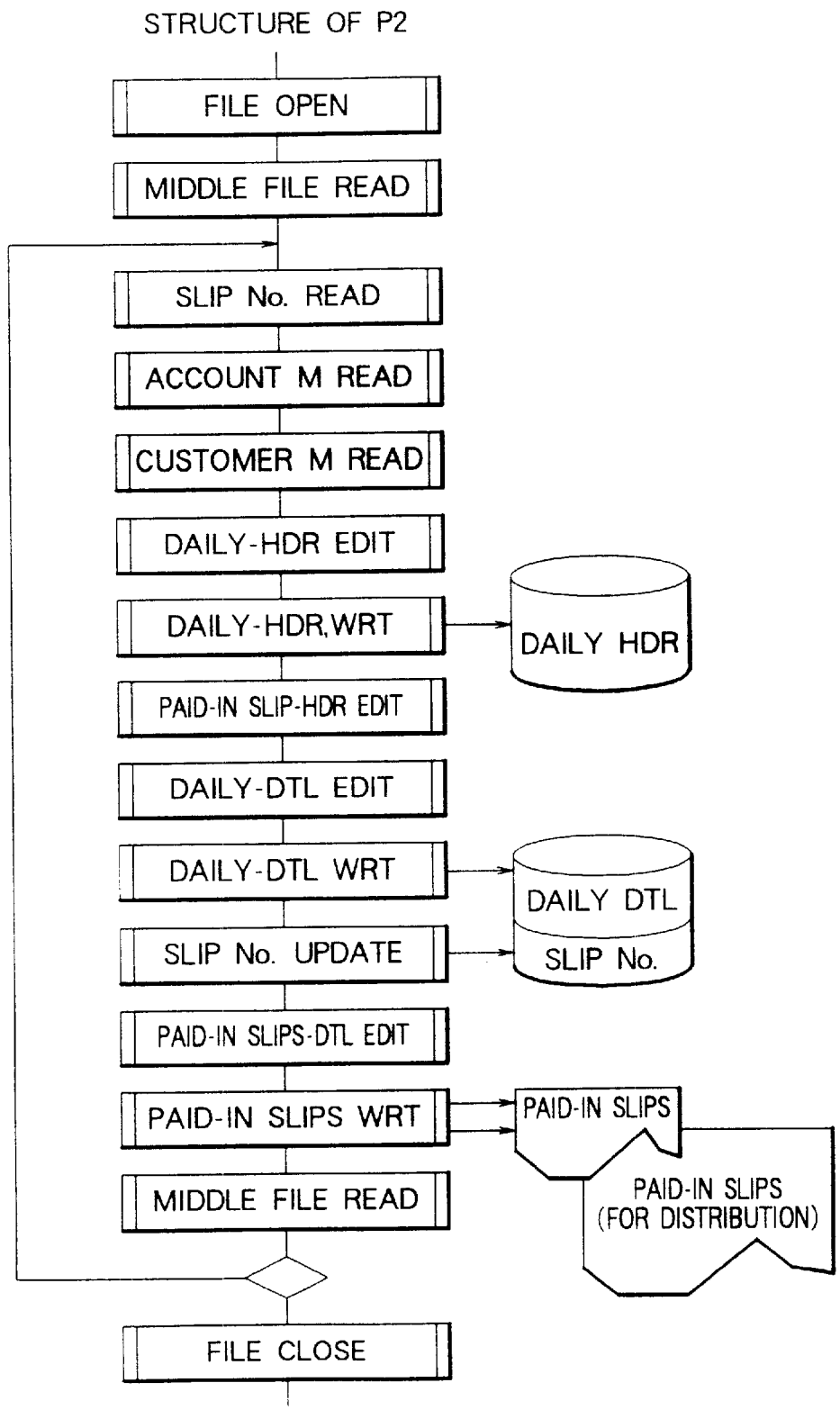
FIG. 26 indicates a structure of the traditional-type program.
Figure 27:
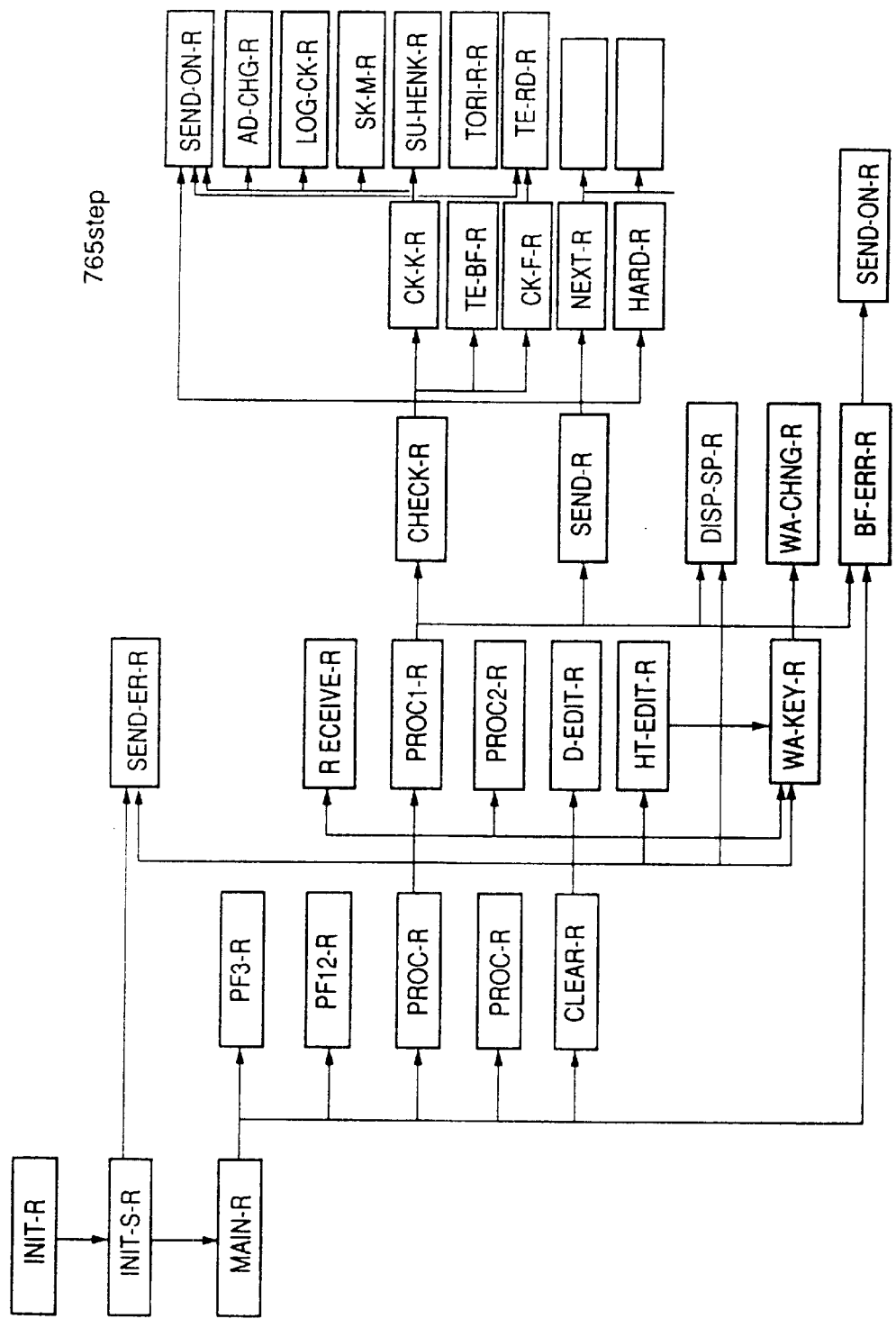
FIG. 27 indicates a module composition of the traditional-type program.

FIG. 25 and FIG. 26 show the structure of the traditional-type programs, and FIG. 27 shows the module configuration of the traditional-type programs.

As understood from these figures, the traditional-type programs can be referred to as process transaction of functional division type. For this reason, the structural condition is made complicated, as well as the conditions of the module configuration is also puzzling.

Figure 28:
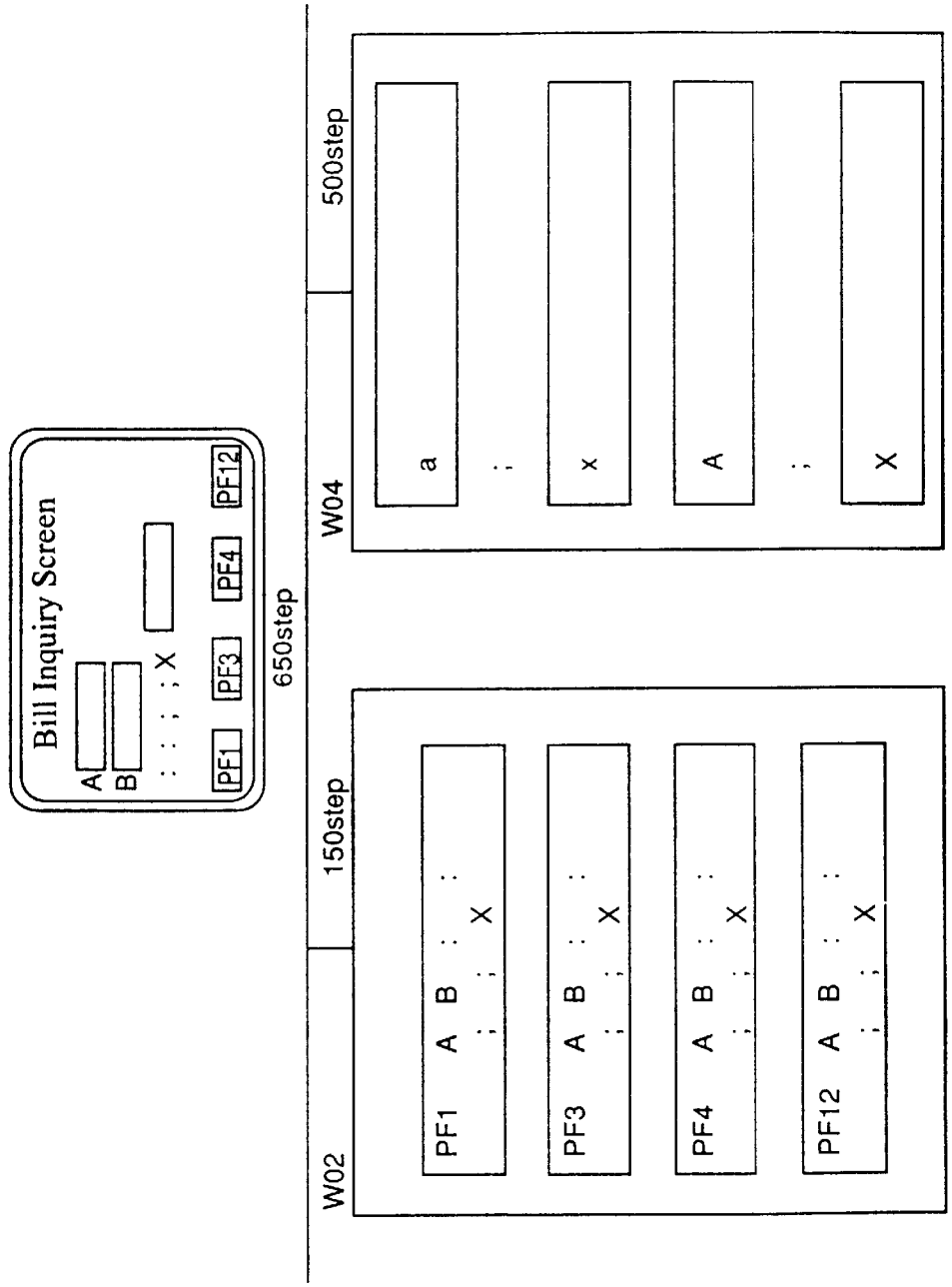
FIG. 28 indicates a structure of the Lyee-type program.

FIG. 28 shows the structure of the Lyee-type program.

As understood from this figure, the Lyee-type program features the followings: the configuration is simple; the element unit is processed by the unit of word; the element content is simple and independent; and the program logic does not contain composition conditions (handling procedure) like traditional-type programs.

In the following, how to grasp business expertise and function as well as the resulting effects from the stand point of Lyee will be explained.

Figure 29:
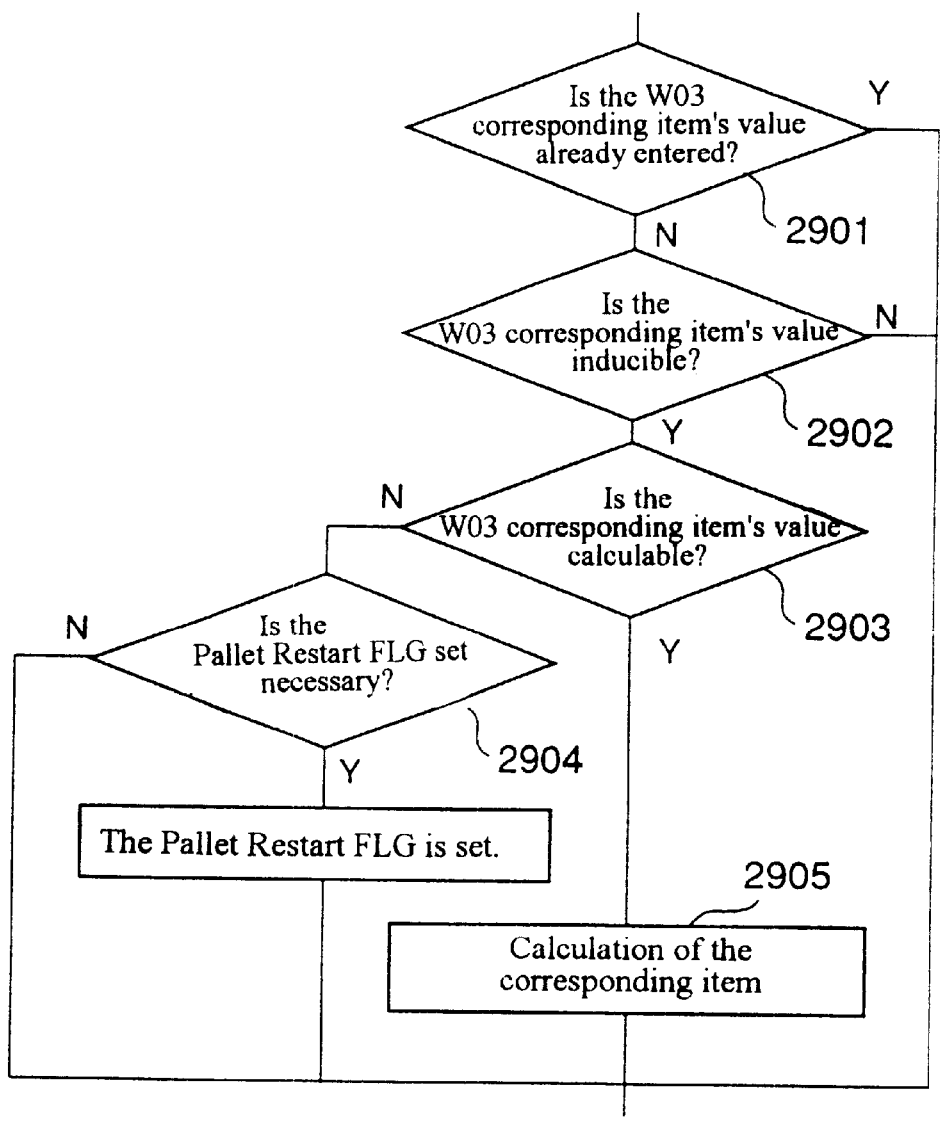
FIG. 29 indicates the W03 homogeneity vector.

(1) There is no need for business expertise FIG. 29 shows the W03 homogeneity vector.

In step 2901, the vector should have the logic to confirm whether the field's value is 'space" or "zero". (judging from the item definition document). The judgment of this logic does not require business expertise; knowing the rule of Lyee is only needed.

In step 2902, the vector should have the logic to confirm whether the item in the right side (Starting point) of the corresponding item's expression (judging from the item definition document) exist or not in the W03 area. The judgment of this logic does not require business expertise; knowing the rule of Lyee is only required.

In step 2903, the vector should have the logic to confirm whether the value of the item of the right side (Starting point) of the corresponding item's expression (judging from the item definition document) is calculable ("space" or "zero") or not. The judgment of this logic does not require business expertise; knowing the rule of Lyee is only requested.

The step 2904 is a scheme which guarantees the operational order of the tense control vector. The judgment of this logic does not require business expertise; knowing the rule of Lyee is only necessary.

In step 2905, the vector shall calculate the items from the item definition document (such as expressions, etc.) users have confirmed.

Accordingly, in order to assemble Lyee's logic, the "item definition document such as expressions" is necessary, but the sequence of the process (which is called "business expertise") is not required.

(2) Lyee deals with only synchronous data and dismiss a process (handling of asynchronous data).

Figure 30:
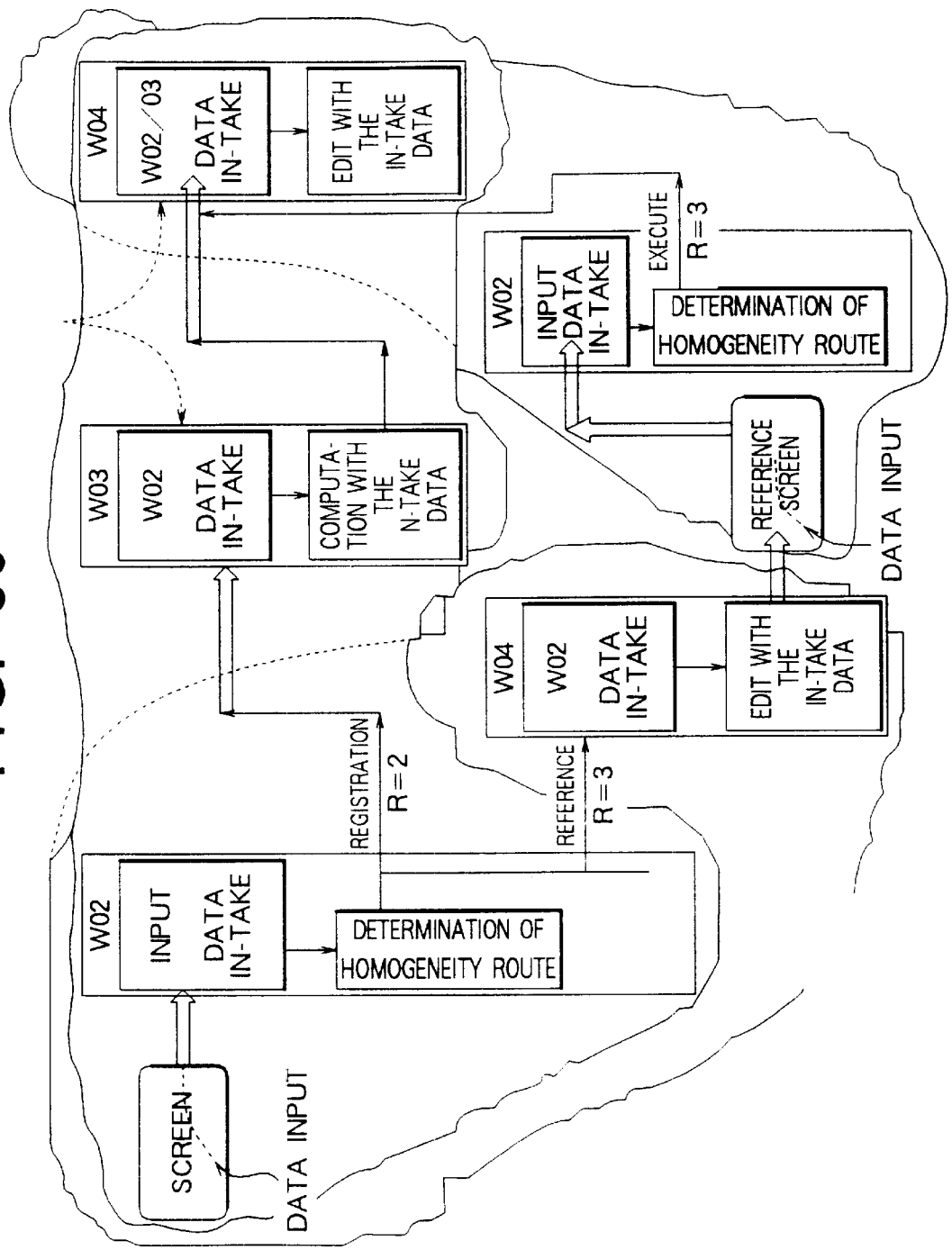
FIG. 30 is a drawing to explain that Lyee handles only homogeneous data.

In Lyee, by introducing the "duplicate vector," it is possible to handle only the synchronous data. That is, in Lyee, as shown in FIG. 30, by handling only the synchronous data operational procedure conditions itself disappears, or is no longer needed, whereas in the traditional methodology, much time was spent on examining the operational procedure, which results in worsening the productivity and the maintainability.

(3) The only one W03 pallet will do.

When realizing the logicalization of humans (i.e., to think communicable sentences, to take actions, . . . ), it can be said from a biological point of view that all one's will and muscles (as represented by all brain cells) is intertwined each other. And, the right-side brain or the left-side brain primarily works in accordance with an object area to be logicalized. The logic of software (the logicalization), by nature; must be the same as this (because the software logic is nothing but the logic made by humans).

Figure 31:
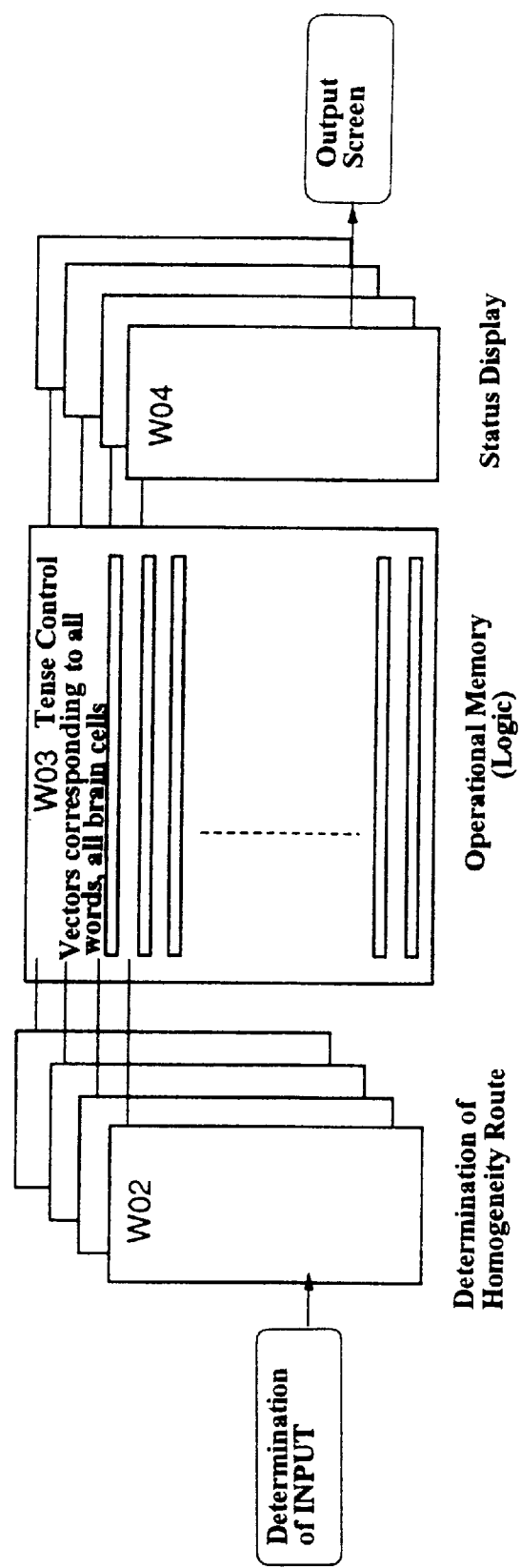
FIG. 31 indicates one example of the Lyye's W03 pallet.

As shown in FIG. 31, the W03 pallet of Lyee is an area assuming the role of "logicalization," so that the W03 pallet installs all the words in a system, which is equivalent to all one's will and muscles, in one area as synchronous data. In the case of Lyee, tense control vectors corresponding to all words are all intertwined each other (all tense control vectors work once, and as a result only the tense control vectors with significance execute their aimed process).

That is, traditionally, words (data) necessary for the function aimed at have to be examined and analyzed in advance before the data definition part is to be designed. On the contrary, in the case of Lyee, all needs to be done is that all words be defined as they are and that the individual tense control vectors be assemblied into the logic as explained above.

(4) There are two kinds of the logic.

Figure 32:
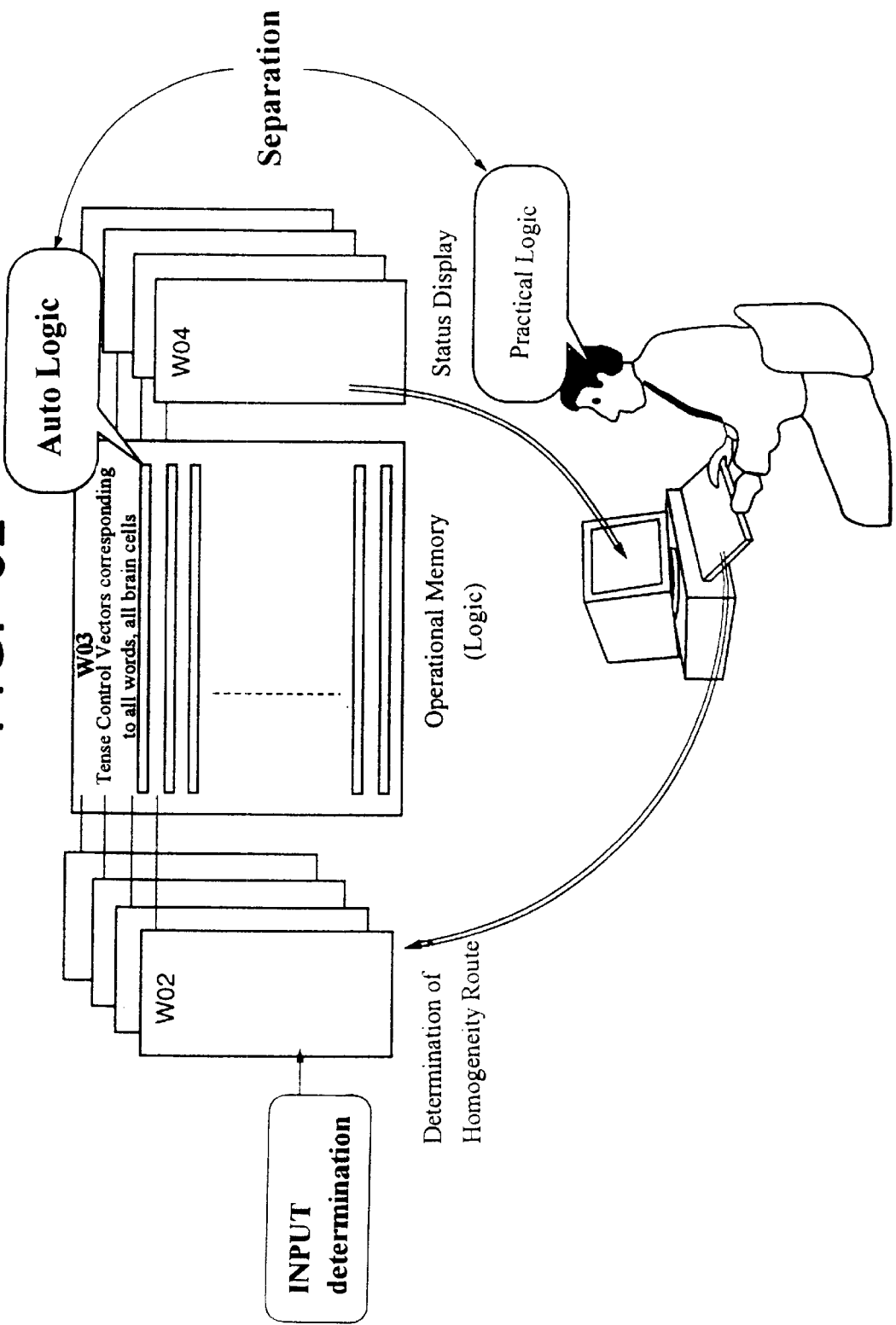
FIG. 32 is a drawing to explain that the auto logic and the operational logic are separated in the Lyee software.

In the traditional software, the automatic logic was a composed of the combination of an operational logic and an automatically self-run logic. On the other part, in the case of software made by Lyee method, as shown in FIG. 32, the automatically self-run logic and the operational logic are separated. That is, the automatically self-run logic exists in the W03 pallet, and the operational logic exists in the logic in a human brain.

(5) Checking

Figure 33:
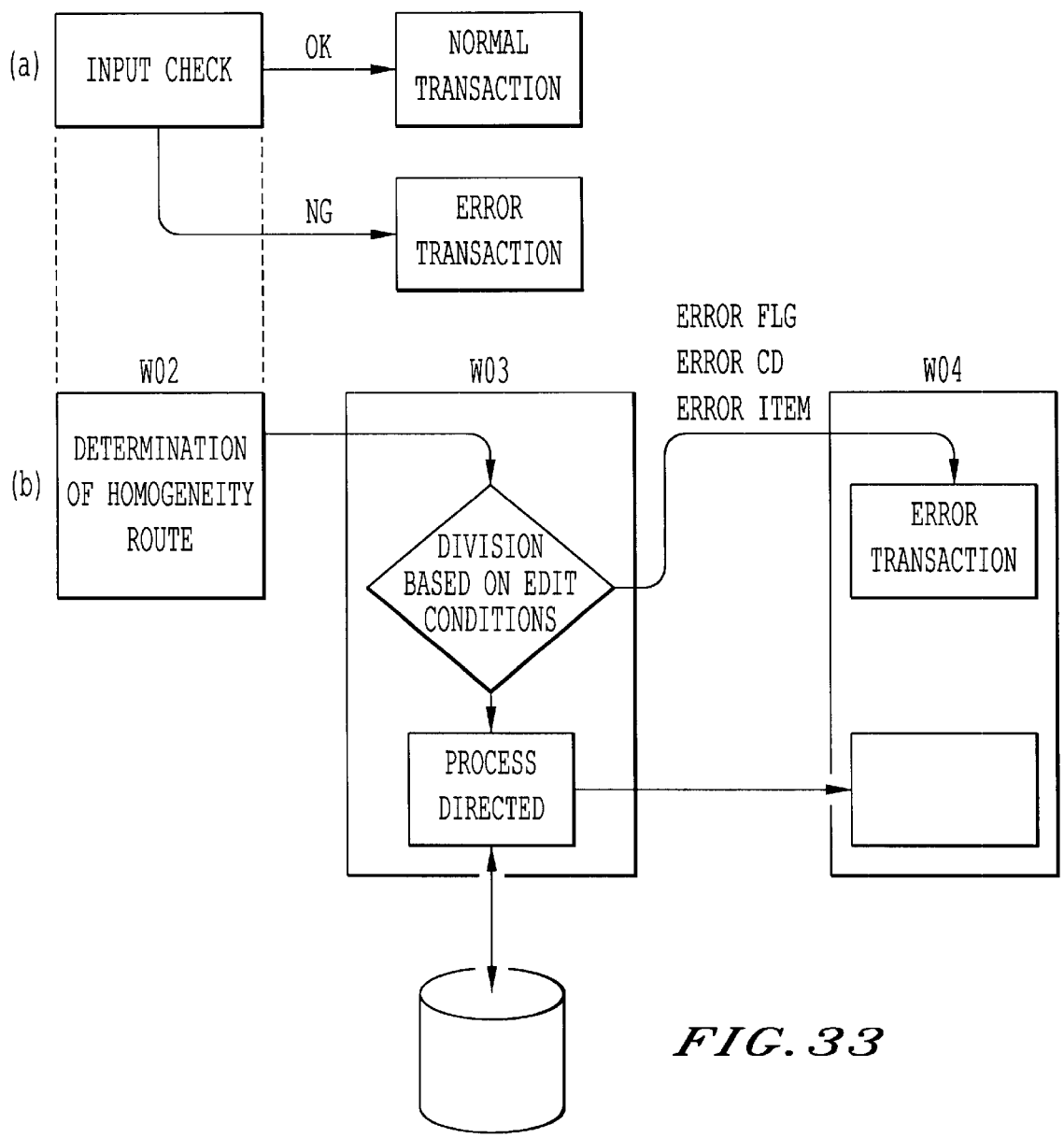
FIG. 33 is a drawing to explain the difference in the error correction procedure between Lyee and the traditional-type.

The traditional software, as shown in FIG. 33(a), has been structured to be of a flow of checking against the input, performing a normal process in case of "OK", or performing an error transaction in case of "NG." Accordingly, all error conditions of multiple items must be examined beforehand.

On the other hand, in Lyee software, as shown in FIG. 33(b), the only homogeneity map is determined without executing the input check except for the property verifying in the W02 pallet. In the W03 pallet, the selection is done concerning whether the process to be directed can be accomplished or not, and if the process to be directed cannot be executed, an error transaction is performed in the W04 pallet.

Explained next is the application range of Lyee in the system development step.

Figure 34:
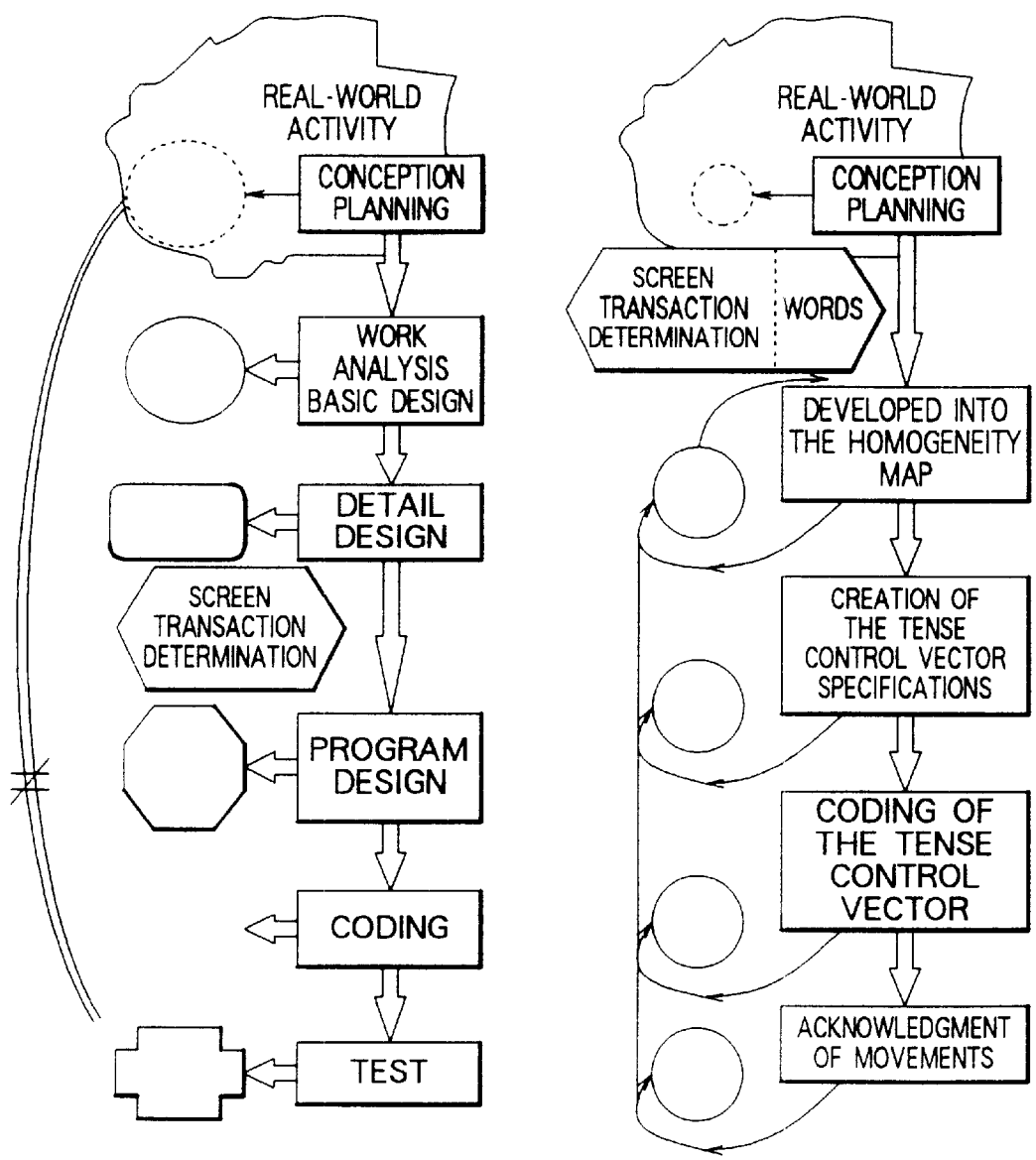
FIG. 34 is a drawing to explain the difference in the software development method between Lyee and the traditional-type.

FIG. 34(a) shows the traditional software development method. Traditionally, software has been developed through the following steps: scheme planning, job analysis and basic design, detail design, programming design, coding, and tests. Traditionally, development from the "job analysis and basic design" step to the "programming design" step has been performed depending upon SE's experience and expertise and human's abilities in coordinating meetings with users.

FIG. 34(b) shows the Lyee's software development methodology. In Lyee, software is developed through the following steps: after the scheme planning, it will develop into a homogeneity map, from which the tense control vector specifications is made, leading to the completion through manufacturing and movements confirmation. The working method only needs to accord with the rule based on the Lyee theory. So to speak, in the traditional method, the upper-stream requirement and the lower-stream source have been linked up each other by the SE's ability. On the other hand, in Lyee, the upper-stream requirement and the lower-stream source are linked by the theory of Lyee.

In the following, the working steps for the development of the Lyee-applied software is more specifically explained.

Figure 35:
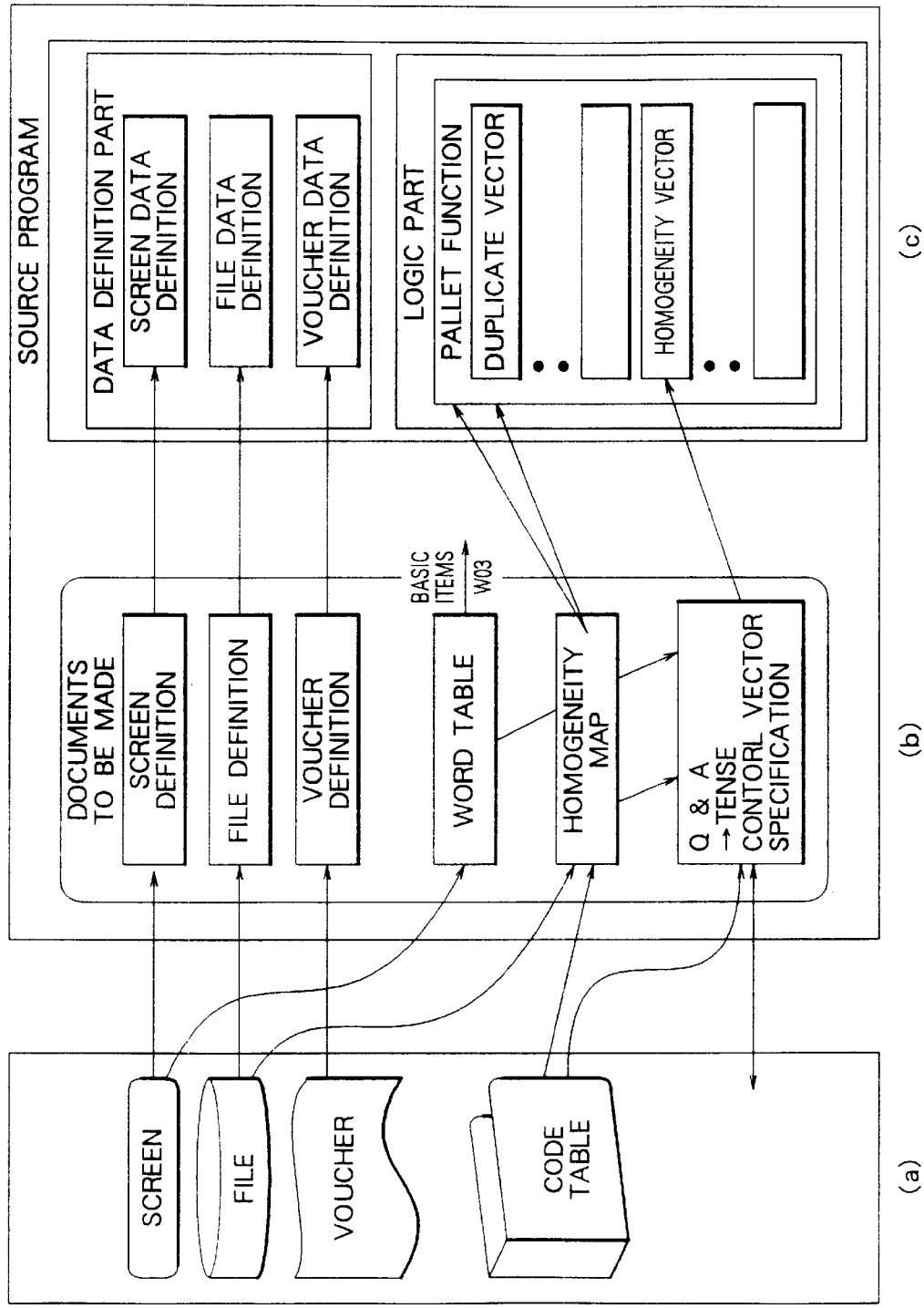
FIG. 35 is a drawing to explain more specifically the development work of Lyee-applied software.

FIG. 35(a) shows a hand-over document given by users to the development side. What are to be handed over to the development side includes screens, files vouchers, and code tables. In this regard, as shown in FIG. 35(b), the development side makes screen definition document, file definition document, voucher definition document, table of words, homogeneity maps, and tense control vectors specifications based on the discussion with users. Then, as shown in FIG. 35(c), the source program is made based on these documents.

Figure 36:
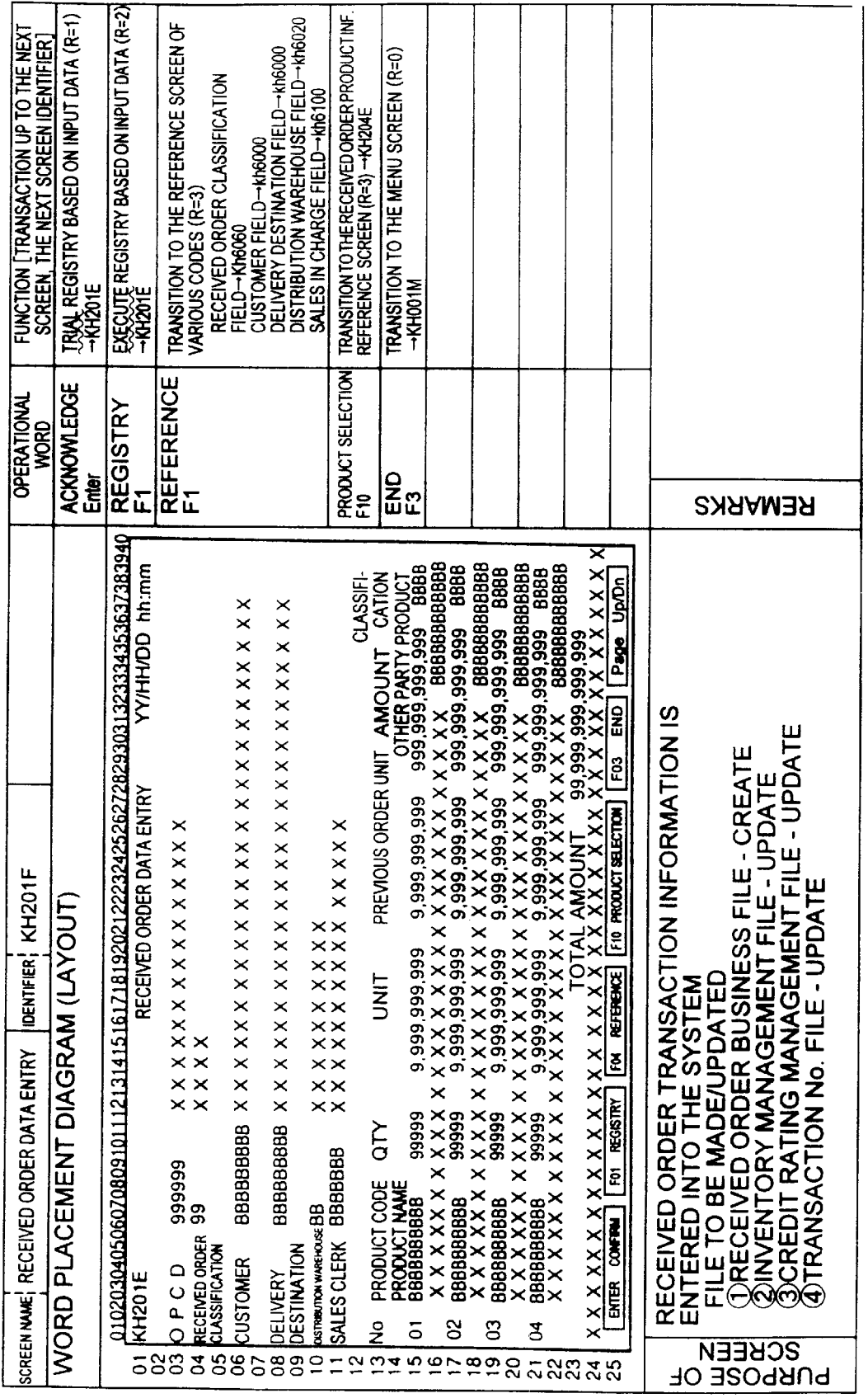
FIG. 36 indicates one example of the screen defining specifications.
Figure 39:
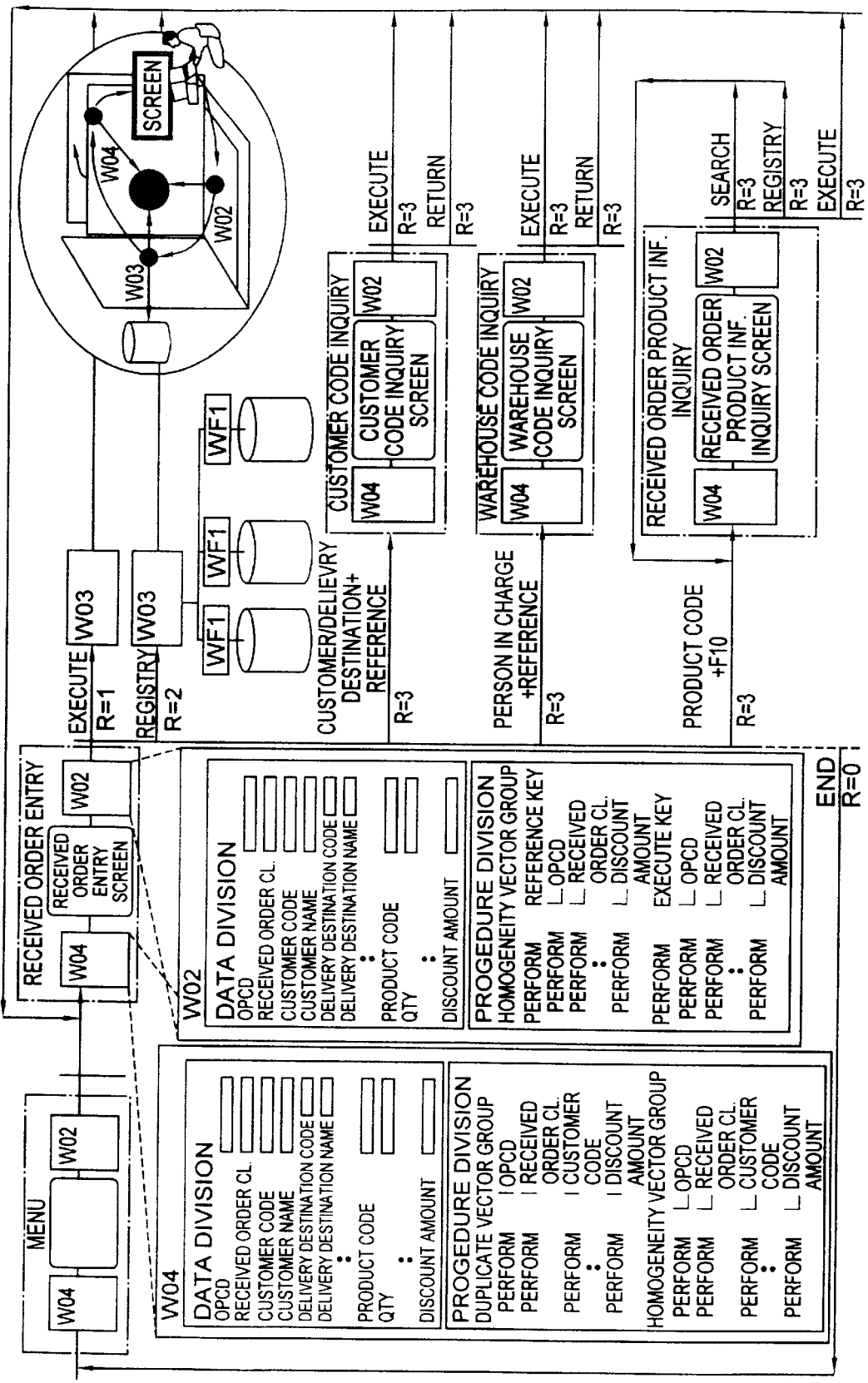
FIG. 39 indicates one example of the homogeneity map.

FIG. 36 shows an example of the screen definition document. FIG. 37 shows an example of the voucher definition document. FIG. 38 shows an example off the file definition document. FIG. 39 shows an example of the homogeneity map.

Figure 40:
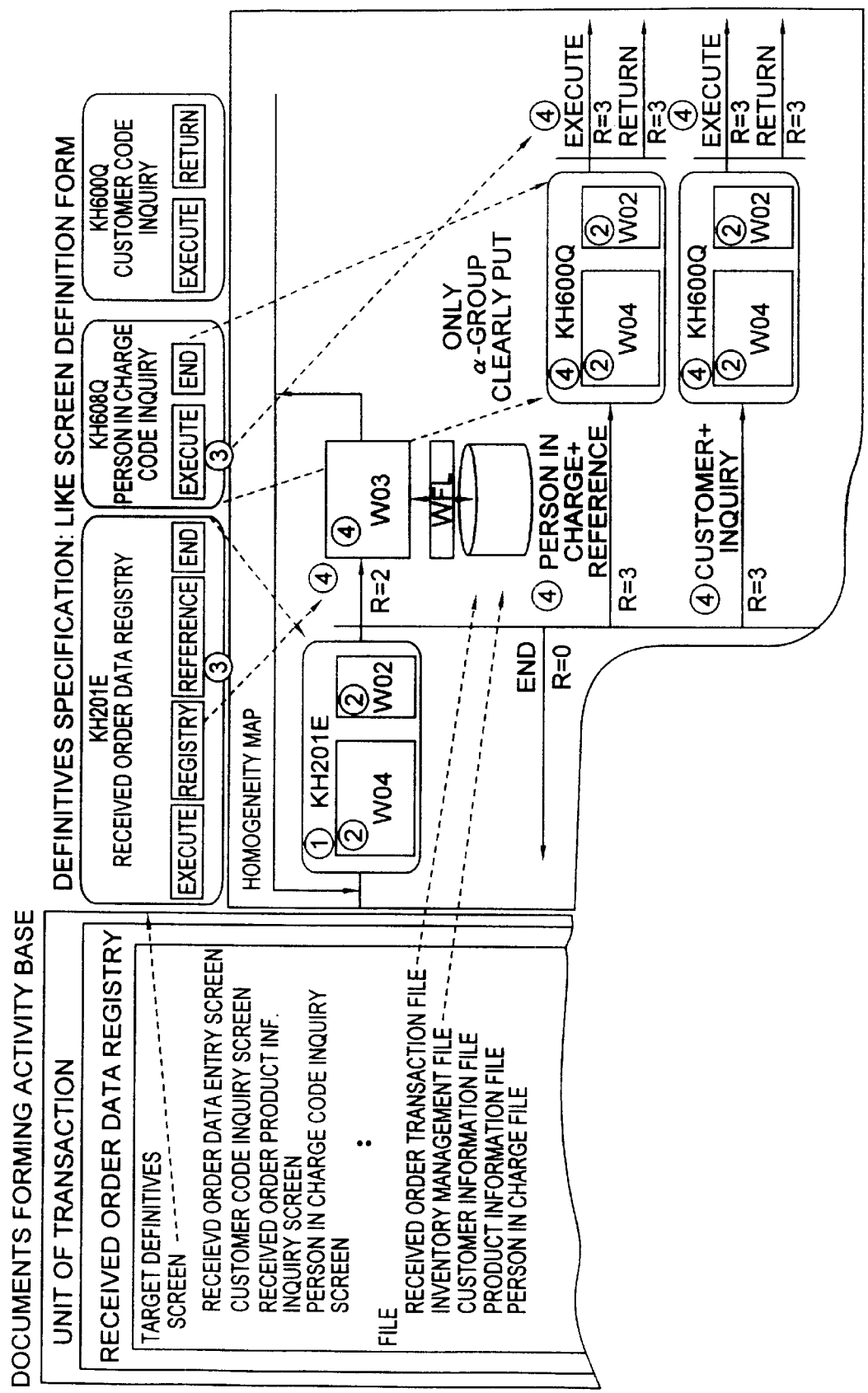
FIG. 40 indicates the method of making the homogeneity map.

FIG. 40 shows the method of making the homogeneity map.

(1) One shall confirm a screen for the menu to shift to at first, and make a framed space for the screen in the left-upper corner on the homogeneity map sheet.

(2) One shall make unconditionally a frame for W04 and W02 into this frame.

(3) One shall confirm the function key (button) on the screen, as well as distinguish between the screen to shift to upon pressing the key (button) and the function to be kept until the shift to the screen (*1: simple data hand-over/*2: file making & updating/*3: operation & confirmation without file making or updating has been completed.

(4) As the following example, one shall draw diverging branches in the right of W02, in accordance with the distinguishing result of the above (3).

*1: Simple data hand-over→Specifying the functional key, Homogeneity map (R)=3, the frame of next screen's frame

*2: File making & updating→Specifying the functional key, Homogeneity map (R)=2, the frame of W03

However, when a file to be made is other than the basic items, homogeneity map (R)=4, the frame of WFL

*3: Simple operation & confirmation→Specifying the functional key, Homogeneity map (R)=1, the frame of W03

(5). Hereafter, one shall repeat the above (2) to (4) for all screens inside the unit of the homogeneity map.

Figure 41:
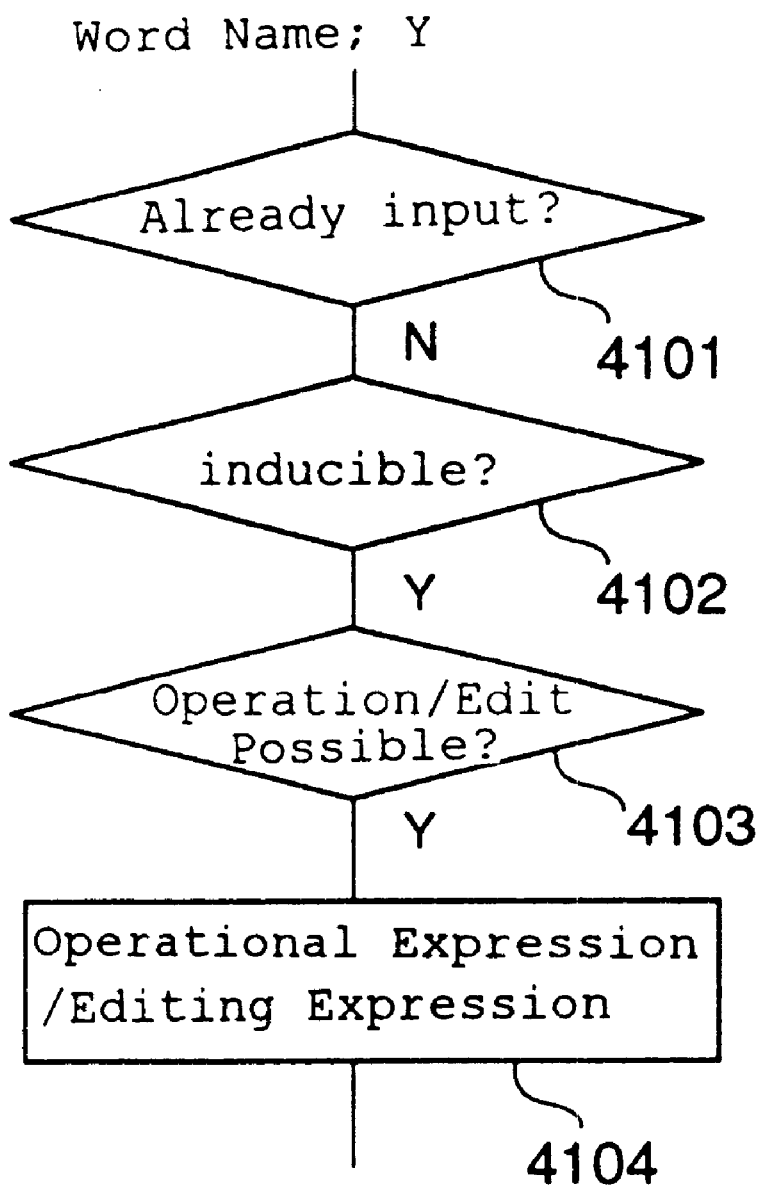
FIG. 41 indicates the homogeneity vector.
Figure 46:
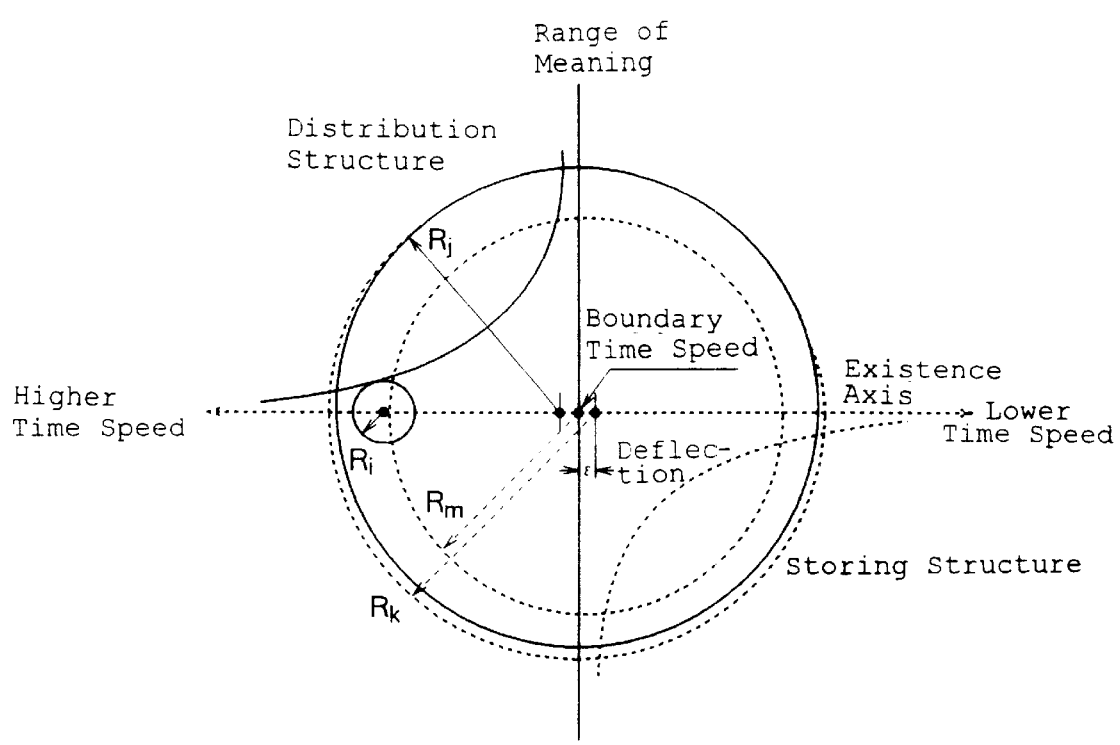
FIG. 46 shows a structure model of the idea-space created by the elementary which emerges into the idea space.
Figure 47:
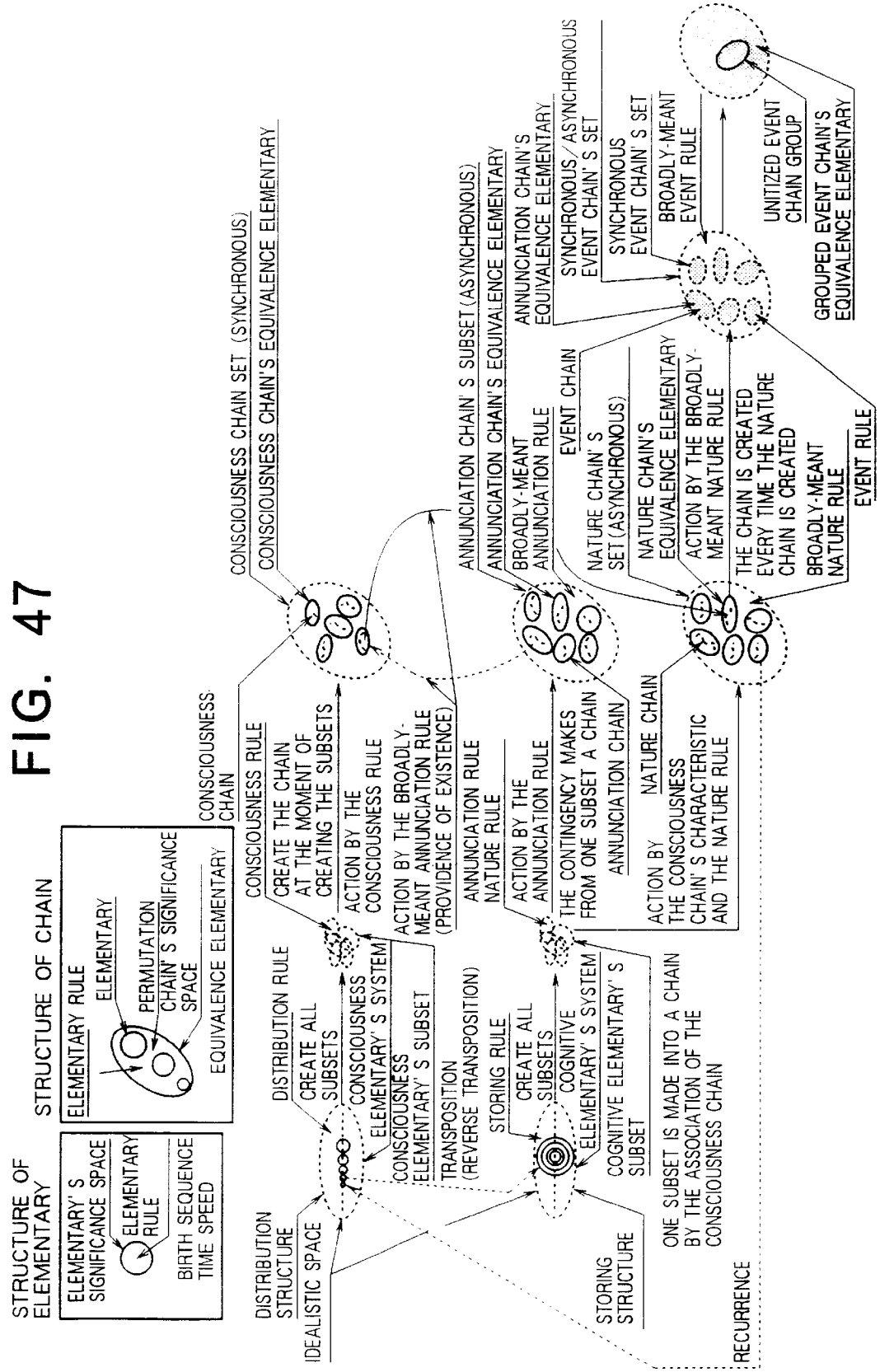
FIG. 47 is a supplemental explanation of the structure of the elementary and the structure of the chain.
Figure 48:
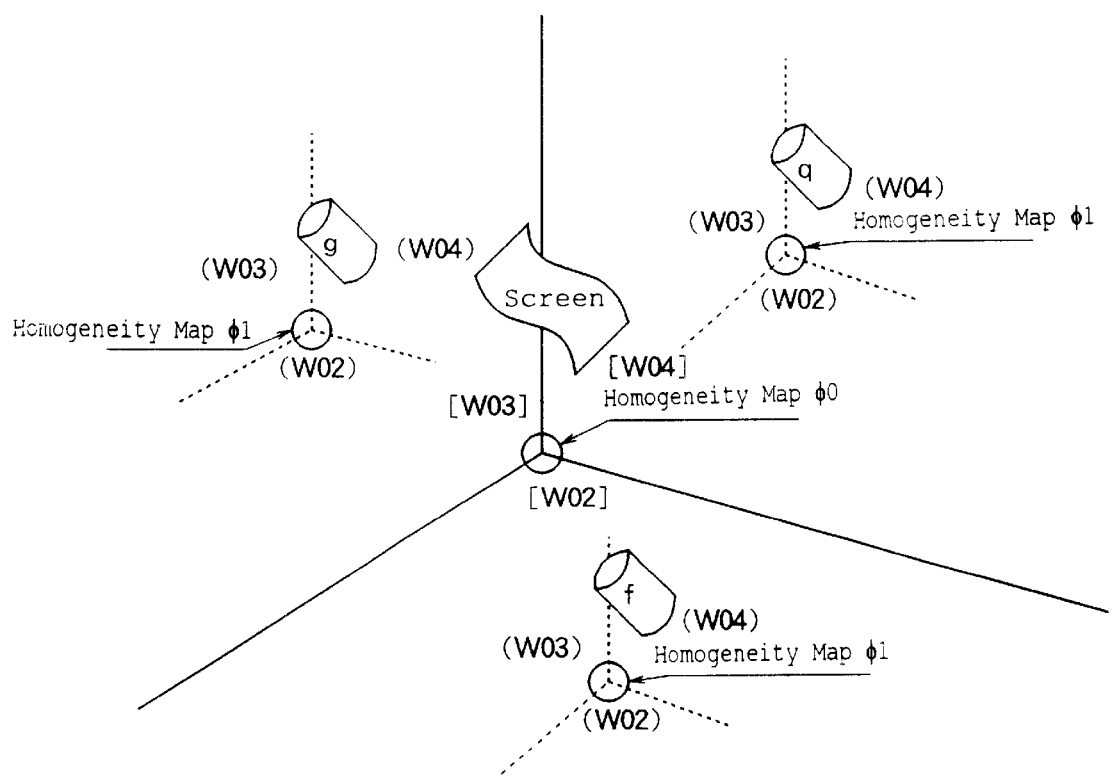
FIG. 48 shows the space paradigm.

In the following, the method of making the tense control vector specifications is explained based on FIG. 41. FIG. 41 indicates the homogeneity vector.

The condition for determining the "Input done" of step 4101 can be judged with the attribute and the initial value (known from the definitives definition document), and the others are all regulations in the course of realization by Lyee. Thus, no documents are required.

The condition for determining the "Inducibility" of step 4102 is whether the operational expression/editing expression is clear or not. Thus, no documents are required.

The condition for determining the "Operatability" of step 4103 is whether the value of the right side of the, is operational expression/editing expression may be used for the calculation or not, which is a condition that can be determined from the operational expression. Thus, no documents are required.

In step 4104, for example the following:

an expression like $$"Y=aX+bZ*cW"$$

and,

The range of possible values and particular conditions taken by a, b, c, X, Z, W and, The conditions to executing this computational formula (Multiple computational formulas are possible for one word), are to be questioned to users for each word and the answers are to be taken as a memo.

FIG. 42 and FIG. 43 show examples of the tense control vector specifications.

FIG. 44 shows an example of the programming based on the tense control vector specifications.

In this program, (1) to (4) are made from the rule of Lyee. That is, these are the particular conditions of Lyee, so interacting with users are not necessary. (5) is to be made from the operational significant conditions of the tense control vector and the code table. (6) is to be made from the operational expression of the tense control vector. (5) and (6) are to be determined and made into the documentation through interaction with the users, a hand-over document, "code table".

Hereinafter, the sample the program made by Lyee is illustrated.

1. Drawings Specifications (Order Entry (Distribution))

```
KH201E          Received Order Entry (Distribution)            DD/DD/DD          TT:TT:TT
   O P C D    0000000000000000         Estimate No.   BBBBBBBB   *Received Order Classification BB  00000000
*  Customer              BBBBBBBB   0000000000000000000000000000000            TEL 000000000000
*  Delivery Destination  BBBBBBBB   0000000000000000000000000000000            FAX 000000000000
*  Warehouse BB   000000000000    *Person In Charge BBBBBBB   000000000000000000   Received Order No. 00000000
                                                                                              Wholesale Rate
NO  Product Code        Product Name                      Quantity   Previous Unit Price  Unit Price   Delivery Deadline
    Other Party Product Types & Media/Product #           Inventory  Price                Amount       Order No.

1   BBBBBBBBBBB         BBBBBBBBBBBBBBBBBBBBBBBB          9999       6,666,666            9,999,999    BBB   999999
0   0000000000000                BBBBBBBBBBBBBBBBBBBBBBB  6,666      6,666,666            666,666,666        BBBBBBBB
2   BBBBBBBBBBB         BBBBBBBBBBBBBBBBBBBBBBBB          9999       6,666,666            9,999,999    BBB   999999
0   0000000000000                BBBBBBBBBBBBBBBBBBBBBBB  6,666      6,666,666            666,666,666        BBBBBBBB
3   BBBBBBBBBBB         BBBBBBBBBBBBBBBBBBBBBBBB          9999       6,666,666            9,999,999    BBB   999999
0   0000000000000                BBBBBBBBBBBBBBBBBBBBBBB  6,666      6,666,666            666,666,666        BBBBBBBB
4   BBBBBBBBBBB         BBBBBBBBBBBBBBBBBBBBBBBB          9999       6,666,666            9,999,999    BBB   999999
0   0000000000000                BBBBBBBBBBBBBBBBBBBBBBB  6,666      6,666,666            666,666,666        BBBBBBBB
5   BBBBBBBBBBB         BBBBBBBBBBBBBBBBBBBBBBBB          9999       6,666,666            9,999,999    BBB   999999
0   0000000000000                BBBBBBBBBBBBBBBBBBBBBBB  6,666      6,666,666            666,666,666        BBBBBBBB
6   BBBBBBBBBBB         BBBBBBBBBBBBBBBBBBBBBBBB          9999       6,666,666            9,999,999    BBB   999999
0   0000000000000                BBBBBBBBBBBBBBBBBBBBBBB  6,666      6,666,666            666,666,666        BBBBBBBB
    Wholesale Cost No.  666                                          Total Amount         6,666,666,666
```

Order-Originating Person BBBBBBBB
Mr/Mrs. Remarks BBBBBBBBBBBBBBBBBBBBBBBBBBBB BBBBBBBBBBBBBBBBBBBBBBB
*Direct Shipment Classification B
Delivery Deadline 999999
Customer's Order Slip No. BBBBBBBB
*Dispatch B 00000000000000
F1-Registry
F1-Reference
F5-Credit Inquiry
F10/F11-Product Entry (S/H)
F12-Cancel   F8

```
2-1.  HDR
PW1 V2R3M0   931105              SEU Origin List
File           . . . . . . CTN010/QDDSSRC
Bar            . . . . . . . . K052BP01
R*...+... 1 ...+... 2 ...+... 3 ...+... 4 ...+... 5 ...+... 6 ... +... 7 ...+..
A*****************************************************************************
A*    System Name       = Catena New Sales/Distribution Management System
A*    File Name         = Receive Transaction File HDR
A*    DDS Type          = PF
A*
A*    Entry Date        = 95/ 8/24
A*    Change Date       = 95/ 9/05
A*****************************************************************************
A*
A      R KD52RC           TEXT(' Receive Transaction File HDR                  R ')
A*
A      KD1830      18A    COLHDG('IDX 1 Mgt. SN                                 ')
A      KD0325       8S 0  COLHDG('Record Date                                   ')
A      KD0324       6S 0  COLHDG('Record Time                                   ')
A      KDS208       1A    COLHDG('Delete Status                                 ')
A      KD1084       7A    COLHDG('Person In Charge Code                         ')
A      KD1535       5A    COLHDG('Person In Charge Dept. Code                   ')
A      KD1179       7A    COLHDG('Reg. Per. Code                                ')
A      KD1181       5A    COLHDG('Reg. Per Dept. Code                           ')
A      KDU975      18A    COLHDG('Change Orig. Mgt. SN                          ')
A      KD1836       1A    COLHDG('HS Cl.                                        ')
A      KDU277       1A    COLHDG('Sales Cl.                                     ')
A      KD1838       1A    COLHDG('Kinds of Transaction                          ')
A      KD1839       2A    COLHDG('Shipment Reason                               ')
A      KD1840       2A    COLHDG('Arrival Reason                                ')
A      KDS429       1A    COLHDG('Trns. F Cl.:E                                 ')
A      KD1843       8S 0  COLHDG('F Entry Date                                  ')
A      KD1844       8S 0  COLHDG('Trns. No.                                     ')
A      KDC766       7A    COLHDG('BS Report No.                                 ')
A      KD1847       9A    COLHDG('Customer Code                                 ')
A      KD1848     220     COLHDG('Name of Customer Person In Charge             ')
A      KD4044      20A    COLHDG('Name (Kana) of Customer Person In Charge      ')
A      KD4000     420     COLHDG('Trns. Name                                    ')
```

-continued

| | | | | |
|---|---|---|---|---|
| A | KD1849 | 280 | COLHDG('Trns. Valid Period | ') |
| A | KD1850 | 2S 0 | COLHDG('No. of TXT Lines | ') |
| A | KD1851 | 8S 0 | COLHDG('Trns. End Date Sched. | ') |
| A | KD1852 | 18A | COLHDG('HDR Mgt. SN | ') |
| A | KD1854 | 13P 0 | COLHDG('Trns. Total Amount | ') |
| A | KD1855 | 13P 0 | COLHDG('Trns. Total Amt. inclusive of Consumption Tax | ') |
| A | KD1856 | 13P 0 | COLHDG('Qty Pr. Total Amt. | ') |
| A | KD1857 | 13P 0 | COLHDG('Qty Unit Price Total Amt. | ') |
| A | KD1858 | 13P 0 | COLHDG('Qty Unit Price Disc. Total Amt. | ') |
| A | KD1859 | 13P 0 | COLHDG('C. Tax Total Amt. | ') |
| A | KDU360 | 1A | COLHDG('Disc. Cl. | ') |
| A | KDB001 | 4S 2 | COLHDG('Sales Unit Price Disc. Rate | ') |
| A | KD1099 | 13P 0 | COLHDG('Disc. Total Amt. | ') |
| A | KD1865 | 9P 2 | COLHDG('Total No. of Prod. Transacted | ') |
| A | KDU470 | 7P 0 | COLHDG('Total No. of Prod. Untransacted | ') |
| A | KD1866 | 7P 0 | COLHDG('No. of Possible Security Prod. | ') |
| A | KD1867 | 7P 0 | COLHDG('No. of Impossible Security Prod. | ') |
| A | KD0439 | 7S 0 | COLHDG('Settlement Bank Code | ') |
| A | KD1877 | 1S 0 | COLHDG('Credit Sales Acceptance FLG | ') |
| A | KDO019 | 13P 0 | COLHDG('Credit Sales Total Amt. | ') |
| A | KD0020 | 13P 0 | COLHDG('Credit Sales Paid-in Amt. | ') |
| A | KD0021 | 8S 0 | COLHDG('Credit Sales Strike-out Date | ') |
| A | KD0022 | 13P 0 | COLHDG('Credit Sales Not Striked-out | ') |
| A | KD1878 | 1S 0 | COLHDG('Credit Purchase Acpt. FLG | ') |
| A | KD0023 | 13P 0 | COLHDG('Credit Purchase Total Amt. | ') |
| A | KD0024 | 13P 0 | COLHDG('Credit Purchase Payment Amt | ') |
| A | KD0025 | 8S 0 | COLHDG('Credit Purchase Strike-out Data | ') |
| A | KD0026 | 13P 0 | COLHDG('Credit Purchase Strike-out Remainder | ') |
| A | KD1412 | 1A | COLHDG('Dispatch Cl. | ') |
| A | KD4045 | 2A | COLHDG('Dispatcher Code | ') |
| A | KD4046 | 1A | COLHDG('Group Packing Cl. No. | ') |
| A | KDO059 | 1A | COLHDG('Delivery Note Issuance FLG | ') |
| A | KDS228 | 1A | COLHDG('KH3010 Issuance Instm. FLG | ') |
| A | KDS229 | 1A | COLHDG('KG3020 Issuance Instm. FLG | ') |
| A | KDS242 | 1A | COLHDG('KH4090 Issuance Instm. FLG | ') |
| A | KDS284 | 1A | COLHDG('KH5260 Issuance Instm. FLG | ') |
| A | KDS398 | 1A | COLHDG('Reserve 1 | ') |
| A | KDS399 | 1A | COLHDG('Reserve 2 | ') |
| A | KDS400 | 1A | COLHDG('Reserve 3 | ') |
| A | KDS401 | 1A | COLHDG('Reserve 4 | ') |
| A | KDS402 | 1A | COLHDG('Order Acpt. Center Person In Charge Cl. | ') |
| A** | | | | |
| A | KDS403 | 1A | COLHDG('Change Screen Cl. | ') |
| A** | | | | |
| A** | | | | |
| A** | | | | |
| A** | | | | |
| A | KDS404 | 1A | COLHDG('Reserve 7 | ') |
| A | KDS405 | 1A | COLHDG('Acct. I/F Done FLG | ') |
| A | KDS406 | 1A | COLHDG('Reverse G-NG Cl. | ') |
| A | KDS407 | 1A | COLHDG('Over Credit Limit Amt. FLG | ') |
| A | KDS408 | 1A | COLHDG('Next Trns. Shift FLG | ') |
| A | KDS409 | 1A | COLHDG('Trns. Correction Done FLG | ') |
| A | KD4028 | 8S 0 | COLHDG('Estimate No. | ') |
| A | KD4029 | 8S 0 | COLHDG('Rec. Order No. | ') |
| A | KDU452 | 2S 0 | COLHDG('Rec. Order Line No. | ') |
| A | KD4030 | 8S 0 | COLHDG('Placed Order No. | ') |
| A | KDU453 | 2S 0 | COLHDG('Placed Order Line No. | ') |
| A | KD4031 | 8S 0 | COLHDG('Buying-in No. | ') |
| A | KDU454 | 2S 0 | COLHDG('Buying-in Line No. | ') |
| A | KD4032 | 8S 0 | COLHDG('Shipping No. | ') |
| A | KDU455 | 2S 0 | COLHDG('Ship. Line No. | ') |
| A | KD4033 | 8S 0 | COLHDG('Payment No. | ') |
| A | KD4034 | 8S 0 | COLHDG('Paid-in No. | ') |
| A | KD4035 | 8S 0 | COLHDG('Sales No. | ') |
| A | KDU456 | 2S 0 | COLHDG('Sales Line No. | ') |
| A | KD4036 | 8S 0 | COLHDG('Move No. | ') |
| A | KDU457 | 2S 0 | COLHDG('Move Line No. | ') |
| A | KDU289 | 8S 0 | COLHDG('Sales Return Appln. No. | ') |
| A | KDU458 | 2S 0 | COLHDG('Sales Return Appln. Line | ') |
| A | KDU290 | 8S 0 | COLHDG('Buying-in Return Appln. No. | ') |
| A | KDU459 | 2S 0 | COLHDG('Buying-in Return Appln. Line | ') |
| A | KDS563 | 8S 0 | COLHDG('Resell No. | ') |
| A | KD1057 | 8S 0 | COLHDG('Loan No. | ') |
| A | KDU936 | 2S 0 | COLHDG('Loan Line No. | ') |
| A | KDU937 | 8S 0 | COLHDG('Loan Return No. | ') |
| A | KDU938 | 2S 0 | COLHDG('Loan Return Line No. | ') |
| A | KD0944 | 7A | COLHDG('Bill No. | ') |
| A | KD0511 | 2A | COLHDG('Account Cl. | ') |

-continued

| | | | | |
|---|---|---|---|---|
| A | KD0512 | 7A | COLHDG('Account # | ') |
| A | KD1786 | 420 | COLHDG('Remarks 1 | ') |
| A | KD1787 | 420 | COLHDG('Remarks 2 | ') |
| A | KDS410 | 420 | COLHDG('Remarks 3 | ') |
| A | KDS411 | 420 | COLHDG('Remarks 4 | ') |
| A | KDS412 | 420 | COLHDG('Remarks 5 | ') |
| A | KD4037 | 200 | COLHDG('Customer Trns. No. | ') |
| A | KDS564 | 1A | COLHDG('Customer Slips Genuine/Temp. Cl. | ') |
| A | KDS565 | 1A | COLHDG('Inventory Security Done FLG | ') |
| A | KDO959 | 9A | COLHDG('Billing Code | ') |
| A | KD1571 | 2A | COLHDG('Return Reason Code | ') |
| A | KD1447 | 2A | COLHDG('Sales Cl. | ') |
| A | KDU309 | 1A | COLHDG('Consumption Tax Y/N Cl. | ') |
| A | KDU364 | 1A | COLHDG('Sales Sum-up Cl. | ') |
| A | KDO201 | 1A | COLHDG('Install Cl. | ') |
| A | KD0692 | 1A | COLHDG('Auto. Shipping Cl. | ') |
| A | KDS566 | 1A | COLHDG('Partial Delivery Possibility Cl. | ') |
| A | KD0121 | 6A | COLHDG('IBM Customer Code | ') |
| A | KDS567 | 1A | COLHDG('Maker's Direct Distribution Cl. | ') |
| A | KDS568 | 1A | COLHDG('Catena Direct Distribution Cl. | ') |
| A | KDS027 | 8A | COLHDG('Acct Customer Code | ') |
| A | KD0654 | 1A | COLHDG('Designated Slip Cl. | ') |
| A | KDV201 | 11A | COLHDG('Customer Designated Trns. No. | ') |
| A | KD1261 | 10A | COLHDG('Customer name (kana) | ') |
| A | KDV320 | 1A | COLHDG('EOS Cl. | ') |
| A | KDV321 | 1A | COLHDG('Reserve Cl. 2 | ') |
| A | KD1771 | 10A | COLHDG('Delivery Destination Code | ') |
| A | KD1772 | 10A | COLHDG('Reserve 2 | ') |
| A | KD1773 | 10A | COLHDG('Reserve 3 | ') |
| A* | | | | |
| A | K KD1852 | | | |
| A* | | | | |

\* \* \* End of Origin Specification \* \* \*

---

2-2. DTL
PW1 V2R3M0   931105                    SEU Origin List
File           . . . . . . CTN010/QDDSSRC
Bar            . . . . . . . . K052BP02
R*...+... 1 ...+... 2 ...+... 3 ...+... 4 ...+... 5 ...+... 6 ... +... 7 ...+..
A*****************************************************************
| | | | | |
|---|---|---|---|---|
| A* | System Name | | = Catena New Sales/Distribution Management System | |
| A* | File Name | | = Receive Transaction File DTL | |
| A* | DDS Type | | = PF | |
| A* | | | | |
| A* | Entry Date | | = 95/ 8/30 | |
| A* | Change Date | | = 95/ 8/30 | |

A*****************************************************************
| | | | | |
|---|---|---|---|---|
| A* | | | | |
| A | | | UNIQUE | |
| A | R KE52RC | | TEXT('Receive Transaction File DTL | ') |
| A | KE4001 | 18A | COLHDG('TXT Mgt. SN (Serial No.) | ') |
| A | KE1879 | 2S 0 | COLHDG('TXT No. | ') |
| A | KES208 | 1A | COLHDG('Reserve Cl. (delete) | ') |
| A | KE1084 | 7A | COLHDG('Person In Charge Code | ') |
| A | KE1535 | 5A | COLHDG('Person In Charge Dept. Code | ') |
| A | KEU277 | 1A | COLHDG('Sales Cl. | ') |
| A | KE1838 | 1A | COLHDG('Kinds of Transacton | ') |
| A | KE1839 | 2A | COLHDG('Shipment Reason | ') |
| A | KE1840 | 2A | COLHDG('Arrival Reason | ') |
| A | KE1843 | 8S 0 | COLHDG('F Entry Date | ') |
| A | KE1844 | 8S 0 | COLHDG('Trns. No. | ') |
| A | KE1847 | 9A | COLHDG('Customer Code | ') |
| A | KE1447 | 2A | COLHDG('Sales Cl. | ') |
| A | KES567 | 1A | COLHDG('Maker's Direct Distribution Cl. | ') |
| A | KES568 | 1A | COLHDG('Catena Direct Distribution Cl. | ') |
| A | KE1836 | 1A | COLHDG('HS Cl. | ') |
| A | KE4101 | 12A | COLHDG('Product Code 1 | ') |
| A | KEQ027 | 600 | COLHDG('Product Code Product Name | ') |
| A | KE0130 | 13A | COLHDG('JAN Code | ') |
| A | KE4301 | 260 | COLHDG('Product Name (Abbrev.) 1 | ') |
| A | KE4351 | 12A | COLHDG('Type Name (Abbrev.) 1 | ') |
| A | KE4401 | 10A | COLHDG('Media Name 1 | ') |
| A | KE4451 | 15A | COLHDG('Product No. 1 | ') |
| A | KE4042 | 13A | COLHDG('Customer Product Code | ') |

-continued

| | | | | |
|---|---|---|---|---|
| A | KE5001 | 7P 2 | COLHDG('No. of Transacted Products | ') |
| A | KES413 | 5P 0 | COLHDG('Estimated No. of Transacted Products | ') |
| A | KEU471 | 5P 0 | COLHDG('Balance of Transacted Products | ') |
| A | KE5351 | 1S 0 | COLHDG('Freq. of Security | ') |
| A | KE5051 | 200 | COLHDG('Customer Trns. No. | ') |
| A | KE0747 | 1A | COLHDG('Agency Cl. | ') |
| A | KE5101 | 1A | COLHDG('Inventory Cl. 1 | ') |
| A | KE5151 | 9A | COLHDG('Inventory Location Code 1 | ') |
| A | KES201 | 1A | COLHDG('Security Method 1 | ') |
| A | KE1070 | 5A | COLHDG('Shelf No. 1 | ') |
| A | KE5251 | 1A | COLHDG('Product Status Cl.1 | ') |
| A | KE5301 | 7P 0 | COLHDG('Nm. of Inventory Location Stock 1 | ') |
| A | KES203 | 7P 0 | COLHDG('Inventory Location Security No. 1 | ') |
| A | KE5102 | 1A | COLHDG('Inventory Cl. 2 | ') |
| A | KD5152 | 9P | COLHDG('Inventory Location Code 2 | ') |
| A | KD5202 | 1A | COLHDG('Security Method 2 | ') |
| A | KD1071 | 5A | COLHDG('Shelf No. 2 | ') |
| A | KE5252 | 1A | COLHDG('Product Status Cl. 2 | ') |
| A | KE5302 | 7P 0 | COLHDG('Nm. of Inventory Location Stock 2 | ') |
| A | KES204 | 7P 0 | COLHDG('Inventory Location Security No. 2 | ') |
| A | KE5103 | 1A | COLHDG('Inventory Cl. 3 | ') |
| A | KE5153 | 9A | COLHDG('Inventory Location Code 3 | ') |
| A | KE5203 | 1A | COLHDG('Security Method 3 | ') |
| A | KE1072 | 5A | COLHDG('Shelf No. 3 | ') |
| A | KE5253 | 1A | COLHDG('Product Status Cl. 3 | ') |
| A | KE5303 | 7P 0 | COLHDG('Nm. of Inventory Location Stock 3 | ') |
| A | KES205 | 7P 0 | COLHDG('Inventory Location Security No. 3 | ') |
| A | KE5104 | 1A | COLHDG('Inventory Cl. 4 | ') |
| A | KE5154 | 9A | COLHDG('Inventory Location Code 4 | ') |
| A | KE5204 | 1A | COLHDG('Security Method 4 | ') |
| A | KE1073 | 5A | COLHDG('Shelf No. 4 | ') |
| A | KE5254 | 1A | COLHDG('Product Status Cl. 4 | ') |
| A | KE5304 | 7P 0 | COLHDG('Nm. of Inventory Location Stock 4 | ') |
| A | KES206 | 7P 0 | COLHDG('Inventory Location Security No. 4 | ') |
| A | KE5105 | 1A | COLHDG('Inventory Cl. 5 | ') |
| A | KE5155 | 9A | COLHDG('Inventory Location Code 5 | ') |
| A | KE5205 | 1A | COLHDG('Security Method 5 | ') |
| A | KES428 | 5A | COLHDG('Shelf No. 5 | ') |
| A | KE5255 | 1A | COLHDG('Product Status Cl. 5 | ') |
| A | KE5305 | 7P 0 | COLHDG('Nm. of Inventory Location Stock 5 | ') |
| A | KES207 | 7P 0 | COLHDG('Inventory Location Security No. 5 | ') |
| A | KE1904 | 7P 0 | COLHDG('Product Security Total | ') |
| A | KEU480 | 620 | COLHDG('Final Arrival Point Name 1 1 | ') |
| A | KE5551 | 8A | COLHDG('Final Arrival Point Postal Code 1 | ') |
| A | KE5601 | 420 | COLHDG('Final Arrival Point Address 1-1 | ') |
| A | KE5651 | 420 | COLHDG('Final Arrival Point Address 2-1 | ') |
| A | KE5701 | 420 | COLHDG('Final Arrival Point Address 3-1 | ') |
| A | KE5751 | 320 | COLHDG('Final Arrival Point Department 1 | ') |
| A | KE5801 | 220 | COLHDG('Final Arrival Point Person In Charge 1 | ') |
| A | KE5851 | 12A | COLHDG('Final Arrival Point TEL 1 | ') |
| A | KE5901 | 12A | COLHDG('Final Arrival Point FAX 1 | ') |
| A | KE9101 | 5P 0 | COLHDG('Nm. of Arrival Products at Arrival-point 1 | ') |
| A | KE5401 | 9A | COLHDG('Start Point Location Code 1 | ') |
| A | KE5451 | 9A | COLHDG('Arrival Point Location Code 1 | ') |
| A | KE5501 | 9A | COLHDG('Final Arrival Point Code 1 | ') |
| A | KE5951 | 8S 0 | COLHDG('Arrival-point Arrival Schedule 1 | ') |
| A | KE6001 | 8S 0 | COLHDG('Final Arrival-point Arrival Schedule 1 | ') |
| A | KE6051 | 1A | COLHDG('Routing Judgement 1 | ') |
| A | KES569 | 1A | COLHDG('Early/Mid/Late of Month Schl. Cl. 1 | ') |
| A | KEU460 | 8S 0 | COLHDG('Trns. Done No. 1 1 | ') |
| A | KEU461 | 2S 0 | COLHDG('Trns. Done Line No. 1 | ') |
| A | KE9351 | 5P 0 | COLHDG('Nm. of Arrival Products at Arrival-point 2 | ') |
| A | KE6102 | 9A | COLHDG('Start Point Location Code 2 | ') |
| A | KE6152 | 9A | COLHDG('Arrival Point Location Code 2 | ') |
| A | KE6202 | 9A | COLHDG('Final Arrival Point Code 2 | ') |
| A | KE6652 | 8S 0 | COLHDG('Arrival-point Arrival Schedule 2 | ') |
| A | KE6702 | 8S 0 | COLHDG('Final Arrival-point Arrival Schedule 2 | ') |
| A | KE6752 | 1A | COLHDG('Routing Judgement 2 | ') |
| A | KES570 | 1A | COLHDG('Early/Mid/Late of Month Schl. Cl. 2 | ') |
| A | KEU462 | 8S 0 | COLHDG('Trns. Done No. 2 1 | ') |
| A | KEU463 | 2S 0 | COLHDG('Trns. Done Line No. 2 | ') |
| A | KE9601 | 5P 0 | COLHDG('Nm. of Arrival Products at Arrival-Point 3 | ') |
| A | KE6103 | 9A | COLHDG('Start Point Location Code 3 | ') |
| A | KE6153 | 9A | COLHDG('Arrival Point Location Code 3 | ') |
| A | KE6903 | 9A | COLHDG('Final Arrival Point Code 3 | ') |
| A | KE7353 | 8S 0 | COLHDG('Arrival-point Arrival Schedule 3 | ') |
| A | KE7403 | 8S 0 | COLHDG('Final Arrival-point Arrival Schedule 3 | ') |
| A | KE7453 | 1A | COLHDG('Routing Judgement 3 | ') |
| A | KES571 | 1A | COLHDG('Early/Mid/Late of Month Schl. Cl. 3 | ') |

-continued

| | | | |
|---|---|---|---|
| A | KEU464 | 8S 0 | COLHDG('Trns. Done No. 3 1') |
| A | KEU465 | 2S 0 | COLHDG('Trns. Done Line No. 3') |
| A | KE9851 | 5P 0 | COLHDG('Nm. of Arrival-products at Arrival-Point 4') |
| A | KE7504 | 9A | COLHDG('Start Point Location Code 4') |
| A | KE7554 | 9A | COLHDG('Arrival Point Location Code 4') |
| A | KE7604 | 9A | COLHDG('Final Arrival Point Code 4') |
| A | KE8054 | 8S 0 | COLHDG('Arrival-point Arrival Schedule 4') |
| A | KE8104 | 8S 0 | COLHDG('Final Arrival-point Arrival Schedule 4') |
| A | KE8154 | 1A | COLHDG('Routing Judgement 4') |
| A | KES572 | 1A | COLHDG('Early/Mid/Late of Month Schl. Cl. 4') |
| A | KEU466 | 8S 0 | COLHDG('Trns. Done No. 4 1') |
| A | KEU467 | 2S 0 | COLHDG('Trns. Done Line No. 4') |
| A | KEA101 | 5P 0 | COLHDG('Nm. of Arrival-products at Arrival-Point 5') |
| A | KE8205 | 9A | COLHDG('Start Point Location Code 5') |
| A | KE8255 | 9A | COLHDG('Arrival Point Location Code 5') |
| A | KE8305 | 9A | COLHDG('Final Arrival Point Code 5') |
| A | KE8755 | 8S 0 | COLHDG('Arrival-point Arrival Schedule 5') |
| A | KE8805 | 8S 0 | COLHDG('Final Arrival-point Arrival Schedule 5') |
| A | KE8855 | 1A | COLHDG('Routing Judgement 5') |
| A | KES573 | 1A | COLHDG('Early/Mid/Late of Month Schl. Cl. 5') |
| A | KEU468 | 8S 0 | COLHDG('Trns. Done No. 5 1') |
| A | KEU469 | 2S 0 | COLHDG('Trns. Done Line No. 5') |
| A | KE4005 | 7P 0 | COLHDG('Procurement Impossible Total') |
| A | KE1124 | 13P 3 | COLHDG('Regular Price') |
| A | KEA651 | 13P 3 | COLHDG('Manufacturing Unit Price') |
| A | KEA701 | 4S 2 | COLHDG('Manufacturing Unit Price Discount Rate') |
| A | KEA751 | 4S 2 | COLHDG('Manufacturing Special Discount Rate') |
| A | KEA801 | 13P 3 | COLHDG('Buying-in Unit Price') |
| A | KEU472 | 9P 0 | COLHDG('Buying-in Unit Price Discount Amount') |
| A | KEA851 | 4S 2 | COLHDG('Buying-in Unit Price Discount Rate') |
| A | KEA901 | 4S 2 | COLHDG('Buying-in Special Discount Rate') |
| A | KEA951 | 13P 3 | COLHDG('Sales Unit Price') |
| A | KEU473 | 9P 0 | COLHDG('Sales Unit Price Discount Amount') |
| A | KEB001 | 4S 2 | COLHDG('Sales Unit Price Discount Rate') |
| A | KEB151 | 4S 2 | COLHDG('Sales Special Discount Rate') |
| A | KEB701 | 13P 3 | COLHDG('Loan Unit Price') |
| A | KEU478 | 9P 0 | COLHDG('Loan Unit Price Discount Amount') |
| A | KEB751 | 4S 2 | COLHDG('Loan Unit Price Discount Rate') |
| A | KEB801 | 4S 2 | COLHDG('Loan Special Discount Rate') |
| A | KEC001 | 9P 0 | COLHDG('Sales/Buying-in Rough Profit') |
| A | KEC151 | 5S 2 | COLHDG('Sales/Buying-in Rough Profit Rate') |
| A | KE0373 | 3S 0 | COLHDG('Wholesale Rate') |
| A | KEC201 | 9P 0 | COLHDG('Transacted Quantity Unit Price Amount') |
| A | KEC251 | 9P 0 | COLHDG('Transacted Quantity Unit Price Discount Amount') |
| A | KES002 | 9P 0 | COLHDG('Transaction on Consumption tax Amount') |
| A | KE4028 | 8S 0 | COLHDG('Estimate No.') |
| A | KE4029 | 8S 0 | COLHDG('Rec. Order No.') |
| A | KEU452 | 2S 0 | COLHDG('Rec. Order Line No.') |
| A | KE4030 | 8S 0 | COLHDG('Placed Order No.') |
| A | KEU453 | 2S 0 | COLHDG('Placed Order Line No.') |
| A | KE4031 | 8S 0 | COLHDG('Buying-in No.') |
| A | KEU454 | 2S 0 | COLHDG('Buying-in Line No.') |
| A | KE4032 | 8S 0 | COLHDG('Shipping No.') |
| A | KEU455 | 2S 0 | COLHDG('Ship. Line No.') |
| A | KE4033 | 8S 0 | COLHDG('Payment No.') |
| A | KE4034 | 8S 0 | COLHDG('Paid-in No.') |
| A | KE4035 | 8S 0 | COLHDG('Sales No.') |
| A | KEU456 | 2S 0 | COLHDG('Sales Line No.') |
| A | KE4036 | 8S 0 | COLHDG('Move No.') |
| A | KEU457 | 2S 0 | COLHDG('Move Line No.') |
| A | KEU289 | 8S 0 | COLHDG('Sales Return Appln. No.') |
| A | KEU453 | 2S 0 | COLHDG('Sales Return Appln. Line 0') |
| A | KEU290 | 8S 0 | COLHDG('Buying-in Return Appln. No.') |
| A | KEU459 | 2S 0 | COLHDG('Buying-in Return Appln. Line 0') |
| A | KES563 | 8S 0 | COLHDG('Resell No.') |
| A | KE1057 | 8S 0 | COLHDG('Loan No.') |
| A | KEU936 | 2S 0 | COLHDG('Loan Line No.') |
| A | KEU937 | 8S 0 | COLHDG('Loan Return No.') |
| A | KEU938 | 2S 0 | COLHDG('Loan Return Line No.') |
| A | KE0944 | 7A | COLHDG('Bill No.') |
| A | KE1571 | 2A | COLHDG('Reason Code') |
| A | KEU529 | 1A | COLHDG('Payment Hold Cl.') |
| A | KET013 | 40A | COLHDG('Product Name (kana)') |
| A | KET030 | 9A | COLHDG('Reserve A') |
| A | KET031 | 9A | COLHDG('Reserve B') |
| A | KET032 | 9A | COLHDG('Reserve C') |
| A | KET033 | 9A | COLHDG('Reserve D') |
| A | KET034 | 9A | COLHDG('Reserve E') |
| A | KET035 | 9A | COLHDG('Reserve F') |

-continued

| | | | | |
|---|---|---|---|---|
| A | KET036 | 9A | COLHDG('Reserve G | ') |
| A | KET037 | 9A | COLHDG('Registry-Time Mgt. SN Up 9 | ') |
| A | KET038 | 9A | COLHDG('Registry-Time Mgt. SN Down 9 | ') |
| A | KET039 | 9A | COLHDG('Product Buying-in Party Code | ') |
| A | KEV320 | 1A | COLHDG('EOS Cl. | ') |
| A | KEB321 | 1A | COLHDG('Reserve Cl. 2 | ') |
| A | KE1771 | 7A | COLHDG('Reserve 1 | ') |
| A | K KE4001 | | | |
| A | K KE1879 | | | |
| A* | | | | |

\* \* \* End of Origin Specification \* \* \*

---

WO2 Homogeneity Vector (Reference Key)
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
\*   LP0004        P F 4: Reference
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

```
LP0004-SEC    SECTION.
LP0004-START.
    IF NOT ( PRKEY NO OF W0204(PS) = 04 )
        GO TO LP0004-EXIT
    END-IF.
*------------------------------------------------*
*   L01540 O P C D (LP0004)
*------------------------------------------------*
    IF ERR-INF NOT = "1"
        IF A01540 OF KH201E(PS) = SPACE
          MOVE "1" TO ERR-INF
          MOVE 2009 TO MSG-NO
          MOVE B"1" TO A01540-C OF W0204(PS)
          MOVE SPACE TO A01560 OF KH201E(PS)
        ELSE
* OPEN K213DLO1
          IF K213DLO1-OPEN NOT = "1"
            OPEN INPUT K213DL01
            IF FLSTS1 NOT = ZERO
              MOVE 8800 TO MSG-NO
              MOVE "1" TO ERR-INF
              GO TO MAIN-END
            ELSE
              MOVE "1" TO K213DLO1-OPEN
            END-IF
          END-IF
*
          MOVE A01540 OF KH201E(PS) TO W01540
          MOVE ZERO TO SGLCODE
          MOVE W01540 TO SK1084 OF K213DL01-REC
          READ K213DL01
              INVALID KEY
              MOVE 100 TO SGLCODE
          END-READ
          IF SGLCODE = ZERO
              MOVE SKD792 OF K213DL01-REC TO R-W01560
          END-IF
*-----
          IF SGLCODE = ZERO
              MOVE R-W01560 TO INDATA
              MOVE 16 TO OUTKETA
              PERFORM PSLEKPROC
              MOVE OUTDATA TO AD1560 OF KH201E(PS)
          ELSE
              MOVE "1" TO ERR-INF
              MOVE 2001 TO MSG-NO
              MOVE B"1" TO A01540-C OF W0204(PS)
              MOVE SPACE TO A01560 OF-KH201E(PS)
          END-IF
        END-IF.
    END-IF
* Determination of homogeneity route and the next screen in the case of customer code
    *IF ERR-INF NOT = "1"
        IF CSR-LOCK OF W0204(PS) = "A12590"
            MOVE 3 TO ROUTE-NO
            MOVE "KH600Q" TO L-GAMEN-NO
        END-IF
```

-continued

* Determination of homogeneity route and the next screen in the case of
Delivery destination code
    IF CSR-LOCK OF WO204(PS) "A13610"
      MOVE 3 TO ROUTE-NO
      MOVE "KH600Q" TO L-GAMEN-NO

---

WO3: Duplicate Vector
```
                                                              W03KH201E
**************** Beginning of Data ************************************
*******************************************************************
    *   KH201E         Received Order Entry (Distribution)         *
*******************************************************************
         IF GAMEN-NO OF CRTL-AREA = "KH201E"
*******************************************************************
    D    DISPLAY "KH201E LAYT-FLG=" LAYH-FLG
    D    DISPLAY "KH201E LAYT-FLG=" LAYT-FLG
         IF LAYH-FLG = "1"
*****    Reg. Per. Code         YD1179KH201E1E
         MOVE A01540 OF KH201E(STG1)
            TO KD1179 OF EF-AREA
*****    Shipment Reason        YD1839KH201E1E
         MOVE A07580 OP KH201E(STG1)
            TO KD1839 OF EF-AREA
*****    Customer Code          YD1847KH201E1E
         MOVE A12590 OF KH201E(STG1)
            TO KD1847 OF EF-AREA
960424***** Transaction No.     YD1844KH201E1E
*****IF A07560 OF KH201E(STG1) IS NUMERIC
*****    MOVE A07560 OF KH201E(STG1)
*****          TO KD1844 OF EF-AREA
*****END-IF
960513***** Received Order No.  YD1844KH201E1E
*****IF A07560 OF KH201E(STG1) IS NUMERIC
*****    MOVE A07560 OF KH201E(STG1)
*****          TO KD4029 OF EF-AREA
*****EDN-IF
960513***** Estimate No.        YD4028KH201E1E
*****IF AD4800 IF KH201E(STG1) IS NUMERIC
*****    MOVE A04800 OF RH201E(STG1)
*****          TO KD4028 OF EF-AREA
*****END-IF
***** Trns. Total Amt.          YD1854KH201E1E
         MOVE A04360 IF KH201E(STG1)
            TO KD1854 OF EF-AREA
***** Qty Unit Price Total Amt.      YD1857KH201E1E
         MOVE A04360 IF KH201E(STG1)
            TO KD1857 OF EF-AREA
***** Name of Customer Person In Charge (Tentative)   YD4044KH201E1E
         MOVE A14890 OF KH201E(STG1)
            TO KD4044 OF EF-AREA
***** Remarks 1                 YD1786KH201E1E
         MOVE A17860 OF KH201E(STG1)
            TO KD1786 OF EF-AREA
***** Remarks 2                 YD1787KH201E1E
         MOVE A17870 OF KH201E(STG1)
            TO KD1787 OF EF-AREA
***** Customer Trns. No.        YD4037KH201E1E
         MOVE AU2980 OF KH201E(STG1)
            TO KD4037 OF EF-AREA
***** Distribution Cl.          YD1412KH201E1E
         MOVE A14130 OF KH201E(STG1)
            TO KD1412 OF EF-AREA
***** Person In Charge Code     YD1084KH201E1E
         MOVE A10840 OF KH201E(STG1)
            TO KD1084 OF EF-AREA
***** Catena Direct Distribution Cl.    YDS568KH201E1E
         MOVE A11210 OF KH201E(STG1)
            TO KDS568 OF EF-AREA
         END-IF
```

-continued

```
          IF LAYT-FLG = "1"
               PERFORM VARYING SI FROM 1 BY 1
                  UNTIL SI > 6
***** LASTIDX CONTROL
          MOVE SI T0 T1
***** Final Arrival Point Code 1      YE5501KH201E1E
*****          IF A11210 OF KH201E(STG1) NOT = 1
```

---

WO3: Homogeneity Vector

```
                                                          WO3EH2
**************** Beginning of Data *************************************
********************************************************************
*     W03EH2            Received Order (HDR)              *
********************************************************************
***** Quantity Unit Price Total Amount      L18570
UG0717*****IF TKBN = CNS-EF AND KDU360 OF EF-AREA NOT = "1"
       IF TKBN = CNS-EF
         IF KE5001 OF EF-AREA(PI) IS NUMERIC
         AND KD1857 OF EF-AREA IS NUMERIC
         AND KEC201 OF EF-AREA(PI) IS NUMERIC
           IF PI = 1
              MOVE ZERO TO KD1857 OF EF-AREA
           END-IF
           IF KE5001 OF EF-AREA(PI) NOT = ZERO
              COMPUTE DK1857 OF EF-AREA = KD1857 OF EF-AREA
                                  + KEC201 OF EF-AREA(PI)
                 ON SIZE ERROR
                    MOVE ALL "9" TO KD1857 OF EF-AREA
                    IF ERR-INF = SPACE
                       MOVE "1" TO ERR-INF
                       MOVE 3019 TO MSG-NO
                    END-IF
                 END-COMPUTE
            END-IF
          END-IF
       END-IF.
***** Quantity Unit Price discount Total Amount    L18580
       IF TKBN = CNS-EF
         IF KD1858 OF EF-AREA IS NUMERIC
         AND KE5001 OF EF-AREA(PI) IS NUMERIC
         AND KEC251 OF EF-AREA(PI) IS NUMERIC
***** Discount Cl. NOT = "1"
            IF KDU360 OF EF-AREA NOT = "1"
              IF PI = 1
                 MOVE ZERO TO KD1858 OF EF-AREA
              END-IF
              IF KE5001 OF EF-AREA(PI) NOT = ZERO
                 COMPUTE   KD1858 OF EF-AREA
                       = KD1858 OF EF-AREA
                       + KEC251 OF EF-AREA(PI)
                    ON SIZE ERROR
                       MOVE ALL "9" TO KD1858 OF EF-AREA
                       IF ERR-INF = SPACE
                          MOVE "1" TO ERR-INF
                          MOVE 3019 TO MSG-NO
                       END-IF
                    END-COMPUTE
              END-IF
            END-IF
***** Discount Cl. = "1"
            IF KDU360 OF EF-AREA = "1"
              MOVE KD1099 OF EF-AREA
                 TO KD1858 OF EF-AREA
            END-IF
          END-IF
        END-IF
***** Quantity Regular Price Total Amount     L18560
        IF TKBN = CNS-EF
          IF KE5001 OF EF-AREA(PI) IS NUMERIC
          AND KD1856 OF EF-AREA    IS NUMERIC
          AND KE1124 OF EF-AREA(PI) IS NUMERIC
            IF PI = 1
               MOVE ZERO TO KD1856 OF EF-AREA
```

```
                    END-IF
                IF KE5001 OF EF-AREA(PI) NOT = ZERO
                    COMPUTE KD1856 OF EF-AREA = KD1856 OF EF-AREA
                        + KE1124 OF EF-AREA(PI) * KE5001 OF EF-AREA(PI)
                        ON SIZE ERROR
                            MOVE ALL "9" TO KD1856 OF EF-AREA
                            IF ERR-INF = SPACE
                                MOVE "1" TO ERR-INF
                                MOVE 3019 TO MSG-NO
                            END-IF
                    END-COMPUTE
                END-IF
            END-IF
        END-IF.
***** Disc. Total Amount            L10990
        IF TKBN = CNS-EF
            IF KDU360 OF EF-AREA NOT = "1"
                IF KD1099 OF EF-AREA IS NUMERIC
                AND KE5001 OF EF-AREA(PI) IS NUMERIC
                AND KEC251 OF EF-AREA(PI) IS NUMERIC
                    IF PI = 1
                        MOVE ZERO TO KD1099 OF EF-AREA
                    END-IF
                    IF KE5001 OF EF-AREA(PI) NOT = ZERO
                        COMPUTE KD1099 OF EF-AREA
                            = KD1099 OF EF-AREA
                            + KEC251 OF EF-AREA(PI)
                            ON SIZE ERROR
                                MOVE ALL "9" TO KD1099 OF EF-AREA
                                IF ERR-INF = SPACE
                                    MOVE "1" TO ERR-INF
                                    MOVE 3019 TO MSG-NO
                                END-IF
                        END-COMPUTE
                    END-IF
                END-IF
            END-IF
        END-IF.
*****Transaction Total Amount       L18540
        IF TKBN = CNS-EF
            IF KD1854 OF EF-AREA IS NUMERIC
            AND KD1857 OF EF-AREA IS NUMERIC
            AND KD1099 OF EF-AREA IS NUMERIC
                COMPUTE KD1854 OF EF-AREA = KD1857 OF EF-AREA
                                    - KD1099 OF EF-AREA
                    ON SIZE ERROR
                        MOVE ALL "9" TO KD1854 OF EF-AREA
                        IF ERR-INF SPACE
                            MOVE "1" TO ERR-INF
                            MOVE 3019 TO MSG-NO
                        END-IF
                END-COMPUTE
            END-IF
        END-IF.
*****Trns. Total Amount inclusive of Consumption Tax    L18550
        IF TKBN = CNS-EF
            IF KD1855 OF EF-AREA IS NUMERIC
            AND KD1854 OF EF-AREA IS NUMERIC
            AND W10903 IS NUMERIC
                IF (KS0901 OF WBF-AREA = "1")
                    IF KD1854 OF EF-AREA >= ZERO
                        COMPUTE KD1855 OF EF-AREA
                            = KD1854 OF EF-AREA * (1 + W10903) + 0.5
                            ON SIZE ERROR
                                MOVE ALL "9" TO KD1855 OF EF-AREA
                                IF ERR-INF = SPACE
                                    MOVE "1" TO ERR-INF
                                    MOVE 3019 TO MSG-NO
                                END-IF
                        END-COMPUTE
                    ELSE
                        COMPUTE KD1855 OF EF-AREA
                            = KD1854 OF EF-AREA * (1 + W10903) - 0.5
                            ON SIZE ERROR
                                MOVE ALL "9" TO KD1855 IF EF-AREA
                                IF ERR-INF = SPACE
```

```
       W04: Duplicate Vector
*=======================================*
*        Duplicate Vector Group 1 (Tail) *
*=======================================*
*---------------------------------------*
*     Y17990    Wholesale Cost No.       
*---------------------------------------*
*     Y04360 Total Amount                
*---------------------------------------*
Y04360-SEC   SECTION.
Y04360-START.
    IF ERR-INF NOT = "1"
    AND GAMEN-NO OF W0204(PS2) = "KH201E"
        IF PPKEY-NO OF W0204(PS2) = 1
        OR PPKEY-NO OF W020R(PS2) = 12
            MOVE ZERO TO A04360 OF KH201E(PS1)
        ELSE
            IF KD1857 OF W03-HD1R-IS NUMERIC
               MOVE KD1857 OF W03-HD1R
                  TO A04360 OF KH201E(PS1)
            END-IF
        END-IF
    END-IF.
Y04360-EXIT.
    EXIT.
*---------------------------------------*
```

```
       W04: Homogeneity Vector
*---------------------------------------*
     L04360 Total Amount
*---------------------------------------*
L04360-SEC SECTION.
L04360-START.
    MOVE ZERO TO WK-KINGAKU.
    PERFORM VARYING PJ FROM 1 BY 1
            UNTIL PJ > 6
        IF A08311 OF KH201E(PS1 PJ) NOT = SPACE
        AND A09221 OF KH201E(PS1 PJ) IS NUMERIC
        AND A09221 OF KH201E(PS1 PJ) NOT = ZERO
        AND A10791 OF KH201E(PS1 PJ) IS NUMERIC
        AND A10791 OF KH201E(PS1 PJ) NOT = ZERO
*
        AND A16721 OF KH201E(PS1 PJ) IS NUMERIC
        AND A16721 OF KH201E(PS1 PJ) NOT = ZERO
            COMPUTE WK-KINGAKU
                = WK-KINGAKU + A16721 OF KH201E(PS1 PJ)
        END-IF
    END-PERFORM.
    MOVE WK-KINGAKU TO A04360 OF KH201E(PS1).
L04360-EXIT.
    EXIT.
```

INDUSTRIAL APPLICABILITY

In the traditional software development the dependency on personal abilities is extremely high as well as having high personal ability is required for all staff involved, which has brought about fundamental problems. This invention has realized a development methodology, by theoretically grasping the consciousness action existing in the depths of the thinking method in relation to the cognitive action, and it is applicable to any fields including OS middle game, process control and business software.

Since the software structure which is induced by this invention is determined theoretically, it is recurrent and becomes the one and only. As a result, the software developed is not a black box any more, thereby eliminating human errors from the quality viewpoint, so that the system becomes stiff with the clear structure. Therefore, not only an exact estimate of software development is made possible but also planning and the development management can be performed with ease.

FIG. 45 shows its effects. Compared with the traditional method, the development period is shortened by $\frac{1}{2}$ to $\frac{1}{10}$; the total development volume is compressed by 20% to 80%; the maintainability increases by 40 to 100 times; and the working efficiency is enhanced by 40 to 100 times.

In the traditional software, definitives comprised of screens, vouchers and files take up 30% and their logic takes up 70% of the whole software developed, thereby necessitating a document respectively. However, in this invention, the homogeneity map which is corresponding to the above-mentioned logic in the traditional method does not require a document, so that it can cut the volume of documents by 70% compared with that of the traditional method.

What is claimed is:

1. A software production method comprising the following steps:

a step to determine definitive identifiers for identifying definitives including a screen, a voucher and a file, which are needed for the software to be produced;

a step to sort out words existing in the definitives;

a step to create a homogeneity map, in which pallets being logical units needed by the software are to be plot in accordance with a predetermined rule based on the definitive identifiers;

a step to determine necessary files based on the sorted-out words and the created homogeneity map;

a step to create a first, a second and a third tense control vectors, wherein the first tense control vector operates either one of the following for every said screen and for every word belonging to the screen: to do nothing in case data exists in a self word's first data area, or to create data in the self word's first data area in case data does not exist in the self word's first data area while setting a first restart flag when such creation is impossible, wherein the second tense control vector operates either one of the following for every said screen and for every word belonging to the screen: to do nothing if there is no data for the self word in the data received from the screen, or if there is a data for the self word in the data received from the screen, to do either of the followings, in case of a non-control word, setting the data in a self word's second data area, while setting a second restart flag when said data setting is not precisely accomplished, and in case of a control word, determining a homogeneity route in accordance with a nature of the self word, while setting the second restart flag when the determination of the homogeneity route is not precisely established; and wherein the third tense control vector operates either one of the following for all words belonging to all definitives necessary for the software: to do nothing in case data exists in a self word's third data area, or to create data in the self word's third data area in case data does not exist in the self word's third data area, while setting a third restart flag when such creation is impossible;

a step to create a first, a second, a third pallet functions, wherein the first pallet function executes for every said screen, for all words belonging to the screen, irrespective of the sequence of the words, the first tense control vectors, each vector of which corresponds to every word belonging to the screen, while re-executing all the first tense control vectors for every word belonging to the screen when the first restart flag is set after such execution, wherein the second pallet function executes for every said screen, for all words belonging to the screen, irrespective of the sequence of the words, the second tense control vectors, each vector of which corresponds to every word belonging to the screen, while re-executing all the second tense control vectors for every word belonging to the screen when the second restart flag is set after such execution, and wherein the third pallet function executes, for all words belonging to the definitive, irrespective of the sequence of the words, the third tense control vectors, each vector of which corresponds to every word belonging to the definitive, while re-executing all the third tense control vectors for every word belonging to the definintive when the third restart flag is set after such execution; and a step to assemble the first to third pallet functions into a pallet chain function which executes the first pallet function, transmits data resulted from said execution to a screen, receives the data from the screen to execute the second pallet function, and, based on this execution's result, selectively executes the third pallet function in accordance with the homogeneity route determined by the second tense control vector.

2. A processing apparatus comprising:

a first means for having a first, a second and a third tense control vectors, wherein the first tense control vector operates either one of the following for every screen necessary for a software to be produced and for every word belonging to the screen: to do nothing in case data necessary for editing said screen exists in a self word's first data area, or to create data in the self word's first data area in case data does not exist in the self word's first data area while setting a first restart flag when such creation is impossible, wherein the second tense control vector operates either one of the following for every said screen and for every word belonging to the screen: to do nothing if there is no data for the self word in the data received from the screen, or if there is a data for the self word in the data received from the screen, to do either of the followings, in case of a non-control word, setting the data in a self word's second data area, while setting a second restart flag when said data setting is not precisely accomplished, and in case of a control word, determining a homogeneity route in accordance with a nature of the self word, while setting the second restart flag when the determination of the homogeneity route is not precisely established; and wherein the third tense control vector operates either one of the following for every word belonging to all definitives including the screen, a voucher, and a file necessary for the software: to do nothing in case data exists in a self word's third data area, or to create data in the self word's third data area in case data does not exist in the self word's third data areas while setting a third restart flag when such creation is impossible;

a second means for having a first, a second and a third pallet functions, wherein the first pallet function executes for every said screen and for all words belonging to the screen, irrespective of the sequence of the words, the first tense control vectors, each vector of which corresponds to every word belonging to the screen, while re-executing all the first tense control vectors for every word belonging to the screen when the first restart flag is set after such execution, wherein the second pallet function executes for every said screen and for all words belonging to the screen, irrespective of the sequence of the words, the second tense control vectors, each vector of which corresponds to every word belonging to the screen, while re-executing all the second tense control vectors for every word belonging to the screen when the second restart flag is set after such execution, and wherein the third pallet function executes, for all words belonging to the definitive, irrespective of the sequence of the words, the third tense control vectors, each vector of which corresponds to every word belonging to the definitive, while re-executing all the third tense control vectors for every word belonging to the definintive when the third restart flag is set after such execution, and a third means for executing the first pallet function, transmitting data resulted from said execution to a screen, receiving the data from the screen to execute the second pallet function, and, based on this execution's result, selectively executing the third pallet function in accordance with the homogeneity route determined by the second tense control vector.

3. A processing apparatus recording medium on which a program is recorded, said program comprising:

a first means for having a first, a second and a third tense control vectors, wherein the first tense control vector operates either one of the following for every screen necessary for a software to be produced and for every word belonging to the screen: to do nothing in case data necessary for editing said screen exists in a self word's first data area, or to create data in the self word's first data area in case data does not exist in the self word's first data area while setting a first restart flag when such creation is impossible, wherein the second tense control vector operates either one of the following for every said screen and for every word belonging to the screen: to do nothing if there is no data for the self word in the data received from the screen, or if there is a data for the self word in the data received from the screen, to do either of the followings, in case of a non-control word, setting the data in a self word's second data area, while setting a second restart flag when said data setting is not precisely accomplished, and in case of a control word, determining a homogeneity route in accordance with a nature of the self word, while setting the second restart flag when the determination of the homogeneity route is not precisely established; and wherein the third tense control vector operates either one of the following for every word belonging to all definitives including the screen, a voucher, and a file necessary for the software: to do nothing in case data exists in a self word's third data area, or to create data in the self word's third data area in case data does not exist in the self word's third data area, while setting a third restart flag when such creation is impossible;

a second means for having a first, a second and a third pallet functions, wherein the first pallet function executes for every said screen and for all words belonging to the screen, irrespective of the sequence of the words, the first tense control vectors, each vector of which corresponds to every word belonging to the screen, while re-executing all the first tense control vectors for every word belonging to the screen when the first restart flag is set after such execution, wherein the second pallet function executes for every said screen and for all words belonging to the screen, irrespective of the sequence of the words, the second tense control vectors, each vector of which corresponds to every word belonging to the screen, while re-executing all the second tense control vectors for every word belonging to the screen when the second restart flag is set after such execution, and wherein the third pallet function executes, for all words belonging to the definitive, irrespective of the sequence of the words, the third tense control vectors, each vector of which corresponds to every word belonging to the definitive, while re-executing all the third tense control vectors for every word belonging to the definintive when the third restart flag is set after such execution; and a third means for executing the first pallet function, transmitting data resulted from said execution to a screen, receiving the data from the screen to execute the second pallet function, and, based on this execution's result, selectively executing the third pallet function in accordance with the homogeneity route determined by the second tense control vector.

4. A processing method comprising the following steps:

a step to determine a screen to be displayed, which is necessary for a software to be produced;

a step to activate W04 pallet function which executes, for all words belonging to the screen, irrespective of the sequence of the words, first tense control vectors, while re-executing all the first tense control vectors for every word belonging to the screen when a first restart flag is set after such execution, wherein the first tense control vector operates either one of the followings for every said screen and for every word belonging to the screen: to do nothing in case data exists in a self word's first data area, or to create data in the self word's first data area in case data does not exist in the self word's first data area while setting the first restart flag when such creation is impossible;

a step to display the screen edited based on said W04 pallet function;

a step to receive contents resulted from an operation onto the screen displayed;

a step to activate W02 pallet function which executes, for all words belonging to the screen, irrespective of the sequence of the words, second tense control vectors, while re-executing all the second tense control vectors for every word belonging to the screen when a second restart flag is set after such execution, wherein the second tense control vector operates either one of the followings for every said screen and for every word belonging to the screen: to do nothing if there is no data for the self word in the data received from the screen by said operation onto the screen, or, if there is a data for the self word in the data received from the screen, to do either of the followings: in case of a non-control word, setting the data in a self word's second data area while setting the second restart flag when said data setting is not precisely accomplished, and in case of a control word, determining a homogeneity route in accordance with a nature of the self word while setting the second restart flag when the determination of the homogeneity route is not precisely established; and a step to activate W03 pallet function which executes, for all words belonging to all definitives necessary for the software, irrespective of the sequence of the words, third tense control vectors, while re-executing all the third tense control vectors for every word belonging to the definitive when a third restart flag is set after such execution, wherein the third tense control vector operates either one of the followings for all words belonging to all the definitives in accordance with the homogeneity route determined by said second tense control vector: to do nothing in case data exists in a self word's third data area, or to create data in the self word's third data area in case data does not exist in the self word's third data area while setting the third restart flag when such creation in impossible.

5. A processing apparatus comprising:

a means for determining a screen to be displayed, which is necessary for a software to be produced;

a means for activating W04 pallet function which executes, for all words belonging to the screen, irrespective of the sequence of the words, first tense control vectors, while re-executing all the first tense control vectors for every word belonging to the screen when a first restart flag is set after such execution, wherein the first tense control vector operates either one of the followings for every said screen and for every word belonging to the screen: to do nothing in case data exists in a self word's first data area, or to create data in the self word's first data area in case data does not exist in the self word's first data area while setting the first restart flag when such creation is impossible;

a means for displaying the screen edited based on said W04 pallet function;

a means for receiving contents resulted from an operation onto the screen displayed;

a means for activating W02 pallet function which executes, for all words belonging to the screen, irrespective of the sequence of the words, second tense control vectors, while re-executing all the second tense control vectors for every word belonging to the screen when a second restart flag is set after such execution, wherein the second tense control vector operates either one of the followings for every said screen and for every word belonging to the screen: to do nothing if there is no data for the self word in the data received from the screen by said operation onto the screen, or, if there is a data for the self word in the data received from the screen, to do either of the followings: in case of a non-control word, setting the data in a self word's second data area while setting the second restart flag when said data setting is not precisely accomplished, and in case of a control word, determining a homogeneity route in accordance with a nature of the self word while setting the second restart flag when the determination of the homogeneity route is not precisely established; and a means for activating W03 pallet function which executes, for all words belonging to all definitives necessary for the software, irrespective of the sequence of the words, third tense control vectors, while re-executing all the third tense control vectors for every word belonging to the definitive when a third restart flag is set after such execution, wherein the third tense control vector operates either one of the followings for all words belonging to all the definitives in accordance with the homogeneity route determined by said second tense control vector: to do nothing in case data exists in a self word's third data area, or to create data in the self word's third data area in case data does not exist in the self word's third data area while setting the third restart flag when such creation in impossible.

6. A recording medium on which a program is recorded, said program comprising:

a means for determining a screen to be displayed, which is necessary for a software to be produced;

a means for activating W04 pallet function which executes, for all words belonging to the screen, irrespective of the sequence of the words, first tense control vectors, while re-executing all the first tense control vectors for every word belonging to the screen when a first restart flag is set after such execution, wherein the first tense control vector operates either one of the followings for every said screen and for every word belonging to the screen: to do nothing in case data exists in a self word's first data area, or to create data in the self word's first data area in case data does not exist in the self word's first data area while setting the first restart flag when such creation is impossible;

a means for displaying the screen edited based on said W04 pallet function;

a means for receiving contents resulted from an operation onto the screen displayed;

a means for activating W02 pallet function which executes, for all words belonging to the screen, irrespective of the sequence of the words, second tense control vectors, while re-executing all the second tense control vectors for every word belonging to the screen when a second restart flag is set after such execution, wherein the second tense control vector operates either one of the followings for every said screen and for every word belonging to the screen: to do nothing if there is not data for the self word in the data received from the screen by said operation onto the screen, or, if there is a data for the self word in the data received from the screen, to do either of the followings: in case of a non-control word, setting the data in a self word's second data area while setting the second restart flag when said data setting is not precisely accomplished, and in case of a control word, determining a homogeneity route in accordance with a nature of the self word while setting the second restart flag when the determination of the homogeneity route is not precisely established; and a means for activating W03 pallet function which executes, for all words belonging to all definitives necessary for the software, irrespective of the sequence of the words, third tense control vectors, while re-executing all the third tense control vectors for every word belonging to the definitive when a third restart flag is set after such execution, wherein the third tense control vector operates either one of the followings for all words belonging to all the definitives in accordance with the homogeneity route determined by said second tense control vector: to do nothing in case data exists in a self word's third data area, or to create data in the self word's third data area in case data does not exist in the self word's third data area while setting the third restart flag when such creation in impossible.

* * * * *